(12) United States Patent
Yoneda et al.

(10) Patent No.: US 8,535,432 B2
(45) Date of Patent: Sep. 17, 2013

(54) PORPHYRAZINE COLORING MATTER, INK COMPOSITION CONTAINING THE SAME AND COLORED PRODUCT

(75) Inventors: Takashi Yoneda, Tokyo (JP); Kenji Ooshima, Tokyo (JP); Akira Kawaguchi, Tokyo (JP); Yuka Shishikura, Tokyo (JP); Tomoki Fujita, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 210 days.

(21) Appl. No.: 13/258,124

(22) PCT Filed: Apr. 14, 2010

(86) PCT No.: PCT/JP2010/002700
§ 371 (c)(1),
(2), (4) Date: Sep. 21, 2011

(87) PCT Pub. No.: WO2010/119676
PCT Pub. Date: Oct. 21, 2010

(65) Prior Publication Data
US 2012/0013678 A1   Jan. 19, 2012

(30) Foreign Application Priority Data

Apr. 15, 2009 (JP) .................................. 2009-098623
Sep. 29, 2009 (JP) .................................. 2009-223645

(51) Int. Cl.
*C09D 11/02* (2006.01)
*C09B 47/00* (2006.01)

(52) U.S. Cl.
USPC ......... 106/31.47; 540/124; 540/125; 540/126

(58) Field of Classification Search
USPC .................. 106/31.47, 31.49; 540/124, 125, 540/126; 347/100; 428/195.1
See application file for complete search history.

(56) References Cited

U.S. PATENT DOCUMENTS

| | | | |
|---|---|---|---|
| 2,276,918 A | 3/1942 | Berthold et al. | |
| 3,622,263 A | 11/1971 | Groll et al. | |
| 4,952,688 A | 8/1990 | Springer | |
| 5,123,960 A | 6/1992 | Shirota et al. | |
| 5,279,622 A | 1/1994 | Stawitz et al. | |
| 5,847,111 A | 12/1998 | Wald et al. | |
| 5,922,116 A | 7/1999 | Mistry et al. | |
| 6,149,722 A | 11/2000 | Robertson et al. | |
| 6,190,422 B1 | 2/2001 | Carr | |
| 6,238,827 B1 | 5/2001 | Nakazawa et al. | |
| 6,379,441 B1 | 4/2002 | Kanaya et al. | |
| 6,569,212 B2 | 5/2003 | Carr | |
| 7,022,171 B2 | 4/2006 | Patel et al. | |
| 7,034,149 B2 | 4/2006 | Hirokazu et al. | |
| 7,087,107 B2 * | 8/2006 | Tateishi et al. | 106/31.49 |
| 7,097,701 B2 | 8/2006 | Tateishi et al. | |
| 7,132,012 B2 | 11/2006 | Tateishi et al. | |
| 7,160,372 B2 | 1/2007 | Yoshizawa et al. | |
| 7,270,701 B2 | 9/2007 | Jinnou et al. | |
| 7,282,090 B2 | 10/2007 | Osumi et al. | |

(Continued)

FOREIGN PATENT DOCUMENTS

DE     728931 C      12/1942
DE     19521056 A1   12/1995

(Continued)

OTHER PUBLICATIONS

International Search Report dated Feb. 2, 2010 in co-pending foreign patent application PCT/JP2009/007094.
International Search Report dated May 15, 2007 in co-pending foreign application PCT/JP2007/052212.
International Search Report dated Jul. 10, 2007 in co-pending foreign application PCT/JP2007/057651.
International Search Report dated Apr. 22, 2008 in co-pending foreign application PCT/JP2008/054584.
International Search Report dated Mar. 17, 2009 in co-pending foreign application PCT/JP2008/003947.
International Search Report dated Sep. 15, 2009 in co-pending foreign application PCT/JP2009/002935.
XP-002435570; J. R. Schweizer; May 19, 1964; Farbstoffe; "Cyclo-tetraisoindolenin-(endo-isoindolenino)-Komplex": pp. 510-511.

(Continued)

*Primary Examiner* — Helene Klemanski
(74) *Attorney, Agent, or Firm* — Nields, Lemack & Frame, LLC

(57) ABSTRACT

The present invention relates to a porphyrazine coloring matter or a salt thereof represented by the following formula (1) [wherein, the rings of A to D are each independently a benzene ring or a 6-membered nitrogen-containing heteroaromatic ring, E is alkylene, X is a sulfo-substituted anilino group or the like which may further have a substituent, $R_1$ is a C1-C6 alkyl group, b is 0.00 or more and less than 3.90 as an average value, c is 0.10 or more and less than 4.00 as an average value, and the sum of b and c is 1.00 or more and less than 4.00 as an average value]. The ink composition containing the porphyrazine coloring matter of the present invention has a good hue as a cyan ink, is excellent in various fastness properties, particularly in ozone fastness, allows a high print density, has properties hardly causing bronze phenomenon, and can provide a porphyrazine coloring matter suitable for inkjet recording and an ink composition containing this.

(1)

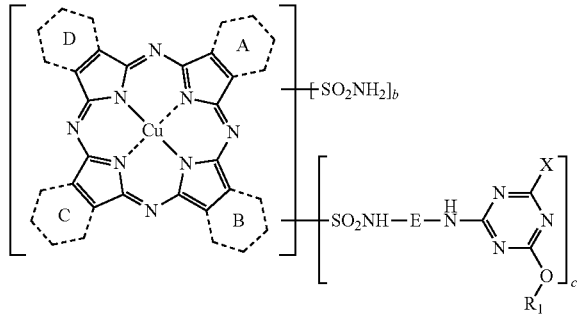

21 Claims, No Drawings

(56) References Cited

U.S. PATENT DOCUMENTS

| | | |
|---|---|---|
| 7,314,273 B2 | 1/2008 | Robertson et al. |
| 7,419,537 B2 | 9/2008 | Fujii et al. |
| 7,566,362 B2 | 7/2009 | Mori et al. |
| 7,585,361 B2 | 9/2009 | Yoneda et al. |
| 7,591,888 B2 | 9/2009 | Fujii et al. |
| 7,611,571 B2 | 11/2009 | Yamashita et al. |
| 7,854,797 B2 | 12/2010 | Fujii et al. |
| 7,981,204 B2 | 7/2011 | Shimizu et al. |
| 8,226,222 B2 | 7/2012 | Kajiura et al. |
| 8,394,186 B2 | 3/2013 | Yoneda et al. |
| 2002/0128249 A1 | 9/2002 | Cook |
| 2004/0045478 A1 | 3/2004 | Tateishi et al. |
| 2005/0126436 A1 | 6/2005 | Patel et al. |
| 2006/0201382 A1 | 9/2006 | Ozawa et al. |
| 2006/0268086 A1 | 11/2006 | Kawakami et al. |
| 2007/0006772 A1 | 1/2007 | Fujii et al. |
| 2008/0274286 A1 | 11/2008 | Yamashita et al. |
| 2009/0029120 A1 | 1/2009 | Fujii et al. |
| 2009/0047430 A1 | 2/2009 | Mori et al. |
| 2009/0151599 A1 | 6/2009 | Fujii et al. |
| 2009/0202798 A1 | 8/2009 | Patel |
| 2010/0112218 A1 | 5/2010 | Fujii et al. |
| 2010/0126377 A1 | 5/2010 | Yoneda et al. |
| 2010/0236448 A1 | 9/2010 | Kurata et al. |
| 2010/0279082 A1 | 11/2010 | Shimizu et al. |
| 2011/0090278 A1 | 4/2011 | Yoneda et al. |
| 2011/0143106 A1* | 6/2011 | Patel ............... 106/31.49 |
| 2011/0234687 A1* | 9/2011 | Patel et al. ........... 540/126 |
| 2011/0242198 A1 | 10/2011 | Yoneda et al. |
| 2012/0081457 A1 | 4/2012 | Ooshima et al. |
| 2012/0147084 A1* | 6/2012 | Ikeda et al. ........... 106/31.77 |
| 2012/0148807 A1* | 6/2012 | Ikeda et al. ........... 428/195.1 |

FOREIGN PATENT DOCUMENTS

| | | |
|---|---|---|
| EP | 0418792 A1 | 3/1991 |
| EP | 0669381 A2 | 8/1995 |
| EP | 0906943 A1 | 4/1999 |
| EP | 0985716 A1 | 3/2000 |
| EP | 1741756 A1 | 1/2007 |
| EP | 2028239 A1 | 2/2009 |
| GB | 2290548 A | 1/1996 |
| JP | 57-198758 A | 12/1982 |
| JP | 59-22967 A | 2/1984 |
| JP | 60-208365 A | 10/1985 |
| JP | 61-2772 A | 1/1986 |
| JP | 62-190273 A | 8/1987 |
| JP | 3-185080 A | 8/1991 |
| JP | 5-171085 A | 7/1993 |
| JP | 7-138511 A | 5/1995 |
| JP | 10-140063 A | 5/1998 |
| JP | 11-515048 A | 12/1999 |
| JP | 2000-303009 A | 10/2000 |
| JP | 2002-80762 A | 3/2002 |
| JP | 2002-105349 A | 4/2002 |
| JP | 2003-34758 A | 2/2003 |
| JP | 2004-75986 A | 3/2004 |
| JP | 2004-323605 A | 11/2004 |
| JP | 2006-45535 A | 2/2006 |
| JP | 2007-23251 A | 2/2007 |
| JP | 2007-277416 A | 10/2007 |
| JP | 2008-13706 A | 1/2008 |
| JP | 2009-057540 A | 3/2009 |
| JP | 2009-062515 A | 3/2009 |
| WO | 02/060994 A | 8/2002 |
| WO | 2004/087815 A1 | 10/2004 |
| WO | 2005/021658 A1 | 3/2005 |
| WO | 2007/091631 A1 | 8/2007 |
| WO | 2007/116933 A1 | 10/2007 |
| WO | 2008/111635 A1 | 9/2008 |
| WO | 2009/084195 A1 | 7/2009 |

OTHER PUBLICATIONS

XP-002435574; DataBase WPI Week 198608; Jan. 8, 1986; Derwent Publications Ltd.; "Ink Composition Blue Colour Low Water Soluble Comprise Sulphonated Copper Phthalo Cyanine Derivative Web Agent"; 1-Page.

XP-002435575; DataBase WPI Week 198548; Oct. 19, 1985; Derwent Publications Ltd.; Copper Phthalocyanine Compound Preparation React Chlorosulphonic Acid Ammonium Hydroxide Triazine Derivative; 1 Page.

XP-002435576; DataBase WPI Week 198303; Dec. 6, 1982; Derwent Publications Ltd.; "Water Soluble Phthalocyanine Dye Low Affinity Cellulose Fast Washing Textile Print" 1-Page.

International Search Report dated May 18, 2010 in corresponding foreign application PCT/JP2010/002700.

Notice of Allowance mailed Dec. 17, 2012 in co-pending U.S. Appl. No. 12/999,436.

Notice of Allowance mailed Jun. 21, 2013 in co-pending U.S. Appl. No. 13/139,402.

* cited by examiner

PORPHYRAZINE COLORING MATTER, INK COMPOSITION CONTAINING THE SAME AND COLORED PRODUCT

TECHNICAL FIELD

The present invention relates to a novel porphyrazine coloring matter or a salt thereof, an ink composition containing it, a method for inkjet recording using this ink composition, and a colored product.

BACKGROUND ART

Conventionally, various image recording materials have been used. Particularly in recent years, recording materials for forming a color image are the mainstream. As a system of recording a color image, the inkjet system, the thermal transfer system, the electrophotographic system, the transcription system using photosensitive materials, the printing system, systems using writing tools such as pen and the like have been actively utilized, and as a material for forming a color image, various coloring matters (dyes or pigments) are used. In addition, a color filter is used, with regard to displays, in LCDs (liquid crystal displays) or PDPs (plasma display panels), and with regard to photographing equipments, in electronic parts such as CCD (charge coupled device). And in order to reproduce a full color image on a display by using these color filters or in order to record a color image reproduced on a display, a coloring matter (dye and pigment) for 3 primary colors of so-called additive color process and subtractive color process are used. However, there is actually no coloring matter which has absorption characteristics providing a desired color reproduction area and can tolerate various use conditions, whereby improvement thereof is strongly required.

The inkjet recording method has been rapidly prevailing and further developing due to its low material cost, possibility of rapid recording, less noise in recording, easiness of color recording, and the like. The inkjet recording method includes the continuous system of continuously flying ink droplets and the on-demand system of flying ink droplets responding to an image information signal. In addition, the discharging system includes a system of discharging ink droplets by applying pressure with piezoelectric elements; a system of discharging ink droplets by generating bubbles in ink by heat; a system by using ultrasonic waves; a system of sucking and discharging ink droplets by electrostatic force; or the like. Examples of the ink suitable for such inkjet recording include water-based ink, oil-based inks, solid (melting-type) ink and the like.

The performance required for the coloring matter used in inks for inkjet recording includes good solubility or dispersibility in solvents; ability of high density recording; good hue; good fastness to light, heat and active gases (oxidizing gases such as NOx and ozone, and in addition, SOx and the like) in the environment; excellent durability against water and chemicals; good fixation to record-receiving materials resulting in no bleeding; excellent storage stability as an ink; no toxicity, and also inexpensive availability; and the like. In particular, a cyan coloring matter having a good cyan hue, allowing recorded matters with a high print density without causing bronze phenomenon, and being excellent fastnesses of recorded image, for example, light fastness (durability to light), ozone fastness (durability to ozone gas) and moisture fastness (durability under high humidity) is strongly desired.

Bronze phenomenon means a phenomenon where the coloring matter on the surface of the record-receiving material is in the state of metal fragments and glares due to coloring matter association, ink malabsorption or the like. When this phenomenon occurs, all of the glossiness, the print quality and the print density deteriorate. Particularly when a metal phthalocyanine-based dye is used as a coloring matter, bronze phenomenon often occurs as "red-bleeding phenomenon" on the part where printing with high concentration is performed. When bronze phenomenon occurs, the color balance of the whole image becomes inhomogeneous and the image quality is lowered, which is why a coloring matter causing no bronze phenomenon is required. In addition, many glossy papers are recently used as a recording medium having a texture close to a photo-like texture, while variations in glossiness are generated on the surface of recorded matter and image texture is significantly lost if bronze phenomenon occurs in images recorded on glossy paper. Also in this viewpoint, a coloring matter causing no bronze phenomenon is strongly required.

As a water-soluble cyan coloring matter used for cyan inks for inkjet recording, a phthalocyanine-based coloring matter and a triphenylmethane-based coloring matter are typical. The typical phthalocyanine-based coloring matter reported and used in the widest range includes phthalocyanine derivatives classified into the following A to H.

A: Known phthalocyanine-based coloring matter having a C.I. (color index) number such as Direct Blue 86, Direct Blue 87, Direct Blue 199, Acid Blue 249, Reactive Blue 71 or the like.

B: Phthalocyanine-based coloring matter described in Patent Literatures 1 to 3 and the like,
[for example, a mixture of $Cu-Pc-(SO_3Na)m(SO_2NH_2)n$; $m+n=1$ to 4] ($Cu-Pc$-represents a copper phthalocyanine residue, $-(SO_3Na)m$ and $(SO_2NH_2)n$ are its substituents, and m and n each represent a substitution number. Hereinafter, the similar description has the same meaning.).

C: Phthalocyanine-based coloring matter described in Patent Literature 4 and the like,
[for example, $Cu-Pc-(CO_2H)m(CONR_1R_2)n$; $m+n=a$ number of 0 to 4]
($R_1R_2$ here represents a substituent such as alkyl. Hereinafter, the similar description has the same meaning.).

D: Phthalocyanine-based coloring matter described in Patent Literature 5 and the like,
[for example, $Cu-Pc-(SO_3H)m(SO_2NR_1R_2)n$; $m+n=a$ number of 0 to 4, and $m \neq 0$].

E: Phthalocyanine-based coloring matter described in Patent Literature 6 and the like, [for example, $Cu-Pc-(SO_3H)l(SO_2NH_2)m(SO_2NR_1R_2)n$; $l+m+n=a$ number of 0 to 4].

F: Phthalocyanine-based coloring matter described in Patent Literature 7 and the like, [for example, $Cu-Pc-(SO_2NR_1R_2)n$: $n=a$ number of 1 to 5].

G: Phthalocyanine-based coloring matter described in Patent Literatures 8, 9 and 12 and the like,
[phthalocyanine compound in which the substitution position of the substituent is controlled, phthalocyanine-based coloring matter in which a substituent is introduced at the beta-position].

H: Benzo pyridoporphyrazine-based coloring matter having a 6-membered nitrogen-containing heteroaromatic ring such as a pyridine ring and a benzene ring, described in Patent Literatures 10, 13 to 17 and the like.

The phthalocyanine-based coloring matter typified by C.I. Direct Blue 86 or C.I. Direct Blue 199 which are usually used widely at present has a characteristic of being excellent in light fastness compared with magenta coloring matters and yellow coloring matters which are generally known. However, the phthalocyanine-based coloring matter has a greenish hue under acidic conditions, whereby it is not very preferable as a cyan ink. Therefore, it is preferred that these coloring matters are used under neutral to alkaline conditions when used as a cyan ink. However, although the ink to be used is neutral to alkaline, it is possible that the hue of a printed matter is greatly changed when the record-receiving material to be used is an acidic paper.

In addition, when the phthalocyanine-based coloring matter is used as a cyan ink, the hue of a printed matter is discolored greenish and also color fading occurs due to oxidizing gases such as nitrogen oxide gas and ozone which are often concerned nowadays as an environmental problem, whereby the print density is concurrently reduced.

On the other hand, the triphenylmethane-based coloring matter has a good hue but is very inferior in light fastness, ozone fastness and moisture fastness.

From here on, as the application field of inkjet recording is widespread and inkjet recording is widely used in articles on exhibition for advertisement and the like, there will be more opportunities for coloring matter and ink to be exposed to light and oxidizing gases in the environment. For this reason, coloring matter for inkjet recording will be more and more strongly required to have a good hue, to be inexpensive, and in addition, particularly to be excellent in various fastnesses as described above. However, it is said to be difficult to develop a cyan coloring matter (for example, phthalocyanine-based coloring matter) and a cyan ink satisfying these requirements at a high level. Also in the past, phthalocyanine-based coloring matters or benzo pyridoporphyrazine coloring matters to which fastness to ozone gases is imparted have been disclosed in Patent Literatures 3, 8 to 12 and 14 to 17. However, a cyan coloring matter which satisfies all the qualities such as hue, print density, light fastness, ozone gas fastness, moisture fastness and the like and causes no bronze phenomenon and further which can be inexpensively manufactured has yet to be obtained. Thus, the requirements of the market have not been sufficiently satisfied.

RELATED TECHNICAL LITERATURES

Patent Literatures

[Patent Literature 1] Japanese Patent Laid-Open No. S62-190273 A Publication
[Patent Literature 2] Japanese Patent Laid-Open No. H7-138511 A Publication
[Patent Literature 3] Japanese Patent Laid-Open No. 2002-105349 A Publication
[Patent Literature 4] Japanese Patent Laid-Open No. H5-171085 A Publication
[Patent Literature 5] Japanese Patent Laid-Open No. H10-140063 A Publication
[Patent Literature 6] National Publication of International Patent Application No. H11-515048 A Publication
[Patent Literature 7] Japanese Patent Laid-Open No. S59-22967 A Publication
[Patent Literature 8] Japanese Patent Laid-Open No. 2000-303009 A Publication
[Patent Literature 9] Japanese Patent Laid-Open No. 2002-249677 A Publication
[Patent Literature 10] Japanese Patent Laid-Open No. 2003-34758 A Publication
[Patent Literature 11] Japanese Patent Laid-Open No. 2002-80762 A Publication
[Patent Literature 12] International Publication No. WO 2004/087815 Booklet
[Patent Literature 13] International Publication No. WO 2002/034844 Booklet
[Patent Literature 14] Japanese Patent Laid-Open No. 2004-75986 A Publication
[Patent Literature 15] International Publication No. WO 2007/091631 Booklet
[Patent Literature 16] International Publication No. WO 2007/116933 Booklet
[Patent Literature 17] International Publication No. WO 2008/111635 Booklet

SUMMARY OF THE INVENTION

Problems to Be Solved by the Invention

The present invention has an object to provide a porphyrazine coloring matter or a salt thereof which has a good hue as a cyan ink, is excellent in ozone fastness and water fastness regardless of the level of the coloring matter concentration, hardly causes bronze phenomenon, and in addition, is suitable for inkjet recording where a high print density can be obtained; and an ink composition containing it.

Means of Solving the Problems

The present inventors have studied to provide a coloring matter having a good hue, a high print density and excellent light and ozone fastnesses and causing no bronze phenomenon and have found that a certain porphyrazine coloring matter represented by the following formula (1) can solve the above-described problems, and the present invention has been completed.

That is, the present invention relates to:
1)
A porphyrazine coloring matter or a salt thereof represented by the following formula (1)

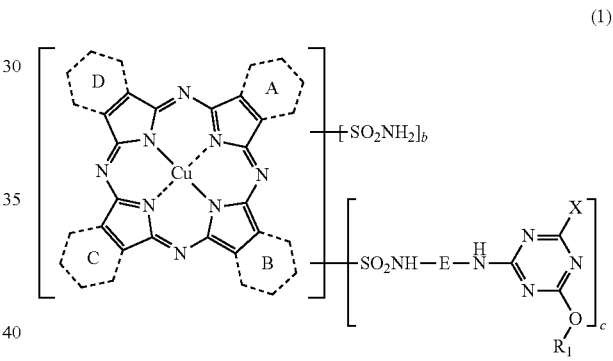

[wherein,
the rings of A to D represented by broken lines each independently represent a benzene ring or a 6-membered nitrogen-containing heteroaromatic ring fused to a porphyrazine ring, where the number of the nitrogen-containing heteroaromatic ring is over 0.00 and 3.00 or less as an average value and the rest are benzene rings,
E represents C2-C12 alkylene,
X is a sulfoanilino group, a carboxyanilino group, a phosphonoanilino group, a sulfonaphthylamino group, a carboxynaphthylamino group or a phosphononaphthylamino group and may further have, as a substituent, at least one kind of group selected from the group consisting of a sulfo group, a carboxy group, a phosphono group, a sulfamoyl group, a carbamoyl group, a hydroxy group, a C1-C6 alkoxy group, an amino group, a mono C1-C4 alkylamino group, a di C1-C4 alkylamino group, a monoarylamino group, a diarylamino group, a C1-C3 alkylcarbonylamino group, an ureide group, a C1-C6 alkyl group, a nitro group, a cyano group, a halogen atom, a C1-C6 alkylsulfonyl group and a C1-C6 alkylthio group,
$R_1$ represents a C1-C6 alkyl group,
b is, as an average value, 0.00 or more and less than 3.90,
c is, as an average value, 0.10 or more and less than 4.00, and the sum of b and c is, as an average value, 1.00 or more and less than 4.00.], 2)
The porphyrazine coloring matter or a salt thereof according to the above-described 1), wherein the 6-membered nitrogen-containing heteroaromatic ring represented by the rings of A to D is a pyridine ring or a pyrazine ring,
3)
The porphyrazine coloring matter or a salt thereof according to the above-described 1) or 2), which is obtained by reaction of a porphyrazine compound represented by the following formula (2) with an organic amine represented by the following formula (3) in the presence of ammonia,

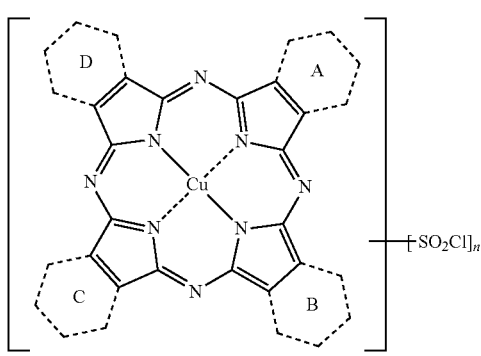

(2)

[in the formula (2), the rings of A to D have the same meanings as those described in the above 1), and n is 1.00 or more and less than 4.00]

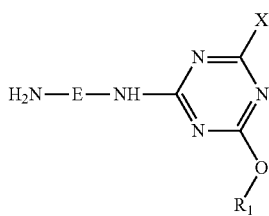

(3)

[in the formula (3), E, X and $R_1$ have the same meanings as those described in the above 1)],
4)
The porphyrazine coloring matter or a salt thereof according to the above-described 1) or 2), wherein
E is C2-C4 alkylene,
$R_1$ is a C1-C3 alkyl group, and
X is a sulfoanilino group, a carboxyanilino group, a phosphonoanilino group, a sulfonaphthylamino group, a carboxynaphthylamino group or a phosphononaphthylamino group and further has, as a substituent, 0 to 3 of at least one kind of group selected from the group consisting of a sulfo group, a carboxy group, a phosphono group, a hydroxy group, a C1-C6 alkoxy group, a C1-C3 alkylcarbonylamino group, an ureide group, a nitro group and a chlorine atom,
5)
The porphyrazine coloring matter or a salt thereof according to the above-described 4), wherein
E is straight-chain C2-C4 alkylene, and
X is a sulfoanilino group or a carboxyanilino group and further has, as a substituent, 0 to 2 of at least one kind of group selected from the group consisting of a sulfo group, a carboxy group, a hydroxy group, a C1-C6 alkoxy group, a nitro group and a chlorine atom, 6)
The porphyrazine coloring matter or a salt thereof according to the above-described 1) or 2), wherein
the nitrogen-containing heteroaromatic rings for the rings of A to D are each independently a pyridine ring fused at the 2- and 3-positions or the 3- and 4-positions; or a pyrazine ring fused at the 2- and 3-positions,
E is ethylene or propylene, and
X is a sulfoanilino group or a carboxyanilino group and further has, as a substituent, 0 to 2 of at least one kind of group selected from the group consisting of a sulfo group, a carboxy group, a hydroxy group, a C1-C6 alkoxy group, a nitro group and a chlorine atom,
7)
The porphyrazine coloring matter or a salt thereof according to the above-described 1), wherein
the nitrogen-containing heteroaromatic rings for the rings of A to D are each independently a pyridine ring fused at the 2- and 3-positions or the 3- and 4-positions.
E is ethylene or propylene, and
X is a sulfoanilino group or a sulfonaphthylamino group, where the sulfoanilino group further has, as a substituent, 0 to 2 groups selected from the group consisting of a sulfo group, a carboxy group, a hydroxy group, a C1-C6 alkoxy group, an amino group, a mono C1-C4 alkylamino group, a di C1-C4 alkylamino group, a C1-C3 alkylcarbonylamino group, a C1-C6 alkyl group, a nitro group, a chlorine atom, a C1-C6 alkylsulfonyl group and a C1-C6 alkylthio group, and the sulfonaphthylamino group further has, as a substituent, 1 or 2 groups selected from the group consisting of a sulfo group, a hydroxy group and a nitro group,
8)
The porphyrazine coloring matter or a salt thereof according to the above-described 1), wherein
the nitrogen-containing heteroaromatic rings for the rings of A to D are each independently a pyridine ring fused at the 2- and 3-positions or the 3- and 4-positions, where the number thereof is, as an average value, over 0.00 and 3.00 or less and the number of the rest benzene ring is, as an average value, 1.00 or more and less than 4.00,
E is ethylene,
X is a disulfoanilino group or a sulfonaphthylamino group, where the sulfonaphthylamino group further has, as a substituent, 1 or 2 of one or two kinds of group selected from the group consisting of a sulfo group and a hydroxy group,
$R_1$ is a C1-C4 alkyl group,
b is, as an average value, 0.00 or more and less than 3.90,
c is, as an average value, 0.10 or more and less than 4.00, and
the sum of b and c is, as an average value, 1.00 or more and less than 4.00,
9)
An ink composition containing the porphyrazine coloring matter or a salt thereof according to any one of the above-described 1) to 8), as a coloring matter,
10)
The ink composition according to the above-described 9), which further contains an organic solvent,
11)
The ink composition according to the above-described 10), which is for inkjet recording,
12)
A method for inkjet recording, wherein recording is performed on a record-receiving material by discharging an ink droplet of an ink composition containing the porphyrazine coloring matter or a salt thereof according to any one of the above-described 1) to 8) by responding to a recording signal,
13)
The method for inkjet recording according to the above-described 12), wherein the record-receiving material is a communication sheet, 14)
The method for inkjet recording according to the above-described 13), wherein the communication sheet is a sheet subjected to surface treatment and said sheet is a sheet having an ink-receiving layer containing white inorganic pigment particles on the support,
15)
A container containing an ink composition containing the porphyrazine coloring matter or a salt thereof according to any one of the above-described 1) to 8),
16)
An inkjet printer comprising the container according to the above-described 15),
17)
A colored product colored with an ink composition containing the porphyrazine coloring matter or a salt thereof according to any one of the above-described 1) to 8),
18)
The porphyrazine coloring matter or a salt thereof according to the above-described 1) to 8), wherein X is a disulfoanilino group or a disulfonaphthylamino group which may be substituted by a hydroxy group,
19)
The porphyrazine coloring matter or a salt thereof according to the above-described 18), wherein X is a disulfoanilino group,
20)
An ink composition containing the porphyrazine coloring matter or a salt thereof according to the above-described 1), or the porphyrazine coloring matter or a salt thereof according to the above-described 1) or the above-described 19) where X is a disulfoanilino group or a disulfonaphthylamino group which may be substituted by a hydroxy group, water and an organic solvent.

Effect of the Invention

The ink composition containing the coloring matter of the present invention or a salt thereof has a good hue as a cyan ink. In addition, the recorded image obtained by the ink composition of the present invention has excellent ozone fastness and good water fastness regardless of the level of the coloring matter concentration in the recorded image and hardly causes bronze phenomenon, whereby recorded images extremely excellent in the balance of fastness properties and quality can be obtained by the ink composition of the present invention.

Further, the coloring matter of the present invention has a high print density and can lower the coloring matter concentration in recorded images, resulting in reduction of printing cost.

Therefore, the porphyrazine coloring matter of the present invention or a salt thereof and a cyan ink composition containing this are extremely useful as an ink for various recordings, particularly for inkjet recording.

MODE FOR CARRYING OUT THE INVENTION

The present invention will be more specifically explained. The coloring matter of the present invention or a salt thereof is represented by the above formula (1) and exhibits cyan color, so it can be used as a coloring matter for cyan ink.

The porphyrazine ring having the rings of A to D in the above formula (1) is tetrabenzoporphyrazine (usually referred to as phthalocyanine) where over 0 and 3 or less, as an average value, of the four benzo (benzene) rings is replaced by a nitrogen-containing heteroaromatic ring.

In this regard, in the present description, "the porphyrazine coloring matter of the present invention or a salt thereof" will be hereinafter described for simplification as merely "the porphyrazine coloring matter of the present invention" or "the coloring matter of the present invention" for convenience.

In the above formula (1), the nitrogen-containing heteroaromatic rings for the rings of A to D (the four rings of A, B, C and D) represented by the broken lines include, for example, a nitrogen-containing heteroaromatic ring containing 1 or 2 nitrogen atoms, such as a pyridine ring, a pyrazine ring, pyrimidine ring and a pyridazine ring. Said nitrogen-containing heteroaromatic ring are, each independently, preferably a pyridine ring (pyridine ring fused at the 2- and 3-positions or the 3- and 4-positions) or a pyrazine ring (pyrazine ring fused at the 2- and 3-positions), and more preferably a pyridine ring (pyridine ring fused at the 2- and 3-positions or the 3- and 4-positions). In some cases, said nitrogen-containing heteroaromatic ring is more preferably a pyridine ring fused at the 3- and 4-positions, particularly in terms of hue, fastness properties and the like.

In this regard, in the present description, the positions in the expression "a pyridine ring or a pyrazine ring fused at the 2- and 3-positions" and the like are fusion positions when the nitrogen atom of the pyridine ring or the pyrazine ring is regarded as the 1-position.

As the number of the nitrogen-containing heteroaromatic ring increases, the ozone fastness is improved but bronzing tends to easily occur, in general. The number of the nitrogen-containing heteroaromatic ring may be appropriately controlled in consideration of ozone fastness and bronzing so as to select a good balance ratio.

The number of the nitrogen-containing heteroaromatic ring depends on the kind of heterocyclic ring and is difficult to be generally specified, but it is in the range of, as an average value, usually more than 0.0 and 3.0 or less, preferably 0.2 or more and 2.0 or less, more preferably 0.5 or more and 1.75 or less (where 0.5 or more and 1.5 or less is more preferable), and further preferably 0.75 or more and 1.5 or less. The rest rings of A to D are benzene rings. The benzene ring for the rings of A to D is therefore, as an average value, usually 1.0 or more and less than 4.0 preferably 2.0 or more and 3.8 or less, more preferably 2.25 or more and 3.5 or less (where 2.5 or more and 3.5 or less is more preferable) and further preferably 2.5 or more and 3.25 or less. In this regard, the porphyrazine coloring matter of the present invention is a coloring matter mixture of plural coloring matters with a different number of the nitrogen-containing heterocyclic rings, as is clear from that the number of the nitrogen-containing heterocyclic ring for the rings of A to D is shown as an average value. It is difficult to isolate said mixture of coloring matters into each coloring matter, and there is no trouble even though said mixture is regarded as a single compound shown in said average value, whereby said mixture is treated as a single compound shown as an average value, in the present invention.

In this regard, in the present description, the number of said nitrogen-containing heteroaromatic ring is described as a figure down to the first or second decimal place by rounding off the second or third decimal place, unless otherwise specifically noted. However, when the number of the nitrogen-containing heteroaromatic ring is 1.375 and the number of the benzene ring is 2.625 for example, the former is 1.38 and the latter is 2.63 after the both are rounded off, resulting that the total of the both is over 4.00 of the total of the rings of A to D. In such a case, for convenience description, the third decimal place for the nitrogen-containing heteroaromatic ring is dropped and the third decimal place for the benzene ring is rounded off so that the former is 1.37 and the latter is 2.63, whereby the total of the both is 4.

In addition, b and c in the formula (1) are described as figures down to the first or second decimal place by rounding off the second or third decimal place according to necessity as described later, while in the same case as above, they are described after the second or third decimal place of b is dropped and the second or third decimal place of c is rounded off so as to bring in line with the number of the benzene ring.

In the above formula (1), C2-C12 alkylene for E includes straight-chain, branched-chain or cyclic alkylene, preferably straight-chain or cyclic and more preferably straight-chain. The range of the carbon atom number includes usually C2-C12, preferably C2-C6, more preferably C2-C4 and further preferably C2-C3.

Specific examples of C2-C12 alkylene for E include straight-chain C2-C12 alkylene such as ethylene, propylene, butylene, pentylene, hexylene, heptylene, octylene, nonylene, decylene, undecylene and dodecylene; branched-chain C2-C12 alkylene such as 2-methylethylene; cyclic C2-C12 alkylene such as cyclopropylenediyl, 1,2- or 1,3-cyclopentylenediyl and 1,2-, 1,3- or 1,4-cyclohexylenediyl; and the like. Preferable specific examples of C2-C12 alkylene for E are ethylene, propylene, butylene, pentylene and hexylene, more preferably ethylene, propylene and butylene, further preferably ethylene and propylene and particularly preferably ethylene.

In the above formula (1), X represents a sulfoanilino group, a carboxyanilino group, a phosphonoanilino group, a sulfonaphthylamino group, a carboxynaphthylamino group or a phosphononaphthylamino, and may further have a substituent as described above. In this regard, in the present invention, when simply mentioned as a sulfoanilino group, a carboxyanilino group, a phosphonoanilino group, a sulfonaphthylamino group, a carboxynaphthylamino group or a phosphononaphthylamino group, it means each group having, as a substituent, one sulfo, carboxy or phosphono group on the phenyl group or the naphthyl group, unless otherwise specifically noted. For example, X includes a sulfoanilino group such as 2-sulfoanilino, 3-sulfoanilino and 4-sulfoanilino; a carboxyanilino group 2-carboxyanilino, 3-carboxyanilino and 4-carboxyanilino; a phosphonoanilino group such as 2-phosphonoanilino, 3-phosphonoanilino and 4-phosphonoanilino; a sulfonaphthylamino group such as 3-sulfo-1-naphthylamino, 6-sulfo-1-naphthylamino, 8-sulfo-1-naphthylamino, 1-sulfo-2-naphthylamino, 3-sulfo-2-naphthylamino, 4-sulfo-2-naphthylamine, 5-sulfo-2-naphthylamine, 6-sulfo-2-naphthylamino, 7-sulfo-2-naphthylamino and 8-sulfo-2-naphthylamino; a carboxynaphthylamino group such as 3-carboxy-1-naphthylamino, 6-carboxy-1-naphthylamino, 1-carboxy-2-naphthylamino and 6-carboxy-2-naphthylamino; phosphononaphthylamino such as 6-phosphono-1-naphthylamino; and the like, preferably a sulfoanilino group, a carboxyanilino group, a phosphonoanilino group or a sulfonaphthylamino group, more preferably a sulfoanilino group or a sulfonaphthylamino group and particularly preferably a sulfoanilino group.

In this regard, the term "phosphono" means a phosphoric group [—P(O)(OH)$_2$].

The above-described sulfoanilino, carboxyanilino, phosphonoanilino, sulfonaphthylamino, carboxynaphthylamino or phosphononaphthylamino group in X may further have, as a substituent, a group selected from the group (hereinafter, the group is referred to as "the group consisting of twenty kinds of substituent") consisting of (1) a sulfo group; (2) a carboxy group; (3) a phosphono group; (4) a sulfamoyl group; (5) a carbamoyl group; (6) a hydroxy group; (7) a C1-C6 alkoxy group; (8) an amino group; (9) a mono C1-C4 alkylamino group; (10) a di C1-C4 alkylamino group; (11) a monoarylamino group; (12) a diarylamino group; (13) a C1-C3 alkylcarbonylamino group; (14) an ureide group; (15) a C1-C6 alkyl group; (16) a nitro group; (17) a cyano group; (18) a halogen atom; (19) a C1-C6 alkylsulfonyl group; and (20) a C1-C6 alkylthio group, (hereinafter they are also referred to as the further substituents in short).

The substitution number of a group (further substituent) selected from the group consisting of the above-described twenty kinds of substituent in X is usually 0 to 4 preferably 0 to 3, more preferably 0 to 2 and further preferably 0 or 1. When the above-described substitution number is other than 0, the number of the kind of further substituent may be one to four kinds according to the number of the further substituents or 1 to 4 of the same kind group. It is preferably one or two kinds. More preferably, it is one kind when X is an anilino group such as the above sulfoanilino group, and it is one or two kinds when X is a naphthylamino group such as the above sulfonaphthylamino group, where a sulfo group is preferable for the former and a hydroxy group or/and a sulfo group are preferable for the latter, and where a sulfo group is preferable in the case of one kind and a hydroxy group and a sulfo group are preferable in the case of two kinds.

The substitution position for the further substituent is not particularly limited.

The C1-C6 alkoxy group for the further substituent includes straight-chain, branched-chain or cyclic C1-C6 alkoxy, preferably straight-chain or branched-chain C1-C6 alkoxy and more preferably straight-chain C1-C6 alkoxy. The range of the carbon atom number of said alkoxy group includes usually C1-C6, preferably C1-C4 and more preferably C1-C3.

Specific examples of said C1-C6 alkoxy group includes straight-chain C1-C6 alkoxy such as methoxy, ethoxy, n-propoxy, n-butoxy, n-pentoxy and n-hexyloxy; branched-chain C1-C6 alkoxy such as isopropoxy, isobutoxy, sec-butoxy, t-butoxy, isopentyloxy and isohexyloxy; cyclic C1-C6 alkoxy such as cyclopropoxy, cyclopentoxy and cyclohexyloxy; and the like. Among them, methoxy or ethoxy is preferable and methoxy is particularly preferable.

The mono C1-C4 alkylamino group for the further substituent includes straight-chain or branched-chain C1-C4 alkylamino, and the range of the carbon atom number is usually C1-C4 and preferably C1-C3. Specific examples of said mono C1-C4 alkylamino group include straight-chain C1-C4 alkylamino such as methylamino, ethylamino, n-propylamino and n-butylamino; branched-chain C1-C4 alkylamino such as isopropylamino, isobutylamino, sec-butylamino and t-butylamino; and the like. Among them, methylamino is preferable.

The di C1-C4 alkylamino group for the further substituent includes a dialkylamino group independently having two groups of straight-chain or branched-chain C1-C4 alkyl listed for the above mono alkylamino group, preferably straight-chain or branched-chain C1-C3 alkyl. Specific examples of said di C1-C4 alkylamino group include dimethylamino, diethylamino, methylethylamino and the like. Among them dimethylamino is preferable.

The monoarylamino group for the further substituent includes a mono C6-C10 aromatic amino group, preferably a phenylamino group or a naphthylamino group and more preferably a phenylamino group.

The diarylamino group for the further substituent includes a diarylamino group independently having two C6-C10 aromatic listed in the above monoarylamino group, preferably phenyl or naphthyl and more preferably phenyl. Said diarylamino group includes an amino group having preferably two of the same aryl and more preferably two of the same phenyl. Specific examples of said diarylamino group include diphenylamino.

The C1-C3 alkylcarbonylamino group for the further substituent includes a carbonylamino group substituted by straight-chain or branched-chain C1-C3 alkyl, preferably a carbonylamino group substituted by straight-chain C1-C3 alkyl. Specific examples thereof includes a carbonylamino group substituted by straight-chain C1-C3 alkyl, such as methylcarbonylamino (acetylamino), ethylcarbonylamino and n-propylcarbonylamino; and a carbonylamino group substituted by branched-chain C1-C3 alkyl, such as isopropylcarbonylamino. Among them, acetylamino is preferable.

The C1-C6 alkyl group for the further substituent includes a straight-chain, branched-chain or cyclic C1-C6, preferably C1-C4 and more preferably C1-C3 alkyl group. Among them, a straight-chain or branched-chain alkyl group is preferable and a straight-chain alkyl group is more preferable. Specific examples thereof include straight-chain C1-C6 alkyl such as methyl, ethyl, n-propyl, n-butyl, n-pentyl and n-hexyl; branched-chain C1-C6 alkyl such as isopropyl, isobutyl, sec-butyl, t-butyl, isopentyl and isohexyl; cyclic C1-C6 alkyl such as cyclopropyl, cyclopentyl and cyclohexyl; and the like. Among them, methyl is preferable.

The halogen atom for the further substituent includes a fluorine atom, a chlorine atom and a bromine atom, preferably a fluorine atom or a chlorine atom and more preferably a chlorine atom.

The C1-C6 alkylsulfonyl group for the further substituent includes a straight-chain or branched-chain C1-C6 alkylsulfonyl group, preferably a straight-chain or branched-chain C1-C4 alkylsulfonyl group and more preferably a straight-chain or branched-chain C1-C3 alkylsulfonyl group. Among them, a straight-chain C1-C3 alkylsulfonyl group is preferable. Specific examples thereof include straight-chain C1-C6 alkylsulfonyl such as methanesulfonyl (methylsulfonyl), ethanesulfonyl (ethylsulfonyl), n-propanesulfonyl (n-propylsulfonyl), n-butylsulfonyl, n-pentylsulfonyl and n-hexylsulfonyl; branched-chain C1-C6 alkylsulfonyl such as isopropylsulfonyl and isobutylsulfonyl; and the like.

The C1-C6 alkylthio group for the further substituent includes a straight-chain or branched-chain C1-C6 alkylthio group, preferably a straight-chain or branched-chain C1-C4 alkylthio group and more preferably a straight-chain or branched-chain C1-C3 alkylthio group. Among them, a straight-chain C1-C3 alkylthio group is preferable. Specific examples thereof include straight-chain C1-C6 alkylthio such as methylthio, ethylthio, n-propylthio, n-butylthio, n-pentylthio and n-hexylthio; branched-chain C1-C6 alkylthio such as isopropylthio, isobutylthio, t-butylthio, isopentylthio and isohexylthio; and the like.

As the further substituent, a sulfo group, a carboxy group, a phosphono group, a hydroxy group, a C1-C6 alkoxy group, a C1-C3 alkylcarbonylamino group, an ureide group, a nitro group and a chlorine atom are preferable, and a sulfo group, a carboxy group, a hydroxy group, a C1-C6 alkoxy group, a nitro group and a chlorine atom are more preferable. The substitution number of the further substituent is usually 0 to 4, preferably 0 to 3, more preferably 0 to 2 and further preferably 0 or 1.

As the further substituent, a sulfo group is the most preferable. In particular, the further substituent is most preferably one sulfo group when the further substituent is substituted on the phenyl nucleus except otherwise noted, and the substitution number is 1 or 2 when the further substituent is substituted on the naphthyl nucleus, where a sulfo group is most preferable when the substitution number is one, and one sulfo group and one hydroxy group are most preferable when the substitution number is 2.

As the further substituent in the case where X is a sulfoanilino group, a sulfo group, a carboxy group, a hydroxy group, a C1-C6 alkoxy group, an amino group, a mono C1-C4 alkylamino group, a di C1-C4 alkylamino group, a C1-C3 alkylcarbonylamino group, a C1-C6 alkyl group, a nitro group, a chlorine atom, a C1-C6 alkylsulfonyl group and an alkylthio group are preferable, a sulfo group, a carboxy group, a hydroxy group, a C1-C6 alkoxy group, a nitro group and a chlorine atom are more preferable, and a sulfo group is particularly preferable.

As the further substituent in the case where X is a carboxyanilino group, a carboxy group, a hydroxy group, a C1-C6 alkoxy group, a nitro group and a chlorine atom are preferable, and in some cases, a carboxy group, a sulfamoyl group and a hydroxy group are preferable.

In the case where X is a phosphonoanilino group, a phosphonoanilino group having no further substituent is preferable.

As the further substituent in the case where X is a sulfonaphthylamino group, a sulfo group, a hydroxy group and a nitro group are preferable, one having 1 or 2 of the group selected from the group consisting of a sulfo group and a hydroxy group is more preferable, one having one sulfo group or having both one sulfo group and one hydroxy group is further preferable, and the latter is most preferable.

As the further substituent in the case where X is a carboxynaphthylamino group, a carboxy group and a hydroxy group are preferable.

In the case where X is phosphononaphthylamino group, phosphononaphthylamino group having no further substituent is preferable.

Specific examples in the case where X in the above formula (1) is a sulfoanilino group which may have a further substituent include:

a sulfoanilino group further having 0 or 1 sulfo group as a substituent, such as 2-sulfoanilino, 3-sulfoanilino, 4-sulfoanilino, 2,4-disulfoanilino and 2,5-disulfoanilino; a sulfoanilino group further having one carboxy group as a substituent, such as 2-carboxy-4-sulfoanilino and 2-carboxy-5-sulfoanilino (in other words, carboxyanilino group having one sulfo group as a substituent);

a sulfoanilino group further having one C1-C6 alkoxy group as a substituent, such as 4-methoxy-2-sulfoanilino, 4-ethoxy-2-sulfoanilino and 4-ethoxy-6-sulfoanilino;

a sulfoanilino group further having one amino group as a substituent, such as 3-amino-4-sulfoanilino;

a sulfoanilino group further having one mono C1-C4 alkylamino group as a substituent, such as 4-methylamino-5-sulfoanilino;

a sulfoanilino group further having one di C1-C4 alkylamino group as a substituent, such as 4-dimethylamino-5-sulfoanilino;

a sulfoanilino group further having one C1-C6 alkyl group as a substituent, such as 2-methyl-5-sulfoanilino and 3-methyl-6-sulfoanilino;

a sulfoanilino group further having one mono- or diarylamino group as a substituent, such as 4-anilino-3-sulfoanilino;

a sulfoanilino group further having one C1-C3 alkylcarbonylamino group as a substituent, such as 4-acetylamino-2-sulfoanilino;

a sulfoanilino group further having 1 or 2 halogen atoms, preferably chlorine atom as a substituent, such as 2-chloro-5-sulfoanilino and 3,5-dichloro-4-sulfoanilino;

a sulfoanilino group further having one C1-C6 alkylsulfonyl group as a substituent, such as 4-methylsulfonyl-5-sulfoanilino and 4-hexylsulfonyl-2-sulfoanilino;

a sulfoanilino group further having one C1-C6 alkylthio group as a substituent, such as 4-methylthio-2-sulfoanilino and 4-hexylthio-2-sulfoanilino;

a sulfoanilino group having each one of two kinds of group selected from the above further substituents, such as 3-carboxy-4-hydroxy-5-sulfoanilino, 2-hydroxy-5-nitro-3-sulfoanilino, 2-methoxy-4-nitro-5-sulfoanilino, 3-methyl-6-methoxy-4-sulfoanilino and 2-hydroxy-3-acetylamino-5-sulfoanilino; and the like.

Among the above-described ones, a disulfoanilino group such as 2,4-disulfoanilino and 2,5-disulfoanilino is more preferable and 2,5-disulfoanilino is most preferable.

Specific examples in the case where X in the above formula (1) is a carboxyanilino group which may have the above further substituent include:
a carboxyanilino group further having 0 or 1 carboxy group as a substituent, such as 2-carboxyanilino, 3-carboxyanilino, 4-carboxyanilino and 3,5-dicarboxyanilino;
a carboxyanilino group further having one sulfamoyl group as a substituent, such as 4-aminosulfonyl-2-carboxyanilino;
a carboxyanilino group further having one hydroxy group as a substituent, such as 3-carboxy-4-hydroxyanilino;
a carboxyanilino group further having each one of two kinds of group selected from the above further substituents, such as 4-hydroxy-3-sulfo-5-carboxyanilino; and the like.

Specific examples of said phosphonoanilino group in the case where X in the above formula (1) is a phosphonoanilino group which may have the above further substituent include a phosphonoanilino group such as 2-phosphonoanilino, 3-phosphonoanilino and 4-phosphonoanilino, and the like.

Specific examples in the case where X in the above formula (1) is a sulfonaphthylamino group which may have the above further substituent include: a sulfonaphthylamino group (di- or trisulfonaphthylamino group) having 1 or 2 sulfo groups as the further substituent, such as 3,6-disulfo-1-naphthylamino, 1,5-disulfo-2-naphthylamino, 3,8-disulfo-1-naphthylamino, 4,8-disulfo-2-naphthylamino, 5,7-disulfo-2-naphthylamino, 6,8-disulfo-2-naphthylamino, 3,6,8-trisulfo-1-naphthylamino and 3,6,8-trisulfo-2-naphthylamino;
a sulfonaphthylamino group further having one hydroxy group as a substituent, such as 5-hydroxy-7-sulfo-2-naphthylamino;
a sulfonaphthylamino group having each one of two kinds of group selected from the further substituents, such as 3,6-disulfo-8-hydroxy-1-naphthylamino, 8-chloro-3,6-disulfonaphthalen-1-ylamino and 6-nitro-4,8-disulfo-2-naphthylamino; and the like.

Among the above-described ones, the sulfonaphthylamino group which may have a further substituent is more preferably a disulfonaphthylamino group or a hydroxydisulfonaphthylamino group and further preferably a hydroxydisulfonaphthylamino group.

Specific examples in the case where X in the above formula (1) is a carboxynaphthylamino group which may have a further substituent include: a carboxynaphthylamino group further having one carboxy group as a substituent, such as 1,6-dicarboxy-2-naphthylamino;
a carboxynaphthylamino group further having one hydroxy group as a substituent, such as 8-hydroxy-6-carboxy-1-naphthylamino;
a carboxynaphthylamino group further having each one of two kinds of group selected from the group consisting of the above twenty kinds of substituent as a substituent, such as 8-hydroxy-3,6-dicarboxy-1-naphthylamino; and the like.

Preferable X is a sulfoanilino group which may have a further substituent, a carboxyanilino group which may have a further substituent, or a sulfonaphthylamino group which may have a further substituent.

The first-described sulfoanilino group which may have a substituent may have, as a preferable further substituent, 1 or 2 of at least one kind of group selected from the group consisting of a sulfo group, a carboxy group, a hydroxy group, a C1-C6 alkoxy group, an amino group, a mono C1-C4 alkylamino group, a di C1-C4 alkylamino group, a C1-C3 alkylcarbonylamino group, a C1-C6 alkyl group, a nitro group, a chlorine atom, a C1-C6 alkylsulfonyl group and an alkylthio group, and among them, a sulfo group, a carboxy group, a hydroxy group, a C1-C6 alkoxy group, a nitro group and a chlorine atom are more preferable. The sulfoanilino group which may have a further substituent is further preferably a disulfoanilino group and most preferably 2,5-disulfoanilino.

The second-described carboxyanilino group which may have a further substituent, preferably, may have, as a further substituent, 1 or 2 of at least one kind of group selected from the group consisting of a sulfo group, a carboxy group, a hydroxy group, a C1-C6 alkoxy group, a nitro group and a chlorine atom.

The last-described sulfonaphthylamino group which may have a further substituent may have, as a preferable further substituent, 1 or 2 of at least one kind of group selected from the group consisting of a sulfo group, a hydroxy group and a nitro group. The sulfonaphthylamino group which may have a further substituent is more preferably the above-described disulfonaphthylamino or hydroxydisulfonaphthylamino group and most preferably the hydroxydisulfonaphthylamino group.

More preferable X is a sulfoanilino group which may have a further substituent or a sulfonaphthylamino group which may have a further substituent, and preferable, more preferable and most preferable groups among these groups are as described above.

More specifically, further preferable X can include a sulfoanilino group which may have one sulfo group as a further substituent, more preferably a sulfoanilino group (disulfoanilino group) having one sulfo group as a further substituent; a sulfonaphthylamino group (disulfonaphthylamino group or hydroxydisulfonaphthylamino group) having, as a further substituent, 1 or 2 of one or two kinds of group selected from a sulfo group and a hydroxy group, preferably one sulfo group or one sulfo group and one hydroxy group respectively, and further preferably a hydroxydisulfonaphthylamino group.

Most preferable group as X is a disulfoanilino group.

Among the above specific examples of X, 3,8-disulfo-1-naphthylamino, 4,8-disulfo-2-naphthylamino, 6,8-disulfo-2-naphthylamino, 3,6-disulfo-8-hydroxy-1-naphthylamino and 2,5-disulfoanilino are preferable, 3,6-disulfo-8-hydroxy-1-naphthylamino and 2,5-disulfoanilino are more preferable, and 2,5-disulfoanilino is particularly preferable.

In the above formula (1), the C1-C6 alkyl group for $R_1$ includes straight-chain, branched-chain or cyclic C1-C6 alkyl, preferably straight-chain or branched-chain C1-C6 alkyl and more preferably straight-chain C1-C6 alkyl. The range of the carbon atom number is usually C1-C6, preferably C1-C4 and more preferably C1-C3. Specific examples of the C1-C6 alkyl group for $R_1$ include straight-chain C1-C6 alkyl such as methyl, ethyl, n-propyl, n-butyl, n-pentyl and n-hexyl; branched C1-C6 alkyl such as isopropyl, isobutyl, sec-butyl, t-butyl, isopentyl and isohexyl; cyclic C1-C6 alkyl such as cyclopropyl, cyclobutyl, cyclopentyl and cyclohexyl; and the like.

Among them, methyl, ethyl or isopropyl is preferable, methyl or ethyl is more preferable, and methyl is further preferable.

In the present description, any of the numerical values described as b, c and the sum of b and c in the above formula (1) is an average value in the above porphyrazine coloring matter of the present invention. As well as described for the number of the nitrogen-containing heteroaromatic ring or the benzene ring for the rings of A to D, the porphyrazine coloring matter represented by the above formula (1) of the present invention is a mixture of plural coloring matters having different b and c values. It is difficult to isolate this mixture into each component and there is no problem even though it is treated as a compound having the same number of substituents as its average value, and that way is rather convenient, whereby in the present invention, said mixture is treated as a compound having the same number of substituents as its average value. Therefore, any of the numbers or the like of b, c, the nitrogen-containing heteroaromatic ring and the benzene ring described below is an average value unless otherwise specifically noted.

In the porphyrazine coloring matter represented by the above formula (1) of the present invention, b is 0.0 or more and less than 3.9, c is 0.1 or more and less than 4.0, and the sum of b and c is 1.0 or more and less than 4.0. In this case, the nitrogen-containing heteroaromatic ring for the rings of A to D is over 0.0 and 3.0 or less, and likewise the benzene ring is 1.0 or more and less than 4.0.

Preferably, the nitrogen-containing heteroaromatic ring for the rings of A to D is 0.2 or more and 2.0 or less, the benzene ring is 2.0 or more and 3.8 or less, b is 0.0 or more and 3.3 or less, c is 0.5 or more and 2.0 or less, and the sum of b and c is 2.0 or more and 3.8 or less.

More preferably, the nitrogen-containing heteroaromatic ring for the rings of A to D is 0.5 or more and 1.75 or less, the benzene ring is 2.25 or more and 3.5 or less, b is 0.45 or more and 3.0 or less, c is 0.5 or more and 1.8 or less, and the sum of b and c is 2.25 or more and 3.5 or less.

Further preferably, the nitrogen-containing heteroaromatic ring for the rings of A to D is 0.75 or more and 1.5 or less, the benzene ring is 2.5 or more and 3.25 or less, b is 0.9 or more and 2.55 or less, c is 0.7 or more and 1.6 or less, and the sum of b and c is 2.5 or more and 3.25 or less.

As b is larger, ozone fastness tends to improve but bronzing tends to occur, so the numbers of b and c may be appropriately controlled in consideration of ozone fastness and bronzing so as to select a good balance ratio.

In this regard, each of b and c represents the substitution number of a group enclosed in parentheses, any of said groups enclosed in parentheses (unsubstituted sulfamoyl group and substituted sulfamoyl group) is a group substituted on the benzene ring and not on the 6-membered nitrogen-containing heteroaromatic ring, whereby it is present on the benzene ring for the rings of A to D and not on the 6-membered nitrogen-containing heteroaromatic ring for the rings of A to D.

In this regard, in the present description, any of b, c and the sum of b and c is described as a figure down to the first or second decimal place by rounding off the second or third decimal place, according to necessity.

The coloring matter having preferable ones in the rings of A to D, E, X, $R_1$, b and c described above is preferable, the coloring matter where preferable ones are combined is more preferable, and the coloring matter where more preferable ones are combined is further preferable. The same goes for a combination of further preferable ones, a combination of preferable ones and more preferable ones, and the like.

Preferable porphyrazine coloring matters of the present invention can include porphyrazine coloring matters or a salt thereof according to (2) to (8), (18) and (19) described in the paragraph "Means of Solving the Problems", and also in addition, the below-described porphyrazine coloring matters or a salt thereof can be included as a preferable porphyrazine coloring matter of the present invention.

(i) The porphyrazine coloring matter or a salt thereof according to any one of the above 1) to 3), wherein: in the above formula (1),
X is a disulfoanilino group or a disulfonaphthylamino group which may be substituted by a hydroxy group,
E is C2-C4 alkylene, and
$R_1$ is a C1-C3 alkyl group.

(ii) The porphyrazine coloring matter or a salt thereof according to any one of the above 1) to 8), 18) and 19) and the above-described (i), wherein: in the above formula (1), the number of the nitrogen-containing heteroaromatic ring for the rings of A to D is 0.2 or more and 2.0 or less, and the number of the benzene ring for the rings of A to D is 2.0 or more and 3.8 or less, b is 0.0 or more and 3.3 or less, c is 0.5 or more and 2.0 or less, and the sum of b and c is 2.0 or more and 3.8 or less.

(iii) The porphyrazine coloring matter or a salt thereof according to any one of the above 1) to 8), 18) and 19) and the above-described (i) and (ii), wherein: in the above formula (1), the nitrogen-containing heteroaromatic ring for the rings of A to D is 0.5 or more and 1.75 or less, the benzene ring is 2.25 or more and 3.5 or less, b is 0.45 or more and 3.0 or less, c is 0.5 or more and 1.8 or less, and the sum of b and c is 2.25 or more and 3.5 or less.

(iv) The porphyrazine coloring matter or a salt thereof according to any one of the above 1) to 8), 18) and 19) and the above-described (i) to (iii), wherein: in the above formula (1), the nitrogen-containing heteroaromatic ring for the rings of A to D is 0.5 or more and 1.5 or less, and the benzene ring is 2.5 or more and 3.5 or less.

(v) The porphyrazine coloring matter or a salt thereof according to the above-described (iv), wherein b is 0.45 or more and 3.0 or less, c is 0.5 or more and 3 or less, and the sum of b and c is 2.5 or more and 3.5 or less.

(vi) The porphyrazine coloring matter or a salt thereof according to any one of the above 1) to 8), 18) and 19) and the above-described (i) to (v), wherein: in the above formula (1), the nitrogen-containing heteroaromatic rings for the rings of A to D are each independently a pyridine ring fused at the 2- and 3-positions or at the 3- and 4-positions.

(vii) The porphyrazine coloring matter or a salt thereof according to the above-described (vi), wherein the nitrogen-containing heteroaromatic ring for the rings of A to D is a pyridine ring fused at the 2- and 3-positions, b is 1 or more and 3.0 or less, c is 0.5 or more and 2 or less, and the sum of b and c is 2.5 or more and 3.5 or less.

(viii) The porphyrazine coloring matter or a salt thereof according to the above-described (vii), wherein b is 1.5 or more and 2.5 or less, c is 0.5 or more and 1 or less, and the sum of b and c is 2.5 or more and 3.5 or less.

(ix) The porphyrazine coloring matter or a salt thereof according to any one of the above 1) to 8), 18) and 19) and the above-described (i) to (viii), wherein: in the above formula (1), $R_1$ is methyl or ethyl, further preferably methyl.

(x) The porphyrazine coloring matter or a salt thereof according to any one of the above 1) to 8), 18) and 19) and the above-described (i) to (ix), wherein: in the above formula (1), X is 2,5-disulfoanilino.

The porphyrazine coloring matter of the present invention represented by the above formula (1) can form a salt by using a sulfo group, a carboxy group, a phosphono group and the like which it has within the molecule. When forming a salt, it is preferable to form a salt with a counter cation of an inorganic metal, an ammonia or an organic base or the like.

The inorganic metal includes an alkali metal and an alkali earth metal. Examples of the alkali metal include lithium, sodium, potassium and the like. The alkali earth metal includes, for example, calcium, magnesium and the like.

The organic base includes an organic amine in particular, for example, C1-C3 alkylamine such as methylamine and ethylamine, and mono-, di- or tri-C1-C4 alkanolamine such as monoethanolamine, diethanolamine, triethanolamine, monoisopropanolamine, diisopropanolamine and triisopropanolamine.

Among salts using the above-described counter cation, preferable one includes an alkali metal salt such as sodium, potassium and lithium; an salt with mono-, di- or tri-C1-C4 alkanolamine such as monoethanolamine, diethanolamine, triethanolamine, monoisopropanolamine, diisopropanolamine and triisopropanolamine; and an ammonium salt. In general, an alkali metal salt is more preferable.

In addition, there are also some cases where a salt of the porphyrazine coloring matter of the present invention is changed in physical properties such as solubility and the like or in ink performance when used as an ink, particularly in performance and the like relating to fastness properties, depending on the kind of salt. For this reason, it is preferred in some cases to select the kind of salt according to the intended ink performance and the like.

Specific examples of the rings of A to D, E, X and $R_1$ and average values of the numbers of b and c in the porphyrazine coloring matter of the present invention represented by the above formula (1) are shown in the below-described Table 1.

The below-described examples show typical coloring matters in order to specifically explain the coloring matter of the present invention, and the coloring matter of the present invention is not limited to the below-described examples.

In addition, for example, when the nitrogen-containing heteroaromatic ring of the rings of A to D is a pyridine ring, positional isomers are present with regard to the substitution position of the nitrogen-containing heteroaromatic ring and the substitution position of the nitrogen atom in the nitrogen-containing heteroaromatic ring, as described later, whereby when the coloring matter of the present invention is synthesized, the coloring matter to be obtained is a mixture of these isomers. Further, it is a mixture of compounds with different numbers of pyridine rings and different numbers of b and c as described above. It is difficult to isolate each of these components as described above, and it is also difficult to identify isomers by analysis. For this reason, the mixture as it is, usually, treated as each single compound just with an average value of the number of the nitrogen-containing heteroaromatic rings and average values of the numbers of b and c, as described above. In the present description, when the coloring matter of the present invention is shown with a structural formula, the rings of A to D are denoted by broken lines for convenience, and in the below-described table, one typical structure of the rings of A to D is described in the columns of A to D.

The numbers of b and c in the below-described table are described by rounding off the first decimal place, in order to avoid complication. In this regard, "2,3-pyrido" or "3,4-pyrido" in Table 1 respectively mean a pyridine ring fused to the porphyrazine ring at the 2- and 3-positions or the 3- and 4-positions, and "benzo" means a benzene ring fused to the porphyrazine ring, respectively.

TABLE 1

| No. | A | B | C | D | E | X | $R_1$ | b | c |
|---|---|---|---|---|---|---|---|---|---|
| 1 | 2,3-Pyrido | Benzo | Benzo | Benzo | Ethylene | 2,5-Disulfoanilino | Methyl | 2 | 1 |
| 2 | 2,3-Pyrido | Benzo | Benzo | Benzo | Ethylene | 2,4-Disulfoanilino | Methyl | 2 | 1 |
| 3 | 2,3-Pyrido | Benzo | Benzo | Benzo | Ethylene | 2-Sulfoanilino | Methyl | 2 | 1 |
| 4 | 2,3-Pyrido | Benzo | Benzo | Benzo | Ethylene | 3-Sulfoanilino | Methyl | 2 | 1 |
| 5 | 2,3-Pyrido | Benzo | Benzo | Benzo | Ethylene | 4-Sulfoanilino | Methyl | 2 | 1 |
| 6 | 2,3-Pyrido | Benzo | Benzo | Benzo | Ethylene | 2,5-Disulfoanilino | Ethyl | 2 | 1 |
| 7 | 2,3-Pyrido | Benzo | Benzo | Benzo | Ethylene | 2,5-Disulfoanilino | Isopropyl | 2 | 1 |
| 8 | 2,3-Pyrido | Benzo | Benzo | Benzo | Ethylene | 4,8-Disulfo-2-naphthylamino | Butyl | 2 | 1 |
| 9 | 2,3-Pyrido | Benzo | Benzo | Benzo | Ethylene | 1,5-Disulfo-2-naphthylamino | Pentyl | 2 | 1 |
| 10 | 2,3-Pyrido | Benzo | Benzo | Benzo | Ethylene | 3,6-Disulfo-1-naphthylamino | Hexyl | 2 | 1 |
| 11 | 2,3-Pyrido | Benzo | 2,3-Pyrido | Benzo | Ethylene | 3,6,8-Trisulfo-1-naphthylamino | Methyl | 1 | 1 |
| 12 | Benzo | 2,3-Pyrido | 2,3-Pyrido | 2,3-Pyrido | Ethylene | 2,5-Disulfoanilino | Methyl | 0 | 1 |
| 13 | Benzo | 2,3-Pyrido | 2,3-Pyrido | Benzo | Ethylene | 2,5-Disulfoanilino | Methyl | 1 | 1 |
| 14 | 2,3-Pyrido | Benzo | Benzo | Benzo | Propylene | 2,5-Disulfoanilino | Methyl | 2 | 1 |
| 15 | 2,3-Pyrido | Benzo | 2,3-Pyrido | Benzo | Propylene | 2,5-Disulfoanilino | Methyl | 1 | 1 |
| 16 | 2,3-Pyrido | Benzo | 2,3-Pyrido | 2,3-Pyrido | Propylene | 2,5-Disulfoanilino | Methyl | 0 | 1 |
| 17 | 2,3-Pyrido | Benzo | Benzo | Benzo | Ethylene | 3,6-Disulfo-8-hydroxy-1-naphthylamino | Methyl | 2 | 1 |
| 18 | 2,3-Pyrido | Benzo | Benzo | Benzo | Ethylene | 4-Methoxy-2-sulfoanilino | Methyl | 2 | 1 |
| 19 | 2,3-Pyrido | Benzo | Benzo | Benzo | Ethylene | 4-Nitro-2-sulfoanilino | Methyl | 2 | 1 |
| 20 | 2,3-Pyrido | Benzo | Benzo | Benzo | Ethylene | 2-Chloro-5-sulfoanilino | Methyl | 2 | 1 |
| 21 | 2,3-Pyrido | Benzo | Benzo | Benzo | Ethylene | 3-Methyl-6-sulfoanilino | Isopropyl | 2 | 1 |
| 22 | 2,3-Pyrido | Benzo | Benzo | Benzo | Ethylene | 2-Carboxy-4-sulfoanilino | Ethyl | 2 | 1 |
| 23 | 2,3-Pyrido | Benzo | Benzo | Benzo | Ethylene | 2,5-Dicarboxyanilino | Isopropyl | 2 | 1 |
| 24 | 2,3-Pyrido | Benzo | Benzo | Benzo | Ethylene | 3-Phosphonoanilino | Isopropyl | 2 | 1 |
| 25 | 2,3-Pyrido | Benzo | Benzo | Benzo | Ethylene | 2-Hydroxy-3-acetylamino-5-sulfoanilino | Isopropyl | 2 | 1 |
| 26 | 2,3-Pyrido | Benzo | Benzo | Benzo | Ethylene | 4-Ethoxy-6-sulfoanilino | Isopropyl | 2 | 1 |
| 27 | 2,3-Pyrido | Benzo | Benzo | Benzo | Ethylene | 3,6,8-Trisulfo-2-naphthylamino | Methyl | 1 | 1 |
| 28 | 2,3-Pyrido | Benzo | Benzo | Benzo | Ethylene | 6-Nitro-4,8-disulfo-2-naphthylamino | Methyl | 0 | 1 |
| 29 | 2,3-Pyrido | Benzo | Benzo | Benzo | Ethylene | 5,7-Disulfo-2-naphthylamino | Methyl | 1 | 1 |
| 30 | 2,3-Pyrido | Benzo | Benzo | Benzo | Ethylene | 6,8-Disulfo-2-naphthylamino | Methyl | 2 | 1 |
| 31 | 2,3-Pyrido | Benzo | Benzo | Benzo | Ethylene | 3-Carboxy-4-hydroxy-5-sulfoanilino | Isopropyl | 1 | 1 |
| 32 | 2,3-Pyrido | Benzo | Benzo | Benzo | Ethylene | 3-Methyl-6-methoxy-4-sulfoanilino | Isopropyl | 0 | 1 |
| 33 | 2,3-Pyrido | Benzo | Benzo | Benzo | Ethylene | 4-Methylsulfonyl-2-sulfoanilino | Methyl | 2 | 1 |
| 34 | 2,3-Pyrido | Benzo | Benzo | Benzo | Ethylene | 4-Methylthio-2-sulfoanilino | Methyl | 2 | 1 |
| 35 | 2,3-Pyrido | Benzo | Benzo | Benzo | Ethylene | 3-Amino-4-sulfoanilino | Methyl | 2 | 1 |
| 36 | 2,3-Pyrido | Benzo | Benzo | Benzo | Ethylene | 4-Methylamino-5-sulfoanilino | Methyl | 2 | 1 |
| 37 | 2,3-Pyrido | Benzo | Benzo | Benzo | Ethylene | 4-Dimethylamino-5-sulfoanilino | Methyl | 2 | 1 |
| 38 | 2,3-Pyrido | Benzo | Benzo | Benzo | Ethylene | 4-Aminosulfonyl-2-carboxyanilino | Methyl | 2 | 1 |
| 39 | 2,3-Pyrido | Benzo | Benzo | Benzo | Ethylene | 4-Hexylthio-2-sulfoanilino | Isopropyl | 2 | 1 |
| 40 | 2,3-Pyrido | Benzo | Benzo | Benzo | Ethylene | 4-Hexylsulfonyl-2-sulfoanilino | Isopropyl | 2 | 1 |
| 41 | 3,4-Pyrido | Benzo | Benzo | Benzo | Ethylene | 2,5-Disulfoanilino | Methyl | 2 | 1 |
| 42 | 3,4-Pyrido | Benzo | Benzo | Benzo | Ethylene | 2,4-Disulfoanilino | Methyl | 2 | 1 |
| 43 | 3,4-Pyrido | Benzo | Benzo | Benzo | Ethylene | 2-Sulfoanilino | Methyl | 2 | 1 |
| 44 | 3,4-Pyrido | Benzo | Benzo | Benzo | Ethylene | 3-Sulfoanilino | Methyl | 2 | 1 |
| 45 | 3,4-Pyrido | Benzo | Benzo | Benzo | Ethylene | 4-Sulfoanilino | Methyl | 2 | 1 |
| 46 | 3,4-Pyrido | Benzo | Benzo | Benzo | Ethylene | 2,5-Disulfoanilino | Ethyl | 2 | 1 |
| 47 | 3,4-Pyrido | Benzo | Benzo | Benzo | Ethylene | 2,5-Disulfoanilino | Isopropyl | 2 | 1 |
| 48 | 3,4-Pyrido | Benzo | Benzo | Benzo | Ethylene | 4,8-Disulfo-2-naphthylamino | Butyl | 2 | 1 |
| 49 | 3,4-Pyrido | Benzo | Benzo | Benzo | Ethylene | 1,5-Disulfo-2-naphthylamino | Pentyl | 2 | 1 |
| 50 | 3,4-Pyrido | Benzo | Benzo | Benzo | Ethylene | 3,6-Disulfo-1-naphthylamino | Hexyl | 2 | 1 |
| 51 | 3,4-Pyrido | Benzo | 3,4-Pyrido | Benzo | Ethylene | 3,6,8-Trisulfo-1-naphthylamino | Methyl | 1 | 1 |
| 52 | Benzo | 3,4-Pyrido | 3,4-Pyrido | 3,4-Pyrido | Ethylene | 2,5-Disulfoanilino | Methyl | 0 | 1 |
| 53 | Benzo | 3,4-Pyrido | 3,4-Pyrido | Benzo | Ethylene | 2,5-Disulfoanilino | Methyl | 1 | 1 |

TABLE 1-continued

| No. | A | B | C | D | E | X | R₁ | b | c |
|---|---|---|---|---|---|---|---|---|---|
| 54 | 3,4-Pyrido | Benzo | Benzo | Benzo | Propylene | 2,5-Disulfoanilino | Methyl | 2 | 1 |
| 55 | 3,4-Pyrido | Benzo | 3,4-Pyrido | Benzo | Propylene | 2,5-Disulfoanilino | Methyl | 1 | 1 |
| 56 | 3,4-Pyrido | Benzo | 3,4-Pyrido | 3,4-Pyrido | Propylene | 2,5-Disulfoanilino | Methyl | 0 | 1 |
| 57 | 3,4-Pyrido | Benzo | Benzo | Benzo | Ethylene | 3,6-Disulfo-8-hydroxy-1-naphthylamino | Methyl | 2 | 1 |
| 58 | 3,4-Pyrido | Benzo | Benzo | Benzo | Ethylene | 4-Methoxy-2-sulfoanilino | Methyl | 2 | 1 |
| 59 | 3,4-Pyrido | Benzo | Benzo | Benzo | Ethylene | 4-Nitro-2-sulfoanilino | Methyl | 2 | 1 |
| 60 | 3,4-Pyrido | Benzo | Benzo | Benzo | Ethylene | 2-Chloro-5-sulfoanilino | Methyl | 2 | 1 |
| 61 | 3,4-Pyrido | Benzo | Benzo | Benzo | Ethylene | 3-Methyl-6-sulfoanilino | Isopropyl | 2 | 1 |
| 62 | 3,4-Pyrido | Benzo | Benzo | Benzo | Ethylene | 2-Carboxy-4-sulfoanilino | Ethyl | 2 | 1 |
| 63 | 3,4-Pyrido | Benzo | Benzo | Benzo | Ethylene | 2,5-Dicarboxyanilino | Isopropyl | 2 | 1 |
| 64 | 3,4-Pyrido | Benzo | Benzo | Benzo | Ethylene | 3-Phosphonoanilino | Isopropyl | 2 | 1 |
| 65 | 3,4-Pyrido | Benzo | Benzo | Benzo | Ethylene | 2-Hydroxy-3-acetylamino-5-sulfoanilino | Isopropyl | 2 | 1 |
| 66 | 3,4-Pyrido | Benzo | Benzo | Benzo | Ethylene | 4-Ethoxy-6-sulfoanilino | Isopropyl | 2 | 1 |
| 67 | 3,4-Pyrido | Benzo | Benzo | Benzo | Ethylene | 3,6,8-Trisulfo-2-naphthylamino | Methyl | 1 | 1 |
| 68 | 3,4-Pyrido | Benzo | Benzo | Benzo | Ethylene | 6-Nitro-4,8-disulfo-2-naphthylamino | Methyl | 0 | 1 |
| 69 | 3,4-Pyrido | Benzo | Benzo | Benzo | Ethylene | 5,7-Disulfo-2-naphthylamino | Methyl | 1 | 1 |
| 70 | 3,4-Pyrido | Benzo | Benzo | Benzo | Ethylene | 6,8-Disulfo-2-naphthylamino | Methyl | 2 | 1 |
| 71 | 3,4-Pyrido | Benzo | Benzo | Benzo | Ethylene | 3-Carboxy-4-hydroxy-5-sulfoanilino | Isopropyl | 1 | 1 |
| 72 | 3,4-Pyrido | Benzo | Benzo | Benzo | Ethylene | 3-Methyl-6-methoxy-4-sulfoanilino | Isopropyl | 0 | 1 |
| 73 | 3,4-Pyrido | Benzo | Benzo | Benzo | Ethylene | 4-Methylsulfonyl-2-sulfoanilino | Methyl | 2 | 1 |
| 74 | 3,4-Pyrido | Benzo | Benzo | Benzo | Ethylene | 4-Methylthio-2-sulfoanilino | Methyl | 2 | 1 |
| 75 | 3,4-Pyrido | Benzo | Benzo | Benzo | Ethylene | 3-Amino-4-sulfoanilino | Methyl | 2 | 1 |
| 76 | 3,4-Pyrido | Benzo | Benzo | Benzo | Ethylene | 4-Methylamino-5-sulfoanilino | Methyl | 2 | 1 |
| 77 | 3,4-Pyrido | Benzo | Benzo | Benzo | Ethylene | 4-Dimethylamino-5-sulfoanilino | Methyl | 2 | 1 |
| 78 | 3,4-Pyrido | Benzo | Benzo | Benzo | Ethylene | 4-Aminosulfonyl-2-carboxyanilino | Methyl | 2 | 1 |
| 79 | 3,4-Pyrido | Benzo | Benzo | Benzo | Ethylene | 4-Hexylthio-2-sulfoanilino | Isopropyl | 2 | 1 |
| 80 | 3,4-Pyrido | Benzo | Benzo | Benzo | Ethylene | 4-Hexylsulfonyl-2-sulfoanilino | Isopropyl | 2 | 1 |

The porphyrazine coloring matter of the present invention can be usually used without mixing another coloring matter, but in some cases, both a known cyan coloring matter and the porphyrazine coloring matter of the present invention may be mixed for use, in the range not impairing the effects of the present invention.

In the case where both a known cyan coloring matter and the porphyrazine coloring matter of the present invention are mixed, a triphenylmethane-based coloring matter or a phthalocyanine coloring matter which are given C.I. Number can be used as the coloring matter to be mixed, and a phthalocyanine coloring matter given C.I. Number is preferable among them.

The method for manufacturing the porphyrazine coloring matter of the present invention represented by the above formula (1) will be explained.

The coloring matter represented by the above formula (1) can be obtained by reaction of a porphyrazine compound represented by the above formula (2) with an organic amine represented by the above formula (3) in the presence of ammonia.

The porphyrazine compound represented by the above formula (2) can be obtained by synthesizing a compound (porphyrazine ring) represented by the following formula (4) and then chlorosulfonylation of this, by a known method or a method in accordance therewith.

That is, the compound represented by the following formula (4) can be synthesized by a method in accordance with the known method disclosed in International Publication No. WO 2007/091631 and International Publication No. WO 2007/116933 Booklet, for example. These known literatures do not disclose any manufacturing methods for a compound where the number of the nitrogen-containing heteroaromatic ring for the rings of A to D is less than 1. However, by changing the mixing ratio of a nitrogen-containing heteroaromatic ring dicarboxylic acid derivative used as a reaction raw material and a phthalic acid derivative in synthesis by known nitrile method or Wyler method, the compound represented by the formula (4) where the number of nitrogen-containing heteroaromatic ring for the rings of A to D is less than 1 can be also synthesized.

In this regard, it is also as described in the above known literatures that an obtained compound represented by the formula (4) will be a mixture of positional isomers with regard to the substitution position of the nitrogen-containing heteroaromatic ring for the rings of A to D and the substitution position of the nitrogen atom in the nitrogen-containing heteroaromatic ring.

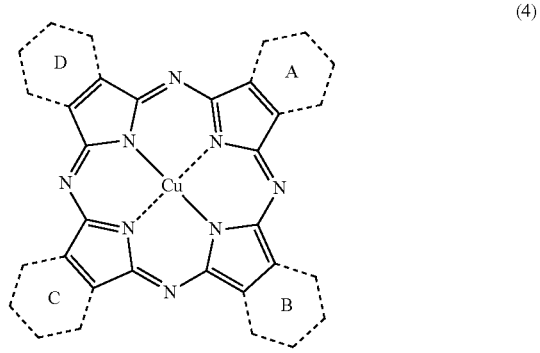

(4)

[wherein, the rings of A to D have the same meanings as in the above formula (1).]

The method for synthesizing the porphyrazine compound represented by the formula (2) is disclosed in the International Publication booklet disclosing the method for synthesizing the compound represented by the above-described formula (4). By chlorosulfonylation of a compound represented by the formula (4) according to said known method or a method in accordance therewith, a compound of the formula (2) can be obtained. The chlorosulfonyl group in the formula (2) is introduced on the benzene ring for the rings of A to D and not on the nitrogen-containing heteroaromatic ring for the rings of A to D. Usually one chlorosulfonyl group is introduced on a benzene ring, so the number of n in the formula (2) is within the number of the benzene ring for the rings of A to D. Therefore, the number "n" of the chlorosulfonyl group in the formula (2) is, according to the number of the benzene ring of the porphyrazine compound represented by the formula (2), 1.00 or more and less than 4.00, preferably 2.0 or more and 3.8 or less, more preferably 2.25 or more and 3.5 or less and further preferably 2.5 or more and 3.25 or less.

The method for synthesizing the porphyrazine compound represented by the formula (2) includes, other than the above-described one, a method where a porphyrazine compound having a sulfo group is synthesized by cyclocondensation of sulfophthalic acid with a nitrogen-containing heteroaromatic ring dicarboxylic acid derivative such as quinolinic acid (pyridine-2,3-dicarboxylic acid) and cinchomeronic acid (pyridine-3,4-dicarboxylic acid), followed by conversion of said sulfo group to a chlorosulfonyl group using a suitable chlorinating agent such as thionyl chloride. In this case, by selecting a sulfophthalic acid where the substitution position of the sulfo group is 3-position and a sulfophthalic acid where the substitution position of the sulfo group is 4-position as a synthetic raw material, the substitution position of the sulfo group substituted on the porphyrazine compound represented by the formula (2) can be controlled. That is, a porphyrazine compound can be obtained where a sulfo group is selectively substituted on the "alpha"-position in the following formula (5) when using 3-sulfophthalic acid or on the "beta"-position in the following formula (5) when using 4-sulfophthalic acid, respectively. In this regard, in the present description, the term "the alpha-position of the porphyrazine ring" or "the beta-position of the porphyrazine ring" means the corresponding position in the following formula (5), unless otherwise specifically noted.

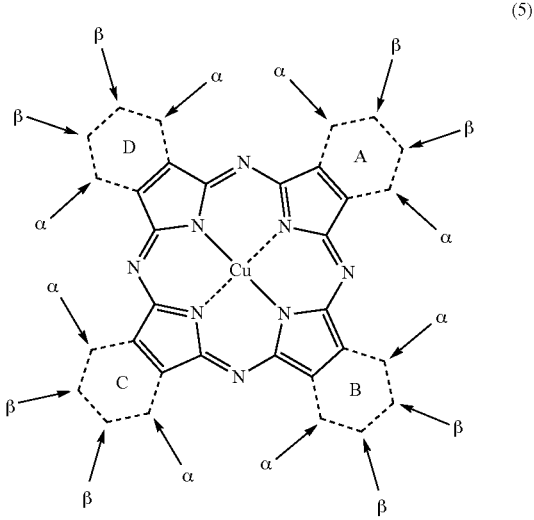

(5)

In addition, as described above, a compound having a substituent selectively on the alpha-position or the beta-position or a mixture of a compound having a substituent on the alpha-position and a compound having a substituent on the beta-position can be separately made easily by synthesis method. By selecting the position of the substituent or by, in contrast, giving a mixture of positional isomers of substituents, a coloring matter with a different balance of physical properties, hue, fastness properties and the like are obtained in some cases.

Therefore, making a coloring matter separately according to the purpose is also preferably carried out.

On the other hand, the organic amine represented by the above formula (3) can be also manufactured by a known method.

For example, 5 to 60 mol of an alcohol corresponding $R_1$, 1 mol of 2,4,6-trichloro-5-triazine (cyanuric chloride) and 0.8 to 1.2 mol of sodium hydrogen carbonate are reacted under the condition of 5 to 70° C. for 1 to 12 hours to obtain a first condensate. The first condensate may be separated by filtration to isolate as a wet cake.

Subsequently, a reaction liquid or a wet cake of the above-described first condensate is added to an aqueous solution of 0.9 to 1.5 mol of substituted aniline or substituted naphthylamine corresponding to X, the reaction liquid is adjusted to about pH 4 to 10 with an alkali metal hydroxide such as sodium hydroxide, and reaction is carried out under the condition of a reaction temperature of 5 to 80° C. for 0.5 to 12 hours to obtain a second condensate.

One mol of the obtained second condensate and 1 to 50 mol of an alkylene diamine corresponding to E are reacted under the conditions of about pH 5 to 12 and a reaction temperature of 5 to 90° C. for 0.5 to 12 hours to obtain an organic amine represented by the above formula (3).

For adjusting the pH of each condensation reaction, an alkali metal hydroxide such as sodium hydroxide and potassium hydroxide, an alkali metal carbonate such as sodium carbonate and potassium carbonate, or the like is usually used. In this regard, it is good that the order of the condensation is appropriately decided according to the reactivity of each kind of compound to be condensed with cyanuric chloride, and it is not limited to the above-described order.

The reaction of a porphyrazine compound represented by the above formula (2) with an organic amine represented by the above formula (3) is carried out by reaction in the presence of ammonia in water solvent, under the condition of about pH 8 to 10 and a reaction temperature of 5 to 70° C. for 1 to 20 hours. This reaction gives an intended porphyrazine coloring matter of the present invention represented by the formula (1).

As "ammonia" used for the above-described reaction, ammonia water and a chemical substance generating ammonia by neutralization or decomposition (both of these are together referred to as "aminating agent") can be used. The aminating agent used in the above-described reaction includes, for example, a compound generating ammonia by neutralization, like an ammonium salt of ammonium chloride, ammonium sulfate and the like; a compound generating ammonia by heat decomposition, such as urea; ammonia gas or ammonia water; and the like. However, it is not limited to these. The aminating agent used in the above-described reaction is preferably ammonia water. When using in the above-described reaction, concentrated ammonia water available as a commercial product (usually sold as ammonia water with a concentration of about 28%) or a diluent where this is diluted with water according to necessity may be used.

The use amount of the organic amine represented by the above formula (3) is usually an equivalent amount or a little excessive amount corresponding to the theoretical value [the calculated number of moles of the organic amine represented by the above formula (3), which is required to obtain the value of c in an intended coloring matter represented by the above formula (1)], relative to 1 mol of the porphyrazine compound represented by the above formula (2). However, the use amount of said organic amine varies depending on the reactivity of the organic amine and the reaction conditions to be used and is not limited to these.

The use amount of said organic amine is approximately, usually a mole equivalent corresponding to 1 to 3 times, preferably a mole equivalent corresponding to 1 to 2 times of the above-described theoretical value. That is, the use amount of said organic amine is approximately 1 to 3 times of c value, preferably 1 to 2 molar times relative to 1 mol of the porphyrazine compound represented by the above formula (2).

In addition, the porphyrazine coloring matter of the present invention represented by the above formula (1) is synthesized from compounds represented by the above formula (2) and the formula (3) under the reaction conditions not particularly requiring anhydrous condition, and preferably synthesized using water solvent. For this reason, it can be considered in theory that a compound where some of the chlorosulfonyl groups in the formula (2) is subjected to hydrolyzation by water mixed in the reaction system and converted to sulfonic acid is by-produced, and as this result, said side product comes to be mixed in an intended coloring matter represented by the formula (1).

However, it is difficult to distinguish between the unsubstituted sulfamoyl group and the sulfo group in mass spectrometry, and in the present invention, chlorosulfonyl groups in the formula (2) which are not reacted with the organic amine represented by the formula (3) are all described as converted to unsubstituted sulfamoyl groups.

Further, during the reaction, an extremely small amount of dimer (for example, Pz-L-Pz) or trimer where copper porphyrazine rings (Pz) are linked via a divalent linking group (L) is formed and occasionally comes to be mixed as an impurity in a coloring matter represented by the above formula (1).

The above-described divalent linking group represented by L includes —$SO_2$—, —$SO_2$—NH—$SO_2$— and the like, and in the case of trimer, a by-product where two Ls are combined occasionally forms.

The porphyrazine coloring matter of the present invention obtained as described above can be isolated as a solid by separation by filtration or the like of a solid precipitated by aciding out, salting out or the like from a reaction liquid of the last step in the synthesis reaction. Salting out is preferably carried out in the range of, for example, acidic to alkali conditions, preferably of pH 1 to 11. The temperature in salting out is not particularly limited but usually 40 to 80° C., preferably 50 to 70° C. Specifically, salting out is preferably carried out by heating a reaction liquid containing the porphyrazine coloring matter of the present invention to the above-described temperature, followed by addition of sodium chloride or the like to adjust the pH to the above-described range.

The porphyrazine coloring matter of the present invention synthesized by the above-described method is obtained as a free acid or a salt thereof. The method for isolating said coloring matter as a free acid includes, for example, aciding out. On the other hand, the method for isolating as a salt may be salting out. If an desired salt is not obtained by salting out, an intended salt can be given by, for example, a known salt exchange method or the like, such as a method where an obtained salt is converted to a free acid and then a desired organic or inorganic base is added.

The ink composition of the present invention will be described.

The ink composition of the present invention is characterized by containing a porphyrazine coloring matter of the present invention represented by the above formula (1). The ink composition of the present invention can be obtained by dissolving or dispersing a porphyrazine coloring matter of the present invention represented by the above formula (1) in a solvent. Therefore, the ink composition of the present invention contains a porphyrazine coloring matter of the present invention and a solvent, and according to necessity, it can further contain an additive such as an ink preparation agent. The solvent may be any of an organic solvent or water, or a mixed solvent of the both.

The porphyrazine coloring matter of the formula (1) in the present invention has a high water-solubility, so it is preferably dissolved in water to give a water-based ink composition substantially in solution. The porphyrazine coloring matter of the present invention exhibits vivid cyan color, so the ink composition containing said coloring matter can be used as a cyan ink. The ink composition containing the porphyrazine coloring matter of the present invention may be used as not only a cyan ink having a high concentration of coloring matter but also a cyan ink having a low concentration of coloring matter (called light cyan ink, photo cyan ink or the like) which is used for the purpose of smoothly reproducing the gradation part of an image or for the purpose of reducing the granular appearance of a hypochromic region. In addition, it may be used as a green ink by mixing with a yellow coloring matter and as a violet or blue ink by mixing with a magenta coloring matter. It is also possible to use it as each ink of dark yellow, gray or black by further mixing plural colors to make an ink.

When the ink composition of the present invention is used as an ink for inkjet recording, an ink composition of the present invention having less content of anions such as $Cl^-$, $SO_4^{2-}$ and the like contained as impurity in the porphyrazine coloring matter of the present invention is preferable. For the content of the anions only as a guide, the total content of $Cl^-$ and $SO_4^{2-}$ in the total mass of said coloring matter is 5% by mass or less, preferably 3% by mass or less and further preferably 1% by mass or less. In addition, it is preferred that said anion content is smaller likewise in an ink composition, and said anion content is preferably 1% by mass or less relative to the total mass of an ink composition. The lower limit may be the detection limit or less of a detection apparatus, specifically 0%, which is more preferable.

In order to manufacture a porphyrazine coloring matter of the present invention containing less $Cl^-$ and $SO_4^{2-}$, desalting treatment may be carried out by, for example, an ordinary method using a reverse osmosis membrane; a method where a dried form or a wet cake of the porphyrazine coloring matter of the present invention is suspended in an aqueous organic solvent, preferably aqueous alcohol and stirred; or the like.

Alcohol used for the above-described aqueous alcohol includes C1-C4 alcohol, preferably C1-C3 alcohol, further preferably methanol, ethanol, n-propanol or 2-propanol. When using aqueous alcohol, a method where a suspension suspending a coloring matter desired for desalination is heated near to its boiling point and then cooled for desalination can be also employed.

It is also possible that the porphyrazine coloring matter of the present invention subjected to desalting treatment in aqueous alcohol can be dried after separation by filtration to obtain as a coloring matter in a dried state.

The content of $Cl^-$ and $SO_4^{2-}$ in said coloring matter is measured by, for example, ion chromatography.

When the ink composition of the present invention is used for application of inkjet recording, the content of impurity such as heavy metals such as zinc and iron, ions such as calcium, silica and the like other than the above-described $Cl^-$ and $SO_4^{2-}$ is also preferably less.

However, the porphyrazine coloring matter of the present invention has a central metal by an ionic bond, a coordination bond and the like and forms a copper complex, so this central metal is not included in the impurity.

Only as a guide for the above-described impurity content, each of heavy metals such as zinc and iron, ions such as calcium, silica and the like in a dried and purified product of said porphyrazine coloring matter is preferably about 500 ppm or less. The lower limit of the content of the impurity may be the detection limit or less of an analysis equipment, specifically 0 ppm.

The ion content of heavy metals and the like can be measured by ion chromatography, atomic absorption method or ICP (Inductively Coupled Plasma) emission spectrometry.

The ink composition of the present invention contains 0.1 to 8% by mass, preferably 0.3 to 6% by mass of the porphyrazine coloring matter of the present invention represented by the above formula (1), where the rest is a solvent for ink preparation. The ink composition of the present invention is preferably a water-based ink composition containing water as a solvent for ink preparation. The water content in this case is 92 to 99.9% by mass, preferably 94 to 99.7% by mass relative to the total amount of the ink composition.

The water-based ink composition of the present invention may further contain, according to necessity, a water-soluble organic solvent and an ink preparation agent within the range not impairing the effects of the Invention. Usually, the ink composition of the present invention more preferably contains these.

In some cases, the water-soluble organic solvent also has functions as dye dissolving, dry preventing (moistening), viscosity modifying, penetration enhancing, surface tension modifying, antifoaming and/or the like. The ink composition of the present invention more preferably contains a water-soluble organic solvent.

The ink preparation agent includes, for example, an antiseptic and fungicide, a pH adjuster, a chelating agent, a rust preventive agent, a ultraviolet absorbing agent, a viscosity modifier, a dye dissolving agent, an antifading agent, an emulsion stabilizer, a surface tension modifier, an antifoaming agent, a dispersing agent, a dispersion stabilizer and the like. These may be added to the ink composition of the present invention according to necessity.

The ink composition of the present invention preferably further contains, other than the coloring matter of the present invention and water, 0 to 60% by mass, preferably 10 to 50% by mass and more preferably 10 to 30% by mass of the above-described water-soluble organic solvent, and 0 to 20% by mass, preferably 0 to 15% by mass of the above-described ink preparation agent, respectively relative to the total mass of the ink composition of the present invention. The rest other than a water-soluble organic solvent, an ink preparation agent and the porphyrazine coloring matter of the present invention is water.

The coloring matter of the present invention used in the ink composition of the present invention may be any coloring matter included in the coloring matter or a salt thereof represented by the formula (1), and the ink using the porphyrazine coloring matter or a salt thereof according to any one of the above 2) to 8), 18), 19), and (i) to (x) is more preferably.

The above water-soluble organic solvent includes, for example, C1-C4 alcohol such as methanol, ethanol, n-propanol, isopropanol, n-butanol, isobutanol, secondary butanol or tertiary butanol; carboxylic acid amide such as N,N-dimethylformamide or N,N-dimethylacetoamide; heterocyclic ketone such as 2-pyrrolidone, N-methyl-2-pyrrolidone, 1,3-dimethylimidazolidin-2-one or 1,3-dimethylhexahydropyrimid-2-one; ketone or keto alcohol such as acetone, methyl ethyl ketone or 2-methyl-2-hydroxypentan-4-one; cyclic ether such a tetrahydrofuran or dioxane; mono-, oligo- or polyalkylene glycol or thioglycol having a C2-C6 alkylene unit, such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol or polypropylene glycol; polyol (preferably, triol) such as glycerine or hexane-1,2,6-triol; C1-C4 monoalkyl ether of polyhydric alcohol, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether or triethylene glycol monoethyl ether; gamma-butyrolactone; dimethylsulfoxide; and the like.

As the above-described water-soluble organic solvent, preferable ones are isopropanol, glycerine, mono-, di- or triethylene glycol, dipropylene glycol, 2-pyrrolidone, N-methyl-2-pyrrolidone and butyl carbitol, and more preferably isopropanol, glycerine, diethylene glycol, N-methyl-2-pyrrolidone, 2-pyrrolidone and butyl carbitol.

These water-soluble organic solvents are used alone or as a mixture thereof.

The antiseptic and fungicide includes, for example, compounds of organic sulfur-based, organic nitrogen sulfur-based, organic halogen-based, haloarylsulfone-based, iodopropargyl-based, N-haloalkylthio-based, benzothiazole-based, nitrile-based, pyridine-based, 8-oxyquinoline-based, isothiazoline-based, dithiol-based, pyridineoxide-based, nitropropane-based, organic tin-based, phenol-based, quaternary ammonium salt-based, triazine-based, thiadiazine-based, anilide-based, adamantane-based, dithiocarbamate-based, brominated indanone-based, benzyl bromoacetate-based, inorganic salt-based and the like.

The organic halogen-based compound includes, for example, sodium pentachlorophenol. The pyridineoxide-based compound includes, for example, sodium 2-pyridinethiol-1-oxide. The isothiazoline-based compound includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride and the like.

Specific examples of the other antiseptic and fungicides include sodium sorbate, sodium benzoate, sodium acetate and the like, and the commercial product thereof includes, for example, Proxel® GXL(S), Proxel® XL-2(S) (trade names) and the like, manufactured by Arch Chemicals, Inc.

In this regard, in the present description, the superscript "RTM" represents a registered trademark.

As the pH adjuster, an arbitrarily substance can be used as long as it can control the pH of the ink in the range of 6.0 to 11.0 for the purpose of improving storage stability. For example, it includes alkanolamine such as diethanolamine and triethanolamine; alkali metal hydroxide such as lithium hydroxide, sodium hydroxide and potassium hydroxide; ammonium hydroxide (ammonia water); alkali metal carbonate such as lithium carbonate, sodium carbonate and potassium carbonate; amino sulfonic acid such as taurine; or the like.

The chelating agent includes, for example, disodium ethylenediaminetetraacetate, sodium nitrilotriacetate, sodium hydroxyethylethylenediaminetriacetate, sodium diethylenetriaminepentaacetate, sodium uracil diacetate and the like.

The rust preventive agent includes, for example, a hydrogen sulfite salt, sodium thiosulfate, ammonium thioglycolate, diisopropylammonium nitrite, pentaerythritol tetranitrate, dicyclohexylammonium nitrite and the like.

The ultraviolet absorbing agent includes, for example, a benzophenone-based compound, a benzotriazole-based compound, a cinnamic acid-based compound, a triazine-based compound, a stilbene-based compound and the like. In addition, a compound absorbing ultraviolet rays and emitting fluorescence, as typified by a benzoxazole-based compound, so-called fluorescent brightening agent, can be used.

The viscosity modifier includes a water-soluble polymer compound, for example, polyvinyl alcohol, a cellulose derivative, polyamine, polyimine and the like.

The dye dissolving agent includes, for example, urea, epsilon-caprolactam, ethylene carbonate and the like.

The antifading agent is used for the purpose of improving the storage stability of images. As the antifading agent, various organic-based and metal complex-based antifading agents can be used. The organic antifading agent includes hydroquinones, alkoxyphenols, dialkoxyphenols, phenols, anilines, amines, indanes, chromans, alkoxyanilines, heterocycles and the like. The metal complex includes a nickel complex, a zinc complex and the like.

The surface tension modifier includes a surfactant, for example, an anionic surfactant, an amphoteric surfactant, a cationic surfactant, a nonionic surfactant and the like.

The anionic surfactant includes alkylsulfocarboxylate, alpha-olefin sulfonate, polyoxyethylene alkyl ether acetate, N-acylamino acid and a salt thereof, N-acylmethyltaurine salt, alkylsulfate polyoxyalkyl ether sulfate, alkylsulfate polyoxyethylene alkyl ether phosphate, rosin acid soap, castor oil sulfate, lauryl alcohol sulfate, alkylphenol-type phosphate ester, alkyl-type phosphate ester, alkylaryl sulfonate, diethyl sulfosuccinate, diethylhexyl sulfosuccinate, dioctyl sulfosuccinate and the like.

The cationic surfactant includes 2-vinylpyridine derivatives, poly(4-vinylpyridine) derivatives and the like.

The amphoteric surfactant includes lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and in addition, imidazoline derivatives and the like.

The nonionic surfactant includes ether-based one such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether; ester-based one such as polyoxyethylene oleate ester, polyoxyethylene distearate ester, sorbitan laurate, sorbitan monostearate, sorbitan monooleate, sorbitan sesquioleate, polyoxyethylene monooleate, polyoxyethylene stearate and the like; acetylene alcohol-based one such as 2,4,7,9-tetramethyl-5-decyne-4,7-diol, 3,6-dimethyl-4-octyne-3,6-diol and 3,5-dimethyl-1-hexyn-3-ol (for example, Surfynol®104, 82 and 465, Olfine® STG, and the like manufactured by Nissin Chemical Industry Co., Ltd.); and the like.

As the antifoaming agent, highly oxidized oil-based, glycerin fatty acid ester-based, fluorine-based and silicone based compounds may be used according to necessity.

These ink preparation agents are used alone or as a mixture thereof. In this regard, the surface tension of the ink of the present invention is usually 25 to 70 mN/m, preferably 25 to 60 mN/m. The viscosity of the ink of the present invention is preferably modified to 30 mPa·s or less, more preferably 20 mPa·s or less.

In manufacturing the ink composition of the present invention, the order of dissolving each component to be contained therein is not particularly limited. Water to be used in preparation of the ink composition is preferably water with less impurity such as a metal ion and the like, such as ion-exchanged water, distilled water or the like. In addition, foreign substances may be removed by microfiltration using a membrane filter or the like according to necessity, and when using as an ink for inkjet recording, microfiltration is preferably carried out. The pore size of filter for microfiltration is usually 1 μm to 0.1 μm, preferably 0.8 μm to 0.1 μm.

The ink composition of the present invention can be used not only for monochrome image formation but also full color image formation. In forming a full color image, it is used for an ink set of 3 primary colors with magenta ink and yellow ink, and also for an ink set of 4 colors with black ink further added to this. In addition, in order to form a higher resolution image, it is also used for an ink set by using a light magenta ink, blue ink, green ink, orange ink, dark yellow ink, gray ink and/or the like in combination. The coloring matter used for each color used for the ink sets by using the ink composition of the present invention in combination includes a known coloring matter of each color.

The known yellow coloring matter includes, for example, an azo-based coloring matter having aryl and/or heteroaryl; a methine-based coloring matter such as benzylidene coloring matter and monomethine oxonol coloring matter; a quinone-based coloring matter such as naphthoquinone coloring matter and anthraquinone coloring matter; a quinophthalone-based coloring matter; a nitro nitroso-based coloring matter; an acridine-based coloring matter; an acridinone-based coloring matter; and the like.

The known magenta coloring matter includes, for example, an azo-based coloring matter having aryl and/or heteroaryl; an azomethine-based coloring matter; a methine-based coloring matter such as arylidene coloring matter, styryl coloring matter, merocyanine coloring matter, cyanine coloring matter and oxonol coloring matter; a carbonium-based coloring matter such as diphenyl methane coloring matter, triphenylmethane coloring matter and xanthene coloring matter; a quinone-based coloring matter such as naphthoquinone, anthraquinone and anthrapyridone; condensed polycyclic-based coloring matter such as dioxazine coloring matter; and the like.

The known black coloring matter includes an azo-based coloring matter such as disazo, trisazo or tetraazo; a sulfur dye; a carbon black dispersion; and the like.

The ink composition of the present invention can be used in various applications for recording such as impress printing, copying, marking, writing, drafting and stamping, and it is particularly suitable for inkjet recording.

The inkjet recording method of the present invention is a method where an ink droplet of an ink composition of the present invention, for example, an ink composition containing a porphyrazine coloring matter of the formula (1) or a salt thereof, preferably an ink composition further containing water and a water-soluble organic solvent is discharged responding to a recording signal and it is adhered to a record-receiving material so as to perform recording. The image formed by said recording method has an excellent hue, is excellent in various fastness properties, particularly such as ozone fastness, moisture fastness and the like, and also causes no bronze phenomenon.

For discharging an ink droplet, energy may be provided to the above-described ink composition responding to a recording signal, and as the system of discharging an ink droplet, various systems described in the paragraph of Background Art can be employed.

The above-described record-receiving material can include plain paper, resin-coated paper, inkjet special paper, glossy paper, glossy film, electrophotography paper, fiber/textile, cloth (such as cellulose, nylon and wool), glass, metal, ceramics, leather or the like.

In forming an inkjet recording image, a polymer particle dispersion (also referred to as polymer latex) may be used for the purpose of imparting glossiness and water fastness to the image or of improving weatherability. Said polymer latex may be given to a record-receiving material or preliminarily mixed in the ink composition.

The timing when the polymer latex is given to the record-receiving material may be before, after or the same time as the ink is applied on the record-receiving material.

Specifically, recording may be performed on a record-receiving material preliminarily containing the polymer latex with the ink composition of the present invention, or recording may be performed on a record-receiving material with the ink composition of the present invention preliminarily containing the polymer latex. Otherwise, said record-receiving material surface may be treated with the liquid polymer latex in a liquid state before or after recording is performed on a record-receiving material with the ink composition of the present invention.

The colored product of the present invention means a material colored with the porphyrazine coloring matter of the present invention or the ink composition of the present invention containing this. The material to be colored is not particularly limited, but includes, for example, a communication sheet such as paper and film, fiber/textile and cloth (such as cellulose, nylon and wool), leather, a substrate for color filter and the like. The material to be colored is preferably a communication sheet.

As the above-described communication sheet, one subjected to surface treatment, specifically one where an ink-receiving layer is provided on a substrate such as paper, synthetic paper, film or the like is preferable. The ink-receiving layer is provided by, for example, a method where a cation polymer is impregnated or coated on the above substrate; a method where the above substrate surface is coated with inorganic particles (white inorganic pigment particles) capable of absorbing the coloring matter in an ink, such as porous silica, aluminasol and special ceramics, together with a hydrophilic polymer such as polyvinyl alcohol and polyvinylpyrrolidone, or the like.

The communication sheet provided with such an ink-receiving layer is usually called inkjet special paper (film), glossy paper (film) or the like.

Typical examples of the above-described inkjet special paper available as a commercial product are Photo Paper Glossy Pro "Platinum Grade" and Photo Paper Glossy Gold manufactured by Canon Inc.; Photo Paper CRISPIA (highly glossy), Photo Paper (glossy) and Photo Matte Paper manufactured by Seiko-Epson Corporation; Advance Photo Paper (glossy) manufactured by Hewlett Packard Japan, Ltd.; Premium Plus Glossy Photo Paper manufactured by Brother Industries, Ltd.; and the like, which are all trade names.

Among them, it is regarded that an image recorded on such an inkjet special paper type as with the substrate surface coated with the above-described inorganic particles is easily subjected to adverse effects by gas having oxidizing effect in the air, such as ozone gas. The porphyrazine coloring matter of the present invention or the ink composition of the present invention containing it shows excellent ozone fastness, even when recording is performed on such an inkjet special paper.

In addition, naturally, the ink composition of the present invention can be also used for recording on plain paper. The plain paper specifically includes PB PAPER GF500 manufactured by Canon Inc.; both sides-high quality plain paper manufactured by Seiko-Epson Corporation; and the like.

Application of the ink composition of the present invention is not limited to recording these professional papers, plain paper and the like.

In order to record on the above-described record-receiving material by the inkjet recording method of the present invention, for example, a container containing the above ink composition may be placed in the predetermined position of an inkjet printer and recording may be performed by the above recording method.

The inkjet printer includes, for example, a piezo system printer utilizing mechanical vibration; a Bubble Jet® system printer utilizing foam generated by heat; and the like. However, the ink composition of the present invention is not limited to use in these discharging systems and can be used in any system printer.

The ink composition of the present invention is free from precipitation or separation during storage. In addition, when said ink composition is used for inkjet recording, it also causes no clogging at the injector (inkhead). The ink composition of the present invention also has no change in physical properties when recording for relatively long hours and under constant recirculation by a continuous inkjet printer; intermittent recording by an on-demand printer; or the like.

The ink composition containing the porphyrazine coloring matter of the present invention is vivid cyan color, has a good hue as a cyan ink, and also has no solid precipitation, no change in physical properties, no color change or the like after storage for a long period of time, and thus the storage stability thereof is good. The recorded image obtained by the ink composition of the present invention has a high print density and allows reducing the coloring matter concentration in printing, thus having industrial superiority such as cost reduction. In addition, it allows various fastness properties of a recorded image, such as light fastness, water fastness, ozone fastness, moisture fastness and the like, particularly ozone fastness and moisture fastness, and also hardly causes bronze phenomenon, thus providing a recorded image of high quality.

Further, a color tone in a wide visible region can be expressed by using each of its dark and light cyan inks, in addition to this, in combination with an ink of yellow and/or magenta, and according to necessity, another ink of green, red, orange, blue and/or the like.

Therefore, the porphyrazine coloring matter of the present invention and the ink composition containing this is extremely useful as a cyan coloring matter and a cyan ink for inkjet recording.

EXAMPLES

Hereinafter, the present invention will be more specifically explained with reference to Examples. In this regard, "part(s)" and "%" in the context are based on mass unless otherwise described. In addition, each operation such as reaction, crystallization, purification and the like is carried out under stirring unless otherwise specifically noted. "LEOCOL® TD-90", which is a trade name, used in synthesis reaction is a surfactant manufactured by Lion Corporation.

In this regard, the coloring matters represented by the above formula (1) synthesized in Examples are all mixtures containing isomers and the like as above. Therefore, in the structural formula in each Example, a substituent on the porphyrazine ring is specifically shown by a structural formula, and unless otherwise specifically noted, the ring A to the ring D of the porphyrazine ring are shown by a broken line, and the number of substituents on the porphyrazine ring, n, b and c are shown by symbols as they are. In addition, the specific numbers of the nitrogen-containing heteroaromatic ring, the benzene ring, b and c are described in each Example, and each yield is described as a single compound having the numbers of these, including isomers and the like. Further, unless otherwise specifically noted, the coloring matter of the present invention is a mixture where the unsubstituted sulfamoyl group and the substituted sulfamoyl group are each independently substituted on the alpha-position and the beta-position of the porphyrazine ring at a ratio of b and c. The coloring matter of the present invention synthesized in each Example is considered to be a mixture containing the almost same amounts of the alpha-position substitution product and the beta-position substitution product, except for Examples 14 and 15.

The maximum absorption wavelength (λmax) of each porphyrazine coloring matter for the present invention and for comparison obtained in Examples is described as a measured value in an aqueous solution of pH 7 to 9. For adjusting the pH in this case, an aqueous sodium hydroxide solution is used.

The number of the benzene ring and the 6-membered nitrogen-containing heteroaromatic ring for the rings of A to D and the values of b and c are described as figures down to the second decimal place by rounding off the third decimal place. These values of b and c can be determined by measurement of copper content by ICP emission spectrometry using an intended compound as a sample, measurement of water content using Karl Fischer method, and measurement of the content of inorganic impurity (ions such as sodium, potassium and chlorine) using ion chromatography.

In this regard, any of the synthesized porphyrazine coloring matters of the present invention showed an extremely high solubility of 10% by mass or more relative to the total mass of the aqueous solution.

In each synthesis reaction, when the necessary amount of each intended compound or the like was not be obtained in one synthesis, the same or similar operation was repeated until the necessary amount thereof was obtained.

Example 1

Step 1

Synthesis of the compound represented by the following formula (4), wherein 1.37 of the rings of A to D are pyridine rings fused at the 2- and 3-positions and the rest 2.63 are benzene rings.

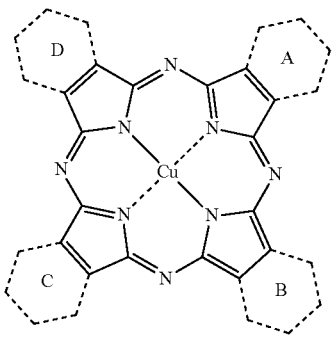

(4)

To 375 parts of sulfolane, 29.16 parts of phthalic anhydride, 17.23 parts of quinolinic acid, 108 parts of urea, 10.1 parts of copper (II) chloride and 1.5 parts of ammonium molybdate were added. The liquid temperature was raised to 200° C. and the reaction liquid was maintained at the same temperature for 5 hours. After completion of the reaction, said reaction liquid was cooled to 65° C., 50 parts of DMF (N,N-dimethylformamide) were added thereto, and the precipitated solid was separated by filtration. The obtained solid was washed with 50 parts of DMF to obtain 75.1 parts of a wet cake. The obtained wet cake was added to 450 parts of DMF, the liquid temperature was raised to 110° C. and maintained at the same temperature for one hour. The solid was separated by filtration, washed with 200 parts of water to obtain a wet cake. The obtained wet cake was added to 450 parts of 5% hydrochloric acid, and the liquid temperature was raised to 60° C. and maintained at the same temperature for 1 hour. The solid was separated by filtration and washed with 200 parts of water to obtain a wet cake. The obtained wet cake was added to 450 parts of 5% ammonia water, the liquid temperature was raised to 60° C. and maintained at the same temperature for 1 hour. The solid was separated by filtration and washed with 200 parts of water to obtain 78.6 parts of a wet cake. The obtained wet cake was dried at 80° C. to obtain 23.1 parts of the above-described intended compound as a blue solid.

Step 2

Synthesis of the compound represented by the following formula (2), wherein 1.37 of the rings of A to D are pyridine rings fused at the 2- and 3-positions, the rest 2.63 are benzene rings and n is 2.63.

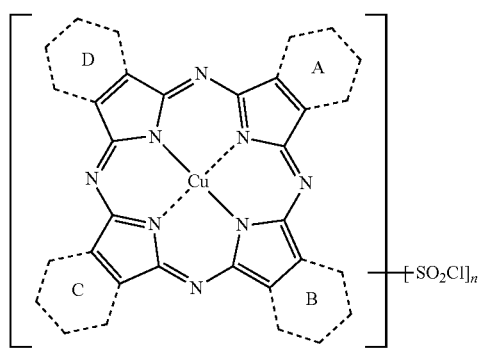

(2)

To 46.2 parts of chlorosulfonic acid, 5.8 parts of the compound of the above-described formula (4) obtained in Example 1 (Step 1) were so gradually added that the temperature was not over 60° C., and then said reaction liquid was maintained at 140° C. for 4 hours. After that, the reaction liquid was cooled to 70° C., 17.9 parts of thionyl chloride were added dropwise thereto over 30 minutes, and the reaction was further carried out at 70° C. for 3 hours. The reaction liquid was cooled to 30° C. or less and slowly poured into 800 parts of ice water. The precipitated solid was separated by filtration and washed with 200 parts of cold water to obtain 33.0 parts of a wet cake of the intended compound represented by the above-described formula (2).

Step 3

Synthesis of the organic amine represented by the following formula (6) [organic amine of the above formula (3), wherein E is ethylene, X is 2,5-disulfoanilino, and $R_1$ is methyl].

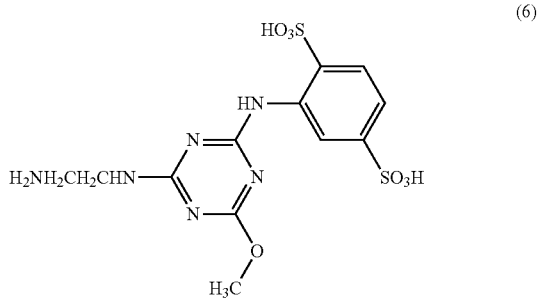

(6)

To 160 parts of methanol, 36.8 parts of cyanuric chloride, 4 parts of LEOCOL® TD-90 (trade name) and 16.8 parts of sodium hydrogen carbonate were added, and the reaction was carried out at 30° C. or less for 1 hour to obtain a reaction liquid containing a first condensate.

To 280 parts of water, 56.1 parts of 2,5-disulfoaniline were added, and 32 parts of a 25% aqueous sodium hydroxide solution were further added to adjust the pH of this liquid to 3 to 5. To this liquid, the reaction liquid containing the first condensate obtained as described above was gradually added, and while adjusting the pH to 6 to 7 by adding a 25% aqueous sodium hydroxide solution, the reaction was carried out overnight at room temperature to obtain a reaction liquid containing a second condensate.

To the obtained reaction liquid, 360 parts of hydrochloric acid and 125 parts of ice were added, the reaction liquid was cooled to 0° C., and 120 parts of ethylenediamine were added dropwise. While adjusting to pH 5 to 6 by adding a 25% aqueous sodium hydroxide solution to the resulting liquid, the reaction was carried out at 80° C. for 2.5 hours to obtain a reaction liquid containing a third condensate.

To this reaction liquid, 55 parts of hydrochloric acid were added to adjust the pH of the reaction liquid to 1.0. The liquid volume at this time was 1000 parts. To the resulting liquid, 200 parts of sodium chloride were added, and this liquid was stirred for 30 minutes to precipitate a solid. The precipitated solid was separated by filtration to obtain 183 parts of a wet cake. The obtained wet cake was added to 1000 parts of water, and a 25% aqueous sodium hydroxide solution was added thereto to adjust to pH 9.0. To this solution, 55 parts of hydrochloric acid were added to adjust to pH 1.0. At this time, the liquid volume was 1400 parts. To this liquid, 280 parts of sodium chloride were added, and this liquid was stirred at room temperature for 30 minutes and further at 0° C. for 30 minutes. The precipitated solid was separated by filtration to obtain 60 parts of a wet cake. To a mixed liquid of 224 parts of methanol and 56 parts of water, the obtained wet cake was added, and said liquid was stirred at 50° C. for 1 hour. After that, the solid was separated by filtration to obtain 51.3 parts of a wet cake. The obtained wet cake was dried to obtain 37.0 parts of a white powder of the intended organic amine represented by the above-described formula (6).

Step 4

Synthesis of the porphyrazine coloring matter of the present invention represented by the following formula (7) [coloring matter of the above formula (1), wherein 1.37 of the rings of A to D are pyridine rings fused at the 2- and 3-positions, the rest 2.63 are benzene rings, E is ethylene, X is 2,5-disulfoanilino, $R_1$ is methyl, b is 1.83, and c is 0.8].

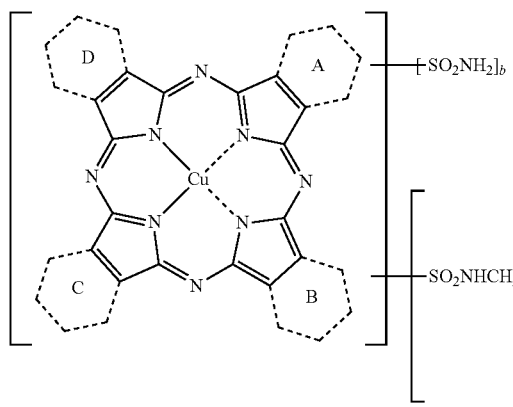
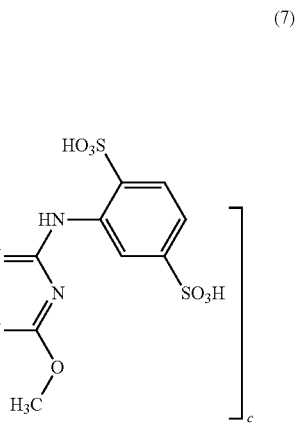

(7)

To 120 parts of ice water, 33.0 parts of the wet cake of the compound represented by the above-described formula (2) obtained in Example 1 (Step 2) were added, and the mixture was suspended by stirring at 5° C. or less. Ten minutes later, while maintaining the liquid temperature at 10° C. or less, a solution dissolving 3.3 parts of the organic amine represented by the above-described formula (6) in a mixed liquid of 1 part of 28% ammonia water and 40 parts of water was added to this suspension. After that, while maintaining said suspension at pH 9.0 with 28% ammonia water, the reaction was carried out. With the pH of said suspension maintained, the liquid temperature was raised to 20° C. over 1 hour, and the reaction was further carried out at the same temperature for 8 hours. The liquid volume of the reaction liquid at this time was 200 parts. The temperature of the reaction liquid was raised to 50° C., 28.5 parts of sodium chloride were added thereto, and the mixture was stirred for 30 minutes. After that, concentrated hydrochloric acid was added over 20 minutes to adjust the pH of this reaction liquid to 1.0. The precipitated solid was separated by filtration and washed with 100 parts of a 10% aqueous sodium chloride solution to obtain 62.3 parts of a wet cake.

The obtained wet cake was added to 200 parts of water, and a 25% aqueous sodium hydroxide solution was added thereto to adjust the pH to 9.0, whereby said wet cake was dissolved. The liquid volume at this time was 275 parts. The temperature of this solution was raised to 50° C., 22.5 parts of sodium chloride were added thereto, and said solution was stirred for 30 minutes. After that, concentrated hydrochloric acid was added over 20 minutes to adjust to pH 1.0, and the precipitated solid was separated by filtration and washed with 100 parts of a 10% aqueous sodium chloride solution to obtain 37.1 parts of a wet cake. The obtained wet cake was added to a mixed liquid of 160 parts of ethanol and 40 parts of water, and said liquid was stirred at 50° C. for 1 hour. After that, the solid was separated by filtration to obtain 32.0 parts of a wet cake. The obtained wet cake was dried to obtain 10.0 parts of free acid of the coloring matter of the present invention represented by the above-described formula (7) as a blue powder.
λmax: 600 nm.

Example 2

Step 1

Synthesis of the compound represented by the above formula (4), wherein 1.00 of the rings of A to D is a pyridine ring fused at the 2- and 3-positions and the rest 3.00 are benzene rings.

To 375 parts of sulfolane, 33.32 parts of phthalic anhydride, 10.08 parts of quinolinic acid, 108 parts of urea, 10.1 parts of copper (II) chloride and 1.5 parts of ammonium molybdate were added. The liquid temperature was raised to 200° C. and the reaction liquid was maintained at the same temperature for 5 hours. After completion of the reaction, said reaction liquid was cooled to 65° C., 50 parts of DMF (N,N-dimethylformamide) were added thereto, and the precipitated solid was separated by filtration. The obtained solid was washed with 50 parts of DMF to obtain 75.1 parts of a wet cake. The obtained wet cake was added to 450 parts of DMF, the liquid temperature was raised to 110° C., and the liquid was maintained at the same temperature for one hour. The solid was separated by filtration and washed with 200 parts of water to obtain a wet cake. The obtained wet cake was added to 450 parts of 5% hydrochloric acid, and the liquid temperature was raised to 60° C. and maintained at the same temperature for 1 hour. The solid was separated by filtration and washed with 200 parts of water to obtain a wet cake. The obtained wet cake was added to 450 parts of 5% ammonia water, and the liquid temperature was raised to 60° C. and maintained at the same temperature for 1 hour. The solid was separated by filtration and washed with 200 parts of water to obtain 78.6 parts of a wet cake. The obtained wet cake was dried at 80° C. to obtain 25.2 parts of the above-described intended compound as a blue solid.

Step 2

Synthesis of the compound represented by the above formula (2), wherein 1.00 of the rings of A to D is a pyridine ring fused at the 2- and 3-positions, the rest 3.00 is benzene rings and n is 3.00.

To 46.2 parts of chlorosulfonic acid, 5.8 parts of the compound of the formula (4) obtained in the above Example 1 (Step 1) were so gradually added that the temperature was not over 60° C., and said reaction liquid was maintained at 140° C. for 4 hours. After that, the reaction liquid was cooled to 70° C., 17.9 parts of thionyl chloride were added dropwise over 30 minutes, and the reaction was further carried out at 70° C. for 3 hours. The reaction liquid was cooled to 30° C. or less and was slowly poured into 800 parts of ice water. The precipitated solid was separated by filtration and washed with 200 parts of cold water to obtain 31.5 parts of a wet cake of the intended compound represented by the above formula (2).

Step 3

Synthesis of the porphyrazine coloring matter of the present invention represented by the above formula (7) [coloring matter of the above formula (1) wherein 1.00 of the rings of A to D is a pyridine ring fused at the 2- and 3-positions, the rest 3.00 are benzene rings, E is ethylene, X is 2,5-disulfoanilino, $R_1$ is methyl, b is 2.30, and c is 0.7].

To 200 parts of ice water, 31.5 parts of the wet cake of the compound represented by the above-described formula (2) obtained in Example 2 (Step 2) were added, and the mixture was suspended by stirring at 5° C. or less. Ten minutes later, while maintaining the liquid temperature at 10° C. or less, a solution dissolving 2.9 parts of the organic amine represented by the above formula (6) obtained in Example 1 (Step 3) in a mixed liquid of 1 part of 28% ammonia water and 40 parts of water was added to this suspension. After that, while maintaining said suspension at pH 9.0 with 28% ammonia water, the reaction was carried out. With the pH of said suspension maintained, the liquid temperature was raised to 20° C. over 1 hour, and the reaction was further carried out at the same temperature for 8 hours. The liquid volume at this time was 225 parts. The temperature of the reaction liquid was raised to 50° C., 33.8 parts of sodium chloride were added thereto, and the mixture was stirred for 30 minutes. After that, concentrated hydrochloric acid was added over 20 minutes to adjust the pH of this reaction liquid to 1.0. The precipitated solid was separated by filtration and washed with 100 parts of a 10% aqueous sodium chloride solution to obtain 39.7 parts of a wet cake.

The obtained wet cake was added to 170 parts of water, and a 25% aqueous sodium hydroxide solution was added thereto to adjust the pH to 9.0, whereby said wet cake was dissolved. The liquid volume at this time was 225 parts. The temperature of this solution was raised to 50° C., 22.5 parts of sodium chloride were added thereto, and said solution was stirred for 30 minutes. After that, concentrated hydrochloric acid was added over 20 minutes to adjust to pH 1.0, and the precipitated solid was separated by filtration and washed with 100 parts of a 10% aqueous sodium chloride solution to obtain 41.2 parts of a wet cake. The obtained wet cake was added to a mixed liquid of 160 parts of ethanol and 40 parts of water, and said liquid was stirred at 50° C. for 1 hour. After that, the precipitated solid was separated by filtration to obtain 29.3 parts of a wet cake. The obtained wet cake was dried to obtain 11.0 parts of free acid of a coloring matter of the present invention represented by the above formula (7) as a blue powder.
λmax: 605 nm.

Example 3

Step 1

Synthesis of the compound represented by the above formula (4), wherein 0.75 of the rings of A to D is a pyridine ring fused at the 2- and 3-positions and the rest 3.25 are benzene rings.

To 375 parts of sulfolane, 36.1 parts of phthalic anhydride, 9.4 parts of quinolinic acid, 108 parts of urea, 10.1 parts of copper (II) chloride and 1.5 parts of ammonium molybdate were added. The liquid temperature was raised to 200° C., and the reaction liquid was maintained at the same temperature for 5 hours. After completion of the reaction, said reaction liquid was cooled to 65° C., 50 parts of DMF (N,N-dimethylformamide) were added thereto, and the precipitated solid was separated by filtration. The obtained solid was washed with 50 parts of DMF to obtain 75.1 parts of a wet cake. The obtained wet cake was added to 450 parts of DMF, the liquid temperature was raised to 110° C., and the mixture was maintained at the same temperature for one hour. The solid was separated by filtration and washed with 200 parts of water to obtain a wet cake. The obtained wet cake was added to 450 parts of 5% hydrochloric acid, and the liquid temperature was raised to 60° C. and maintained at the same temperature for 1 hour. The solid was separated by filtration and washed with 200 parts of water to obtain a wet cake. The obtained wet cake was added to 450 parts of 5% ammonia water, the liquid temperature was raised to 60° C., and the mixture was maintained at the same temperature for 1 hour. The solid was separated by filtration and washed with 200 parts of water to obtain 78.6 parts of a wet cake. The obtained wet cake was dried at 80° C. to obtain 32.6 parts of the above-described intended compound as a blue solid.

Step 2

Synthesis of the compound represented by the above formula (2), wherein 0.75 of the rings of A to D is a pyridine ring fused at the 2- and 3-positions, the rest 3.25 are benzene rings and n is 3.25.

To 46.1 parts of chlorosulfonic acid, 5.7 parts of the compound of the above formula (4) obtained in the above-described Example 3 (Step 1) were so gradually added that the temperature was not over 60° C., and then said reaction liquid was maintained at 145° C. for 4 hours. After that, the reaction liquid was cooled to 70° C., 17.8 parts of thionyl chloride were added dropwise thereto over 30 minutes, and then the liquid temperature was raised to 80° C. and the reaction was further carried out at the same temperature for 3 hours. The reaction liquid was cooled to 30° C. or less and slowly poured into 800 parts of ice water. The precipitated solid was separated by filtration and washed with 100 parts of cold water to obtain 32.2 parts of a wet cake of the intended compound represented by the above formula (2).

Step 3

Synthesis of the porphyrazine coloring matter of the present invention represented by the above formula (7) [coloring matter of the above formula (1) wherein 0.75 of the rings of A to D is a pyridine ring fused at the 2- and 3-positions, the rest 3.25 are benzene rings, E is ethylene, X is 2,5-disulfoanilino, $R_1$ is methyl, b is 2.45, and c is 0.8].

To 150 parts of ice water, 32.2 parts of the wet cake obtained in Example 3 (Step 2) were added, and the mixture was suspended by stirring at 5° C. or less. Ten minutes later, while maintaining the liquid temperature at 10° C. or less, a solution dissolving 3.3 parts of an organic amine represented by the above formula (6) in a mixed liquid of 1 part of 28% ammonia water and 50 parts of water was added to this suspension. While maintaining said suspension at pH 9.0 with 28% ammonia water, the reaction was carried out. With the pH of said suspension maintained, the liquid temperature was raised to 20° C. over 1 hour, and the reaction was further carried out at the same temperature for 8 hours. The liquid volume at this time was 250 parts. The temperature of the reaction liquid was raised to 50° C., 37.5 parts of sodium chloride were added thereto, and the mixture was stirred for 30 minutes. After that, concentrated hydrochloric acid was added over 20 minutes to adjust the pH of this reaction liquid to 1.0. The precipitated solid was separated by filtration and washed with 100 parts of a 10% aqueous sodium chloride solution to obtain 51.1 parts of a wet cake.

The obtained wet cake was added to 200 parts of water, and by adjusting to pH 9.0 with a 25% aqueous sodium hydroxide solution, said wet cake was dissolved. The liquid volume at this time was 275 parts. The temperature of this solution was raised to 50° C., 27.5 parts of sodium chloride were added thereto, and said solution was stirred for 30 minutes. After that, concentrated hydrochloric acid was added over 20 minutes to adjust to pH 1.0, and the precipitated solid was separated by filtration and washed with 100 parts of a 10% aqueous sodium chloride solution to obtain 47.3 parts of a wet cake. The obtained wet cake was added to a mixed liquid of 160 parts of ethanol and 40 parts of water, and said liquid was stirred at 50° C. for 1 hour. After that, the solid was separated by filtration to obtain 16.3 parts of a wet cake. The obtained wet cake was dried to obtain 10.0 parts of free acid of a coloring matter of the present invention represented by the above formula (7) as a blue powder.
λmax: 604 nm.

Example 4

Step 1

Synthesis of the organic amine represented by the following formula (8) [organic amine of the above formula (3) wherein E is ethylene, X is 2,5-disulfoanilino, and $R_1$ is ethyl].

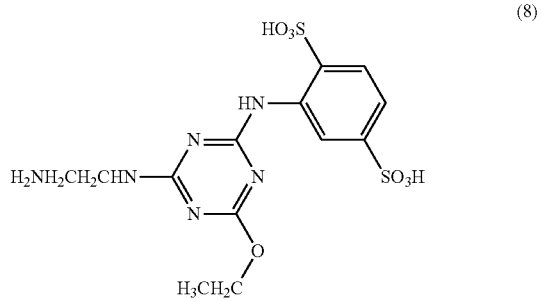

To 80 parts of ethanol, 18.4 parts of cyanuric chloride, 2 parts of LEOCOL® TD-90 (trade name) and 8.4 parts of sodium hydrogen carbonate were added, and the reaction was carried out at 30° C. or less for 4 hours to obtain a reaction liquid containing a first condensate.

To 150 parts of water, 30.1 parts of 2,5-disulfoaniline were added, and 17 parts of a 25% aqueous sodium hydroxide solution were further added to adjust the pH of this liquid to 3 to 5. To this liquid, the reaction liquid containing the first condensate obtained as described above was added gradually, and while adjusting the pH to 6 to 7 by further adding a 25% aqueous sodium hydroxide solution, the reaction was carried out at room temperature for 7 hours to obtain a reaction liquid containing a second condensate.

To the obtained reaction liquid, 180 parts of hydrochloric acid and 63 parts of ice were added, the reaction liquid was cooled to 0° C., 60.1 parts of ethylenediamine were further added dropwise, and then the reaction was carried out at room temperature overnight to obtain a reaction liquid containing a third condensate.

To this solution, 20 parts of hydrochloric acid were added to adjust the pH of the reaction liquid to 1.0. The liquid volume at this time was 700 parts. To this liquid, 140 parts of sodium chloride were added, and this liquid was stirred for 30 minutes to precipitate a solid. The precipitated solid was separated by filtration to obtain 130.9 parts of a wet cake. The obtained wet cake was added to 850 parts of water, and a 25% aqueous sodium hydroxide solution was added thereto to adjust to pH 9.0, whereby said wet cake was dissolved. To this solution, 64 parts of hydrochloric acid were added to adjust to pH 1.0. At this time, the liquid volume was 900 parts. To this liquid, 180 parts of sodium chloride were added, and this liquid was stirred at room temperature for 30 minutes and subsequently at 0° C. for 30 minutes. The precipitated solid was separated by filtration to obtain 39.6 parts of a wet cake. The obtained wet cake was added to a mixed liquid of 160 parts of methanol and 40 parts of water, and said liquid was stirred at 50° C. for 1 hour. The solid was separated by filtration to obtain 15.4 parts of a wet cake. The obtained wet cake was dried to obtain 11.8 parts of a white powder of the intended organic amine represented by the above-described formula (8).

Step 2

Synthesis of the porphyrazine coloring matter of the present invention represented by the following formula (9) [coloring matter of the following formula (9) wherein 1.00 of the rings of A to D is a pyridine ring fused at the 2- and 3-positions, the rest 3.00 are benzene rings, E is ethylene, X is 2,5-disulfoanilino, $R_1$ is ethyl, b is 2.0, and c is 1.0]

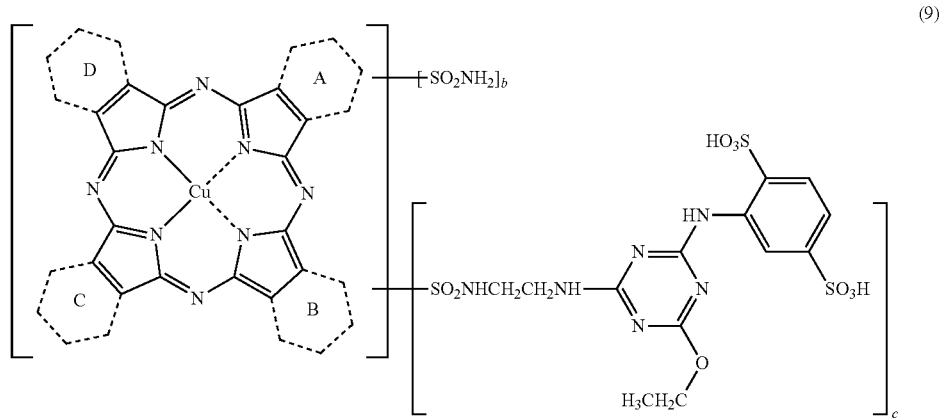

To 100 parts of ice water, 31.5 parts of a wet cake obtained in the same manner as in Example 2 (Step 1) and (Step 2) were added, and the mixture was suspended by stirring at 5° C. or less. Ten minutes later, while maintaining the liquid temperature at 10° C. or less, a solution dissolving 4.2 parts of the organic amine represented by the above-described formula (8) in a mixed liquid of 3 parts of 28% ammonia water and 40 parts of water was added to this suspension. While maintaining said suspension at pH 9.0 with 28% ammonia water, the reaction was carried out. With the pH of said suspension maintained, the liquid temperature was raised to 20° C. over 1 hour, and the reaction was further carried out at the same temperature for 8 hours. The liquid volume at this time was 225 parts. The temperature of the reaction liquid was raised to 50° C., 33.8 parts of sodium chloride was added thereto, and the mixture was stirred for 30 minutes. After that, concentrated hydrochloric acid was added over 20 minutes to adjust the pH of this reaction liquid to 1.0. The precipitated solid was separated by filtration and washed with 100 parts of a 10% aqueous sodium chloride solution to obtain 59.9 parts of a wet cake.

The obtained wet cake was added to 150 parts of water, and a 25% aqueous sodium hydroxide solution was added thereto to adjust to pH 9.0, whereby said wet cake was dissolved. The liquid volume at this time was 225 parts. The temperature of this solution was raised to 50° C., 22.5 parts of sodium chloride were added thereto, and the mixture was stirred for 30 minutes. After that, concentrated hydrochloric acid was added over 20 minutes to adjust to pH 1.0, and the precipitated solid was separated by filtration and washed with 100 parts of a 10% aqueous sodium chloride solution to obtain 55.1 parts of a wet cake. The obtained wet cake was added to a mixed liquid of 240 parts of ethanol and 60 parts of water, and said liquid was stirred at 50° C. for 1 hour. After that, the solid was separated by filtration to obtain 52.1 parts of a wet cake. The obtained wet cake was dried to obtain 9.2 parts of free acid of a coloring matter of the present invention represented by the above-described formula (9) as a blue powder.
λmax: 603 nm.

Example 5

Step 1

Synthesis of the organic amine represented by the following formula (10) [organic amine of the above formula (4) wherein E is ethylene, X is 3,8-disulfo-1-naphthylamino, and $R_1$ is methyl].

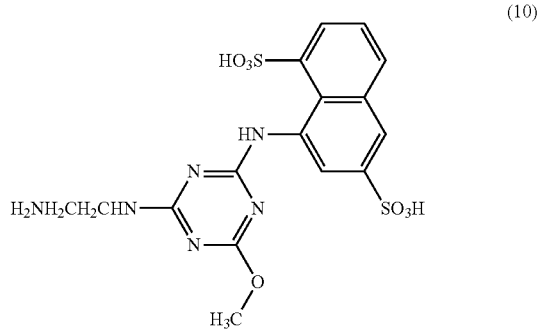

(10)

To 80 parts of methanol and 20 parts of ice, 9.2 parts of cyanuric chloride, 1 part of LEOCOL® TD-90 (trade name) and 4.2 parts of sodium hydrogen carbonate were added, and the reaction was carried out at 30° C. or less for 1 hour to obtain a reaction liquid containing a first condensate.

To 75 parts of water, 14.9 parts of 3,8-disulfo-1-naphthylamine were added, and 5 parts of a 25% aqueous sodium hydroxide solution were further added to adjust the pH of this liquid to 4 to 6. To this liquid, the reaction liquid containing the above-described first condensate was gradually added, and while adjusting the pH to 6 to 7 by further adding a 25% aqueous sodium hydroxide solution, the reaction was carried out at room temperature overnight to obtain a reaction liquid containing a second condensate.

To the obtained reaction liquid, 90 parts of hydrochloric acid and 30 parts of ice, the reaction liquid was cooled to 0° C., and 30.1 parts of ethylenediamine were further added dropwise. After that, while adjusting to pH 5 to 6 by adding a 25% aqueous sodium hydroxide solution to the resulting liquid, the reaction was carried out at room temperature overnight to obtain a reaction liquid containing a third condensate.

To this solution, 20 parts of hydrochloric acid were added to adjust the pH of the solution to 1.0. The liquid volume at this time was 350 parts. Thereto, 40 parts of sodium chloride were added, and this liquid was stirred for 30 minutes to precipitate a solid. The precipitated solid was separated by filtration to obtain 58.0 parts of a wet cake. The obtained wet cake was placed in a beaker, 300 parts of water were added thereto, and a 25% aqueous sodium hydroxide solution was further added to adjust to pH 9.0, whereby the solid was dissolved. To this solution, 24 parts of hydrochloric acid were added to adjust to pH 1.0. At this time, the liquid volume was 410 parts. To this liquid, 80 parts of sodium chloride were added, and this liquid was stirred overnight at room temperature and further stirred at 0° C. for 30 minutes to precipitate a solid. The precipitated solid was separated by filtration to obtain 11.3 parts of a wet cake. The obtained wet cake was placed in a beaker, 48 parts of methanol and 12 parts of water were added thereto, and said liquid was stirred at 50° C. for 1 hour. After that, the solid was separated by filtration to obtain 9.1 parts of a wet cake. The obtained wet cake was dried to obtain 8.3 parts of a white powder of the intended organic amine represented by the above-described formula (10).

Step 2

Synthesis of the porphyrazine coloring matter of the present invention represented by the following formula (11) [coloring matter of the above formula (1) wherein 1.00 of the rings of A to D is a pyridine ring fused at the 2- and 3-positions, the rest 3.00 are benzene rings, E is ethylene, X is 3,8-disulfo-1-naphthylamino, $R_1$ is methyl, b is 2.0, and c is 1.0].

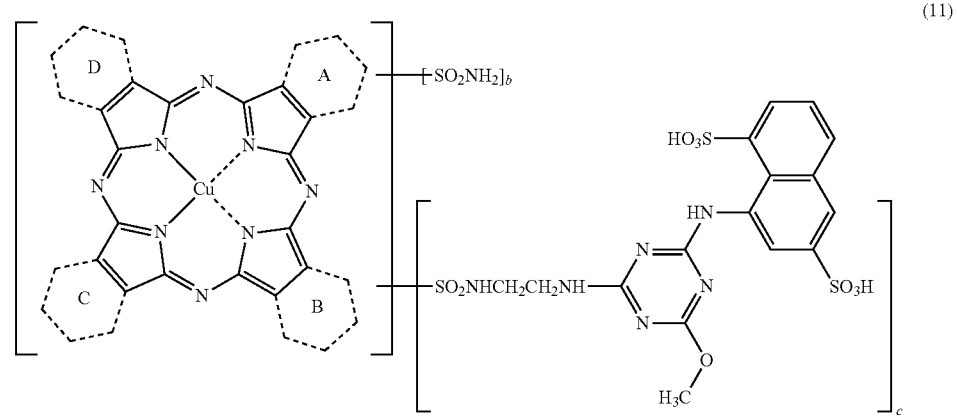

(11)

To 120 parts of ice water, 31.5 parts of a wet cake obtained in the same manner as in Example 2 (Step 1) and (Step 2) were added, and the mixture was suspended by stirring at 5° C. or less. Ten minutes later, while maintaining the liquid temperature at 10° C. or less, a solution dissolving 4.7 parts of the organic amine represented by the above-described formula (10) in 1 part of 28% ammonia water and 40 parts of water was added to this suspension. While adding 28% ammonia water thereto, the pH 9.0 of said suspension was maintained and the reaction was carried out. With the pH of said suspension maintained, the liquid temperature was raised to 20° C. over 1 hour, and the reaction was further carried out at the same temperature for 8 hours. The liquid volume at this time was 290 parts. The temperature of the reaction liquid was raised to 50° C., 53 parts of sodium chloride were added thereto, and the mixture was stirred for 30 minutes. After that, concentrated hydrochloric acid was added over 20 minutes to adjust the pH of this reaction liquid to 1.0. The precipitated solid was separated by filtration and washed with 100 parts of a 10% aqueous sodium chloride solution to obtain 41.3 parts of a wet cake.

The obtained wet cake was added to 200 parts of water, and by adjusting to pH 9.0 with a 25% aqueous sodium hydroxide solution, said wet cake was dissolved. The liquid volume at this time was 260 parts. The temperature of this solution was raised to 50° C., and 45 parts of sodium chloride were added thereto. Said solution was stirred for 30 minutes, and then concentrated hydrochloric acid was added over 20 minutes to adjust the pH of said solution to 4.0. The precipitated solid was separated by filtration and washed with 100 parts of a 20% aqueous sodium chloride solution to obtain 23.9 parts of a wet cake. The obtained wet cake was added to a mixed solvent of 40 parts of water, 80 parts of methanol and 80 parts of isopropylalcohol, and said liquid was stirred at 50° C. for 1 hour. After that, the solid was separated by filtration to obtain 21.6 parts of a wet cake. The obtained wet cake was dried to obtain 9.5 parts of free acid of a coloring matter of the present invention represented by the above-described formula (11) as a blue powder.

λmax: 603 nm.

Example 6

Step 1

Synthesis of the organic amine represented by the following formula (12) [organic amine of the above formula (3) wherein E is ethylene, X is 4,8-disulfo-2-naphthylamino, and R₁ is methyl].

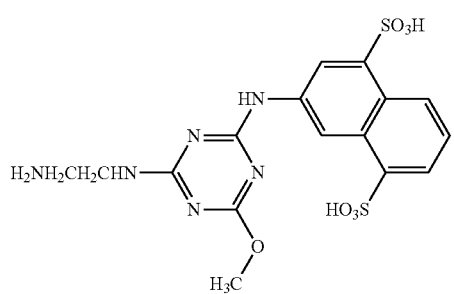

(12)

To 80 parts of methanol and 20 parts of ice, 18.4 parts of cyanuric chloride, 2 parts of LEOCOL®TD-90 (trade name) and 8.4 parts of sodium hydrogen carbonate were added, and the reaction was carried out at 30° C. or less for 1 hour to obtain a reaction liquid containing a first condensate.

To 180 parts of water, 30.4 parts of 2-amino-4,8-disulfonaphthalene were added, and 10 parts of a 25% aqueous sodium hydroxide solution were further added to adjust the pH of this liquid to 4 to 6. To this liquid, the reaction liquid containing the above-described first condensate was gradually added, and while adjusting the pH to 6 to 7 by further adding a 25% aqueous sodium hydroxide solution, the reaction was carried out at room temperature for 3 hours to obtain a reaction liquid containing a second condensate.

To the obtained reaction liquid, 180 parts of hydrochloric acid and 60 parts of ice were added, the reaction liquid was cooled to 0° C., and 60.1 parts of ethylenediamine were further added dropwise. After that, while adjusting to pH 5 to 6 by adding a 25% aqueous sodium hydroxide solution thereto, the reaction was carried out at room temperature overnight to obtain a reaction liquid containing a third condensate.

To this solution, 40 parts of hydrochloric acid were added to adjust the pH of the reaction liquid to 1.0. The liquid volume at this time was 720 parts. Thereto, 120 parts of sodium chloride were added, and this liquid was stirred for 30 minutes to precipitate a solid. The precipitated solid was separated by filtration to obtain 141.3 parts of a wet cake. The obtained wet cake was placed in a beaker, 600 parts of water were added, and a 25% aqueous sodium hydroxide solution was further used to adjust to pH 9.0, whereby said wet cake was dissolved. To this solution, 65 parts of hydrochloric acid were added to adjust to pH 1.0. At this time, the liquid volume was 820 parts. To this liquid, 190 parts of sodium chloride were added, and said liquid was stirred for 30 minutes at room temperature and subsequently at 0° C. for 30 minutes to precipitate a solid. The precipitated solid was separated by filtration to obtain 52.2 parts of a wet cake. The obtained wet cake was placed in a beaker, 200 parts of methanol and 50 parts of water were added thereto, and the mixture was stirred at 50° C. for 1 hour. The solid was separated by filtration to obtain 58.6 parts of a wet cake. The obtained wet cake was dried to obtain 34.3 parts of a white powder of the intended organic amine represented by the above-described formula (12).

Step 2

Synthesis of the porphyrazine coloring matter of the present invention represented by the following formula (13) [coloring matter of the above formula (1) wherein 1.00 of the rings of A to D is a pyridine ring fused at the 2- and 3-positions, the rest 3.00 are benzene rings, E is ethylene, X is 4,8-disulfo-2-naphthylamino, R₁ is methyl, b is 2.0, and c is 1.0].

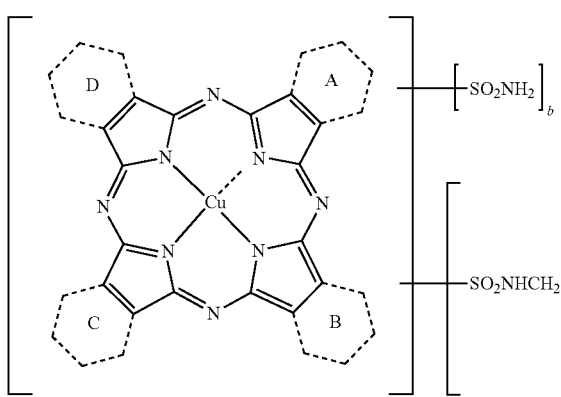

(13)

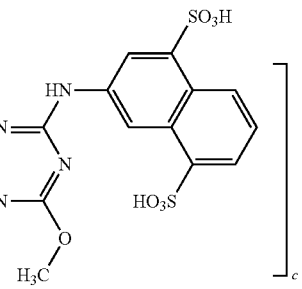

(14)

To 120 parts of ice water, 31.5 parts of a wet cake obtained in the same manner as in Example 2 (Step 1) and (Step 2) were added, and the mixture was suspended by stirring at 5° C. or less. Ten minutes later, while maintaining the liquid temperature at 10° C. or less, a solution dissolving 5.4 parts of the organic amine represented by the above-described formula (12) in 1 part of 28% ammonia water and 40 parts of water was added to this suspension. While adding 28% ammonia water to said suspension, pH 9.0 was maintained and the reaction was carried out. With the pH of said suspension maintained, the liquid temperature was raised to 20° C. over 1 hour, and the reaction was further carried out at the same temperature for 8 hours. The liquid volume at this time was 230 parts. The temperature of the reaction liquid was raised to 50° C., 34.5 parts of sodium chloride were added thereto, and the mixture was stirred for 30 minutes. After that, concentrated hydrochloric acid was added over 20 minutes to adjust the pH of this reaction liquid to 1.0. The precipitated solid was separated by filtration and washed with 100 parts of a 10% aqueous sodium chloride solution to obtain 51.5 parts of a wet cake.

The obtained wet cake was added to 200 parts of water, and by adjusting to pH 9.0 with a 25% aqueous sodium hydroxide solution, said wet cake was dissolved. The liquid volume at this time was 225 parts. The temperature of this solution was raised to 50° C., 22.5 parts of sodium chloride were added thereto, and said solution was stirred for 30 minutes. After that, concentrated hydrochloric acid was added over 20 minutes to adjust to pH 4.0, and then the precipitated solid was separated by filtration and washed with 100 parts of a 10% aqueous sodium chloride solution to obtain 53.9 parts of a wet cake. The obtained wet cake was added to a mixed solvent of 160 parts of ethanol and 40 parts of water, and said liquid was stirred at 50° C. for 1 hour. After that, the solid was separated by filtration to obtain 22.2 parts of a wet cake. The obtained wet cake was dried to obtain 10.0 parts of free acid of a coloring matter of the present invention represented by the above-described formula (13) as a blue powder.

λmax: 607 nm.

Example 7

Step 1

Synthesis of the organic amine represented by the following formula (14) [organic amine of the above formula (4) wherein E is ethylene, X is 6,8-disulfo-2-naphthylamino, and $R_1$ is methyl].

To 80 parts of methanol and 20 parts of ice, 18.4 parts of cyanuric chloride, 2 parts of LEOCOL® TD-90 (trade name) and 8.4 parts of sodium hydrogen carbonate were added, and the mixture was stirred at 30° C. or less for 1 hour to obtain a reaction liquid containing a first condensate. To said reaction liquid, 60 parts of ice were added, and said reaction liquid was stirred at 0° C. for 30 minutes to precipitate a solid. The precipitated solid was separated by filtration to obtain 17.7 parts of a wet cake of a first condensate.

To 160 parts of water, 33.1 parts of 2-amino-6,8-disulfonaphthalene and 0.2 parts of LEOCOL® TD-90 were added, and 6 parts of a 25% aqueous sodium hydroxide solution were further added to adjust the pH to 3 to 5. While stirring said liquid, the wet cake containing the above-described first condensate was gradually added, and then while adjusting to pH 5 to 7 by further adding a 25% aqueous sodium hydroxide solution, the reaction was carried out at room temperature for 2 hours to obtain a reaction liquid containing a second condensate.

To the obtained reaction liquid, 180 parts of hydrochloric acid and 60 parts of ice were added, the reaction liquid was cooled to 0° C., and 54.1 parts of ethylenediamine were added dropwise. After that, while adjusting to pH 5 to 6 by adding a 25% aqueous sodium hydroxide solution to the resulting liquid, the liquid was stirred at room temperature overnight to obtain a reaction liquid containing a third condensate.

To this solution, 40 parts of hydrochloric acid were added to adjust the pH of the solution to 1.0. The liquid volume at this time was 600 parts. To the resulting solution, 60 parts of sodium chloride were added, and said solution was stirred for 30 minutes to precipitate a solid. The precipitated solid was separated by filtration to obtain 95.6 parts of a wet cake. The obtained wet cake was placed in a beaker, 500 parts of water were added thereto, and a 25% aqueous sodium hydroxide solution was further used to adjust to pH 9.0, whereby said wet cake was dissolved. To this solution, 20 parts of hydrochloric acid were added to adjust to pH 1.0. At this time, the liquid volume was 640 parts. To this solution, 80 parts of sodium chloride were added, and this solution was stirred for 30 minutes at room temperature and further stirred at 0° C. for 30 minutes to precipitate a solid. The precipitated solid was separated by filtration to obtain 121.7 parts of a wet cake. The obtained wet cake was placed in a beaker, 480 parts of methanol and 120 parts of water were added thereto, and said liquid was stirred at 50° C. for 1 hour. After that, the solid was separated by filtration to obtain 73.8 parts of a wet cake. The obtained wet cake was dried to obtain 33.1 parts of a white powder of the intended organic amine represented by the above-described formula (14).

Step 2

Synthesis of the coloring matter of the present invention represented by the following formula (15) [coloring matter of the above formula (1) wherein 1.00 of the rings of A to D is a pyridine ring fused at the 2- and 3-positions, the rest 3.00 are benzene rings, E is ethylene, X is 6,8-disulfo-2-naphthylamino, $R_1$ is methyl, b is 2.0, and c is 1.0].

aqueous sodium chloride solution to obtain 33.5 parts of a wet cake. The obtained wet cake was added to a mixed solvent of 80 parts of methanol, 80 parts of isopropylalcohol and 40 parts of water, and said liquid was stirred at 50° C. for 1 hour. After that, the solid was separated by filtration to obtain 27.2 parts of a wet cake. The obtained wet cake was dried to obtain 11.1 parts of free acid of a coloring matter of the present invention represented by the above-described formula (15) as a blue powder.

λmax: 608 nm.

Example 8

Step 1

Synthesis of the organic amine represented by the following formula (16) [organic amine of the above formula (3) wherein E is ethylene, X is 8-hydroxy-3,6-disulfonaphthalen-1-ylamino, and $R_1$ is methyl].

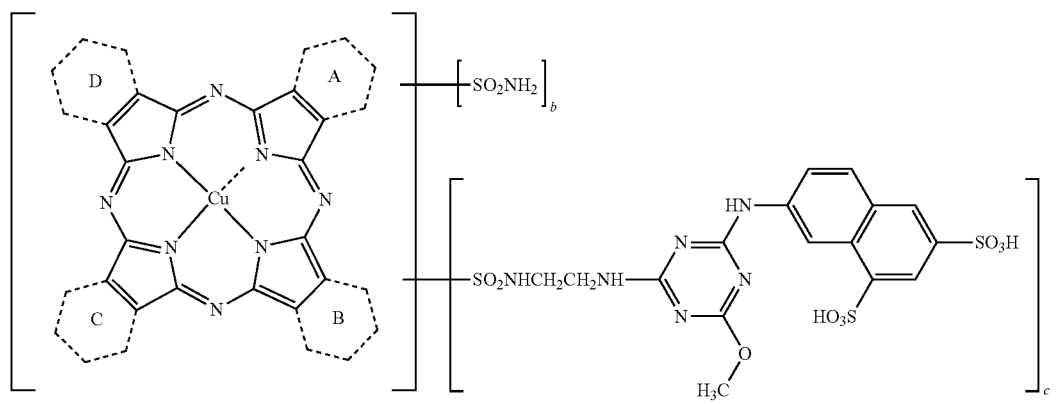

(15)

To 120 parts of ice water, 33.0 parts of a wet cake obtained in the same manner as in Example 2 (Step 1) and (Step 2) were added, and the mixture was suspended by stirring at 5° C. or less. Ten minutes later, while maintaining the liquid temperature at 10° C. or less, a solution dissolving 5.9 parts of the organic amine represented by the above-described formula (14) in 1 part of 28% ammonia water and 40 parts of water was added to this suspension. While adding 28% ammonia water, the pH of said suspension was maintained at 9.0 and the reaction was carried out. With the pH of said suspension maintained, the liquid temperature was raised to 20° C. over 1 hour, and the reaction was further carried out at the same temperature for 8 hours. The liquid volume at this time was 200 parts. The temperature of the reaction liquid was raised to 50° C., 44 parts of sodium chloride were added thereto, and the mixture was stirred for 30 minutes. After that, concentrated hydrochloric acid was added over 20 minutes to adjust the pH of the reaction liquid to 1.0. The precipitated solid was separated by filtration and washed with 100 parts of a 10% aqueous sodium chloride solution to obtain 45.0 parts of a wet cake.

The obtained wet cake was added to 200 parts of water, and by adjusting to pH 9.0 with a 25% aqueous sodium hydroxide solution, said wet cake was dissolved. The liquid volume at this time was 250 parts. The temperature of this solution was raised to 50° C., 80 parts of sodium chloride were added thereto, and said solution was stirred for 30 minutes. After that, concentrated hydrochloric acid was added over 20 minutes to adjust to pH 7.0, and then the precipitated solid was separated by filtration and washed with 100 parts of a 10%

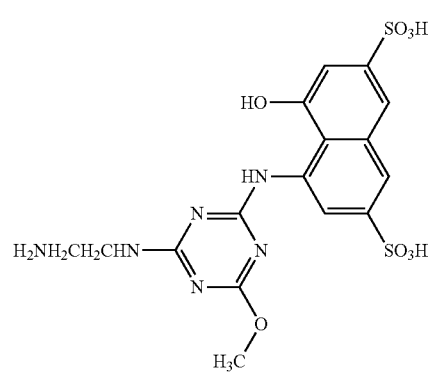

(16)

To 80 parts of methanol, 20 parts of ice, 18.4 parts of cyanuric chloride, 2 parts of LEOCOL® TD-90 (trade name) and 16.8 parts of sodium hydrogen carbonate were added, and the reaction was carried out at 30° C. or less for 1 hour to obtain a reaction liquid containing a first condensate.

To a liquid where 38.7 parts of 8-hydroxy-3,6-disulfo-1-naphthylamine (commercial product having a purity of 82.5%) and 16 parts of a 25% aqueous sodium hydroxide solution were added to 200 parts of water, the reaction liquid containing the first condensate obtained as described above was gradually added. While adjusting this reaction liquid to pH 6 to 7 by adding a 25% aqueous sodium hydroxide solution, said liquid was stirred at room temperature overnight to obtain a reaction liquid containing a second condensate.

To the obtained reaction liquid, 180 parts of hydrochloric acid and 60 parts of ice were added, the reaction liquid was cooled to 0° C., and 60 parts of ethylenediamine were further added dropwise thereto. While adjusting the pH of this liquid to 5 to 6 with a 25% aqueous sodium hydroxide solution, the reaction liquid was stirred at 80° C. for 2.5 hours to obtain a reaction liquid containing a third condensate.

To this solution, 55 parts of hydrochloric acid were added to adjust the pH of the solution to 1.0. The liquid volume at this time was 500 parts. To this liquid, 100 parts of sodium chloride were added, and this liquid was stirred for 30 minutes to precipitate a solid. The precipitated solid was separated by filtration to obtain 77.1 parts of a wet cake. The obtained wet cake was added to 300 parts of water, and a 25% aqueous sodium hydroxide solution was added thereto to adjust to pH 9.0, whereby said wet cake was dissolved. To this solution, 15.0 parts of hydrochloric acid were added to adjust the pH of said solution to 1.0. The liquid volume at this time was 420 parts. To this liquid, 84 parts of sodium chloride were added, and this liquid was stirred at room temperature for 30 minutes and subsequently at 0° C. for 30 minutes to precipitate a solid. The precipitated solid was separated by filtration to obtain 66.1 parts of a wet cake. To a mixed liquid of 120 parts of methanol, 120 parts of isopropanol and 60 parts of water, the obtained wet cake was added, and said liquid was stirred at 50° C. for 1 hour. After that, the solid was separated by filtration to obtain 62.1 parts of a wet cake. The obtained wet cake was dried to obtain 23.5 parts of a pale purple powder of the intended organic amine represented by the above-described formula (16).

Step 2

Synthesis of the porphyrazine coloring matter of the present invention represented by the following formula (17) [coloring matter of the above formula (1) wherein 1.00 of the rings A to D is a pyridine ring fused at the 2- and 3-positions, the rest 3.00 are benzene rings, E is ethylene, X is 8-hydroxy-3,6-disulfonaphthalen-1-ylamino, $R_1$ is methyl, b is 2.0, and c is 1.0].

To 200 parts of ice water, 31.5 parts of a wet cake obtained in the same manner as in Example 2 (Step 1) and (Step 2) were added, and the mixture was suspended by stirring at 5° C. or less. Ten minutes later, while maintaining the liquid temperature at 10° C. or less, a solution dissolving 4.9 parts of the organic amine represented by the above-described formula (16) in 1 part of 28% ammonia water and 40 parts of water was added to this suspension. While further adding 28% ammonia water, the pH of said suspension was maintained at 9.0 and the reaction was carried out. With the pH of said suspension maintained, the liquid temperature was raised to 20° C. over 1 hour, and the reaction was further carried out at the same temperature for 8 hours. The liquid volume at this time was 250 parts. The temperature of the reaction liquid was raised to 50° C., 50 parts of sodium chloride were added thereto, and said reaction liquid was stirred for 30 minutes. After that, concentrated hydrochloric acid was added over 20 minutes to adjust the pH of said reaction liquid to 5.0. The precipitated solid was separated by filtration and washed with 100 parts of a 20% aqueous sodium chloride solution to obtain 42.1 parts of a wet cake.

The obtained wet cake was added to 170 parts of water, and a 25% sodium hydroxide aqueous solution was added thereto to adjust the pH to 9.0, whereby said wet cake was dissolved. The liquid volume at this time was 250 parts. The temperature of this solution was raised to 50° C., 25 parts of sodium chloride were added thereto, and said solution was stirred for 30 minutes. After that, concentrated hydrochloric acid was added over 20 minutes to adjust to pH 2.0, and then the precipitated solid was separated by filtration and washed with 100 parts of a 10% aqueous sodium chloride solution to obtain 43.2 parts of a wet cake. The obtained wet cake was added to a mixed solvent of 160 parts of ethanol and 40 parts of water, and said liquid was stirred at 50° C. for 1 hour. After that, the solid was separated by filtration to obtain 13.3 parts of a wet cake. The obtained wet cake was dried to obtain 9.8 parts of free acid of a coloring matter of the present invention represented by the above-described formula (17) as a blue powder.

λmax: 607 nm.

[Synthesis of Coloring Matter for Comparison]

Hereinafter, the method for synthesizing a coloring matter for comparison will be explained.

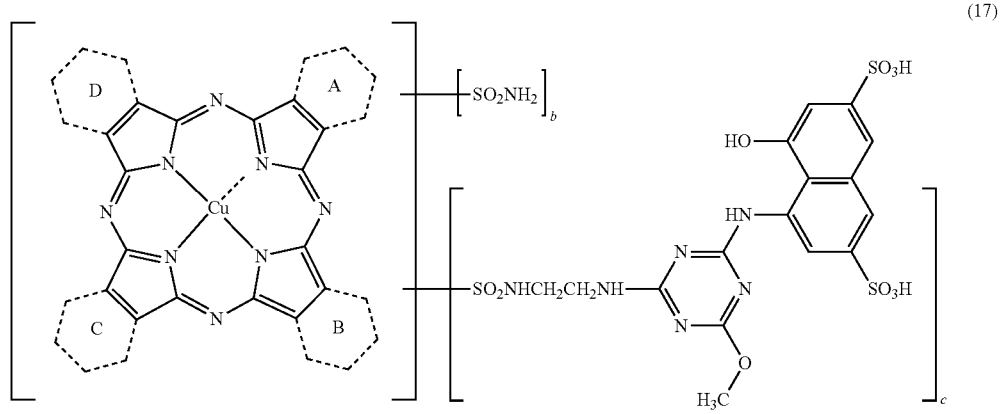

Synthesis Example 1

Step 1

Synthesis of the organic amine for comparison represented by the following formula (18).

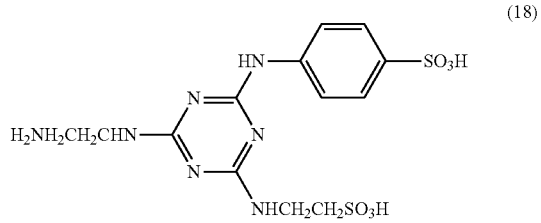

(18)

To 330 parts of ice water, 18.4 parts of cyanuric chloride and 0.2 parts of LEOCOL® TD-90 (trade name) were added, and this liquid was stirred at 10° C. or less for 30 minutes. To this liquid, 17.4 parts of 4-sulfoaniline (commercial product having a purity of 99.3%) were added, and while adjusting the pH of said liquid by further adding a 10% aqueous sodium hydroxide solution, the reaction was carried out at pH 2.6 to 3.0 and 0 to 5° C. for 1 hour and subsequently at pH 3.0 to 3.5 and 0 to 5° C. for 1 hour, and while maintaining pH 3.0 to 3.5, it was further carried out at 25 to 30° C. for 1 hour. To the obtained reaction liquid, 12.6 parts of 2-sulfoethylamine were added, and while adjusting to pH 7.0 to 8.0 by further adding a 10% aqueous sodium hydroxide solution, the reaction was carried out at 25° C. for 2 hours. To this reaction liquid, 250 parts of ice were added, the reaction liquid was cooled to 0° C., 60 parts of ethylenediamine were further added dropwise thereto at 5° C. or less, and the reaction was carried out at room temperature overnight. After that, using concentrated hydrochloric acid, the pH of said reaction liquid was adjusted to 1.0. During the pH adjustment with concentrated hydrochloric acid, ice was added to the reaction liquid to suppress exothermic heat, and the liquid temperature was maintained at 10 to 15° C. At this time, the liquid volume was 980 parts. To this liquid, 190 parts of sodium chloride were added, this liquid was stirred for 30 minutes, and the precipitated solid was separated by filtration to obtain 70.6 parts of a wet cake.

The obtained wet cake was added to 280 parts of water, and a 10% aqueous sodium hydroxide solution was added thereto to adjust the pH to 9.0, whereby said wet cake was dissolved. At this time, the liquid volume was 400 parts. This solution was adjusted to pH 1.0 with concentrated hydrochloric acid, subsequently 80 parts of sodium chloride were added, and then the mixture was stirred for 30 minutes. The precipitated solid was separated by filtration to obtain 110.1 parts of a wet cake. The obtained wet cake was added to a mixed liquid of 260 parts of methanol and 26 parts of water, said liquid was stirred at 50° C. for 1 hour, and then the solid was separated by filtration to obtain 89.1 parts of a wet cake. The obtained wet cake was dried to obtain 49.3 parts of a white powder of the intended organic amine for comparison represented by the above-described formula (18).

Step 2

Synthesis of the coloring matter for comparison represented by the following formula (19) [coloring matter of the following formula (19) wherein 1.00 of the rings of A to D is a pyridine ring fused at the 2- and 3-positions, the rest 3.00 are benzene rings, b is 1.625, and c is 1.0].

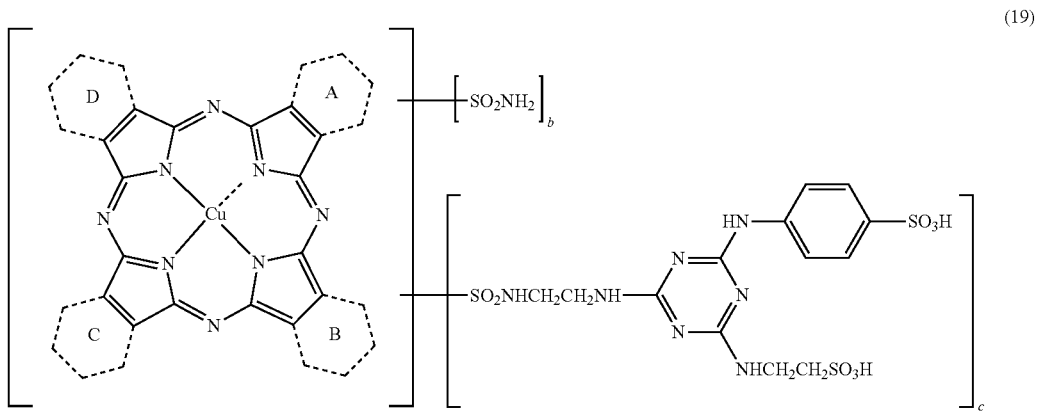

(19)

To 100 parts of ice water, 31.5 parts of a wet cake obtained in the same manner as in Example 2 (Step 1) and (Step 2), the mixture was suspended by stirring at 5° C. or less. Ten minutes later, while maintaining the liquid temperature at 10° C. or less, a solution dissolving 4.3 parts of the organic amine for comparison represented by the above-described formula (18) in 2 parts of 28% ammonia water and 50 parts of water was added to this suspension, and while maintaining the pH of said liquid to 9.0 with 28% ammonia water, the reaction was carried out. With the pH of said suspension maintained, the liquid temperature was raised to 20° C. over 1 hour, and the reaction was further carried out at the same temperature for 8 hours. The liquid volume at this time was 225 parts. The temperature of the reaction liquid was raised to 50° C., 33.7 parts of sodium chloride were added thereto, and said reaction liquid was stirred for 30 minutes. After that, concentrated hydrochloric acid was added over 20 minutes to adjust the pH of said reaction liquid to 2.0. The precipitated solid was separated by filtration and washed with 100 parts of a 10% aqueous sodium chloride solution to obtain 46.1 parts of a wet cake.

The obtained wet cake was added to 150 parts of water, and a 25% aqueous sodium hydroxide solution was added thereto to adjust to pH 9.0, whereby said wet cake was dissolved. The liquid volume at this time was 225 parts. The temperature of the resulting solution was raised to 50° C., 22.5 parts of sodium chloride were added thereto, and said solution was stirred for 30 minutes. After that, concentrated hydrochloric acid was added over 20 minutes to adjust to pH 1.0, and the precipitated solid was separated by filtration and washed with 100 parts of a 10% aqueous sodium chloride solution to obtain 44.2 parts of a wet cake. The obtained wet cake was added to a mixed liquid of 255 parts of methanol and 45 parts of water, and said liquid was stirred at 50° C. for 1 hour. After that, the solid was separated by filtration to obtain 25.2 parts of a wet cake. The obtained wet cake was dried to obtain 9.8 parts of free acid of the intended coloring matter for comparison represented by the above-described formula (19) as a blue powder.
λmax: 604 nm.

Synthesis Example 2

Step 1

Synthesis of the organic amine for comparison represented by the following formula (20).

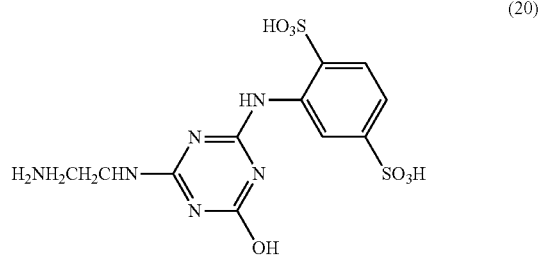

(20)

To 150 parts of ice water, 36.8 parts of cyanuric chloride and 0.4 parts of LEOCOL® TD-90 (trade name) were added, and this liquid was stirred at 10° C. or less for 30 minutes. Next, 62.0 parts of aniline-2,5-disulfonic acid monosodium salt (commercial product having a purity of 90.5%) were added thereto, and while adjusting the pH of said liquid to 2.5 to 3.0 by further adding a 10% aqueous sodium hydroxide solution, the reaction was carried out at 0 to 10° C. for 1 hour 30 minutes and subsequently at 20 to 25° C. for 1 hour 30 minutes. While adjusting to pH 9.0 to 9.5 by adding a 10% aqueous sodium hydroxide solution to the obtained reaction liquid, the reaction was carried out at 45° C. for 1 hour, and subsequently while likewise adjusting to pH 10.0 to 10.5, it was carried out at 45° C. for 1 hour. To the obtained reaction liquid, 250 parts of ice were added to cool the reaction liquid to 0° C., and while adjusting so that the temperature was not over 5° C., 120 parts of ethylenediamine were added dropwise to this reaction liquid. The obtained reaction liquid was stirred at room temperature overnight and then adjusted to pH 2.0 with concentrated hydrochloric acid. During the addition of concentrated hydrochloric acid, ice was added to maintain the liquid temperature at 10 to 15° C. While maintaining the temperature of the resulting liquid at 50° C. or less, 411.0 parts of hydrochloric acid were added to adjust to pH 1.0. At this time, the liquid volume was 1200 parts. Thereto, 240 parts of sodium chloride were added, and said liquid was stirred for 30 minutes to precipitate a solid. The precipitated solid was separated by filtration to obtain 60.6 parts of a wet cake.

The obtained wet cake was added to 470 parts of water, a 10% aqueous sodium hydroxide solution was added thereto to adjust to pH 10.0, whereby said wet cake was dissolved. To this solution, 33.2 parts of hydrochloric acid were added to adjust to pH 1.0. At this time, the liquid volume was 600 parts. To the resulting liquid, 120 parts of sodium chloride were added, and the mixture was stirred for 30 minutes to precipitate a solid. The precipitated solid was separated by filtration to obtain 38.4 parts of a wet cake. The obtained wet cake was added to a mixed liquid of 320 parts of methanol and 80 parts of water, said liquid was stirred at 50° C. for 1 hour, and then the precipitated solid was separated by filtration to obtain 38.2 parts of a wet cake. The obtained wet cake was dried to obtain 34.0 parts of a white powder of the intended organic amine for comparison represented by the above-described formula (20).

Step 2

Synthesis of the coloring matter for comparison represented by the following formula (21) [coloring matter of the following formula (21) wherein 1.37 of the rings of A to D are pyridine rings fused at the 2- and 3-positions, the rest 2.63 are benzene rings, b is 2.0, and c is 1.0].

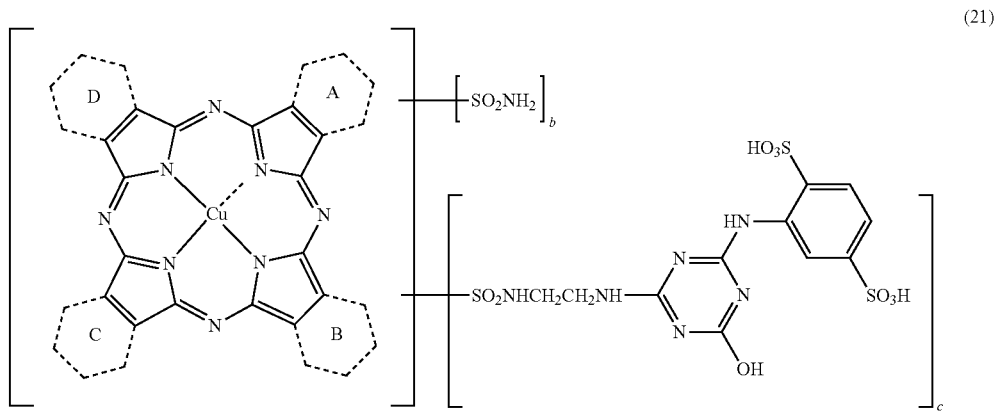

(21)

To 100 parts of ice water, 33.0 parts of a wet cake obtained in the same manner as in Example 1 (Step 1) and (Step 2) were added, and the mixture was suspended by stirring at 5° C. or less. Ten minutes later, while maintaining the liquid temperature at 10° C. or less, a solution dissolving 4.2 parts of the organic amine represented by the above-described formula (20) in 2 parts of a 28% ammonia water and 30 parts of water was added to said suspension. While maintaining the pH of said suspension at 9.0 with 28% ammonia water, the reaction was carried out. With the pH of said suspension maintained, the liquid temperature was raised to 20° C. over 1 hour, and the reaction was further carried out at the same temperature for 8 hours. The liquid volume at this time was 225 parts. The temperature of the reaction liquid was raised to 50° C., 33.7 parts of sodium chloride were added thereto, and said reaction liquid was stirred for 30 minutes. After that, the pH of said reaction liquid was adjusted to 1.0 over 20 minutes with concentrated hydrochloric acid. The precipitated solid was separated by filtration and washed with 100 parts of a 15% aqueous sodium chloride solution to obtain 126 parts of a wet cake.

The obtained wet cake was added to 120 parts of water, and a 25% sodium hydroxide aqueous solution was added thereto to adjust to pH 9.0, whereby said wet cake was dissolved. The liquid volume at this time was 275 parts. The temperature of the resulting solution was raised to 50° C., 27.5 parts of sodium chloride were added thereto, and said solution was stirred for 30 minutes. After that, concentrated hydrochloric acid was added over 20 minutes to adjust to pH 1.0, and then the precipitated solid was separated by filtration and washed with 100 parts of a 5% aqueous sodium chloride solution to obtain 141.2 parts of a wet cake. The obtained wet cake was added to a mixed solvent of 250 parts of methanol and 50 parts of water, and said liquid was stirred at 50° C. for 1 hour. After that, the solid was separated by filtration to obtain 74.9 parts of a wet cake. The obtained wet cake was dried to obtain 10.6 parts of free acid of the intended coloring matter for comparison represented by the above-described formula (21) as a blue powder.

λmax: 602 nm (in aqueous solution).

Examples 9 to 13

(A) Preparation of Ink

The components described in the below-described Table 2 were dissolved by mixing and filtered using a 0.45 μm membrane filter (manufactured by Advantec Co. Ltd.) to prepare an ink for evaluation test. As "water" in the ink preparation, ion-exchanged water was used. In addition, while adjusting the pH of the ink to 8 to 10 with an aqueous sodium hydroxide solution, water and an aqueous sodium hydroxide solution were added so that the total amount of the ink was 100 parts. The ink preparation using the coloring matter obtained in Example 1 is Example 9, and likewise, the ink preparations using the coloring matters obtained in Examples 2 to 4 are Examples 10 to 12 respectively and the ink preparation using the coloring matter obtained in Example 8 is Example 13.

Further, inks for comparison were prepared in the same manner as in Examples 9 to 13 except that coloring matters for comparison obtained in Synthesis Examples were used instead of coloring matters in Examples. These ink preparations are Comparative Example 1 (using the coloring matter for comparison obtained in Synthesis Example 1) and Comparative Example 2 (using the coloring matter for comparison obtained in Synthesis Example 2), respectively.

In this regard, as "surfactant" described in the below-described Table 2, Surfynol®104PG50 (trade name) manufactured by Nissin Chemical Industry Co., Ltd. was used.

TABLE 2

| Composition of the ink for test | |
|---|---|
| Coloring matter obtained in each Example | 5.0 Parts |
| Glycerine | 5.0 Parts |
| Urea | 5.0 Parts |
| N-Methyl-2-pyrrolidone | 4.0 Parts |
| Isopropylalcohol | 3.0 Parts |
| Butyl carbitol | 2.0 Paris |
| Taurine | 0.3 Part |
| Disodium ethylenediaminetetraacetate | 0.1 Part |
| Surfactant | 0.1 Part |
| Water + aqueous sodium hydroxide solution | 75.5 Parts |
| Total | 100.0 Parts |

(B) Inkjet Recording

Using an inkjet printer (manufactured by Canon Inc., trade name: PIXUS® ip4100), inkjet recording was performed on "Kassai Photo-finishing Pro" manufactured by Fujifilm Corporation as a glossy paper.

In inkjet recording, an image pattern was made so as to obtain six density gradations of 100%, 85%, 70%, 55%, 40% and 25%, and a recorded matter in halftone was obtained, which was used as a test piece. In ozone fastness test, measurement was carried out on 70% and 55% gradation parts to determine the coloring matter residual rate.

In addition, reflection density was measured using a colorimetric system (SpectroEye®, manufactured by X-rite). Color measurement was carried out under the conditions of DIN as density criteria, a viewing angle of 2° and a light source of D65.

The method for testing the recorded image and the method for evaluating the test result will be described below.

(C) Evaluation of Recorded Image

1. Ozone Fastness Test (High Coloring Matter Concentration)

Using an ozone weatherometer (manufactured by Suga Test Instruments Co., Ltd., model: OMS-H), each test piece was left under the circumstances of an ozone concentration of 10 ppm, a chamber temperature of 24° C. and a humidity of 60% RH for 64 hours. After the test, L*, a* and b* of each test piece were measured using the above-described colorimetric system, and color difference (ΔE) before and after the test was calculated by using the below-described calculation formula and evaluated on a scale of 4.

$$\Delta E = (\Delta a^2 + \Delta b^2 + \Delta L^2)^{1/2}$$

In this regard, the 70% gradation part of each test piece was used in color measurement. The average value of reflection density Dc of the each test pieces before the test was 1.4.
⊚: ΔE is less than 14.
○: ΔE is 14 or more and less than 16.
Δ: ΔE is 16 or more and less than 17.
X: ΔE is 18 or more.
A smaller value of ΔE means less color change and more excellent ozone fastness. The results are shown in the below-described Table 3.

2. Ozone Fastness Test (Low Coloring Matter Concentration)

Using an ozone weatherometer (manufactured by Suga Test Instruments Co., Ltd., model: OMS-H), each test piece was left under the circumstances of an ozone concentration of 10 ppm, a chamber temperature of 24° C. and a humidity of 60% RH for 64 hours. In the same manner as in ozone fastness test on the above-described high coloring matter concentration, each color difference (ΔE) before and after the test was evaluated on a scale of 4. In this regard, the gradation part of 55% of each test piece was used in color measurement. The average value of reflection density Dc of the test pieces before the test was 0.6.
⊚: ΔE is less than 10.5.
○: ΔE is 10.5 or more and less than 11.5.
Δ: ΔE is 11.5 or more and less than 12.5.
X: ΔE is 12.5 or more.
A smaller value of ΔE means less color change and more excellent ozone fastness. The results are shown in the below-described Table 3.

3. Dc Value of Test Piece

Using the above colorimetric system, the 100% gradation part in each test piece was measured for reflection density Dc value of cyan color. This was evaluated on a scale of 4.
⊚: Dc value is 2.40 or more.
○: Dc value is 2.30 or more and less than 2.40.
Δ: Dc value is 2.20 or more and less than 2.30.
X: Dc value is less than 2.20.

A larger numerical value of Dc value means a higher print density (dark) and more excellent quality as a cyan ink. The results are shown in the below-described Table 4.

4. Bronzing Evaluation

Using the same printer and glossy paper as in inkjet recording of the above (B), inkjet recording was performed with 100%, 85%, 70%, 55%, 40% and 25% densities by setting the printer, a recorded matter with six density gradations was prepared. For this recorded matter, evaluation was carried out by visual observation for which print density gradation bronze phenomenon occurred with. In the below-described Table 4, "OK" is described in the case where bronze phenomenon did not occur, and the lowest density with bronze phenomenon in the above-described 6 print density gradations is described in the case where bronze phenomenon occurred. The inkjet recording image with no bronze phenomenon has excellent quality. The results are shown in the below-described Table 4.

5. Water Fastness Test

Using the same printer and glossy paper as in inkjet recording of the above (B), a recorded matter having a grid pattern consisting of 100% and 0% print densities (corresponding to the printed part and the unprinted part, respectively) was prepared. The recorded matter obtained was dried by leaving for a week at ordinary temperature, and this was used as a test piece.

A drop of ion-exchanged water was poured on each test piece obtained, and the water droplet was evaporated by directly drying for a day. The bleeding state of coloring matter from the printed part to the unprinted part after the test was judged by visual observation. The evaluation criteria are as follows.

No bleeding to the unprinted part is observed . . . ⊚
Bleeding to the unprinted part is slightly observed . . . ○
Bleeding to the unprinted part is clearly observed . . . X The results are shown in the below-described Table 3.

TABLE 3

|  | Ozone fastness | | Water |
|  | High concentration * | Low concentration ** | fastness |
| --- | --- | --- | --- |
| Example 9 | ⊚ | ⊚ | ⊚ |
| Example 10 | ⊚ | ⊚ | ○ |
| Example 11 | ○ | ○ | ⊚ |
| Example 12 | ○ | ○ | ⊚ |
| Example 13 | Δ | Δ | ⊚ |
| Comp. Exam. 1 | X | X | ⊚ |
| Comp. Exam. 2 | ○ | ○ | X |

High concentration *: High coloring matter concentration
Low concentration **: Low coloring matter concentration
Comp. Exam.: Comparative Example

TABLE 4

|  | Dc value | Bronzing |
| --- | --- | --- |
| Example 9 | ⊚ | OK |
| Example 10 | ⊚ | 100% |
| Example 11 | ⊚ | OK |
| Example 12 | ⊚ | OK |
| Example 13 | ⊚ | OK |
| Comp. Exam. 1 | ⊚ | OK |
| Comp. Exam. 2 | Δ | 70% |

Comp. Exam.: Comparative Example

As is clear from Table 3, each Example using the compound of the present invention has good ozone fastness in both high and low coloring matter concentrations, compared with Comparative Example 1. This means that by, for example, using a high concentration ink containing the coloring matter of the present invention as a usual cyan ink and using a low concentration ink containing the coloring matter of the present invention as a light cyan ink, an ink set where both the usual cyan ink and the light cyan ink have the coloring matter of the present invention can be obtained. In addition, it became clear that a coloring matter of the present invention wherein X in the above formula (1) is a substituted anilino group, particularly a sulfo-substituted anilino group, has much more excellent ozone fastness than a coloring matter of the present invention wherein X in the above formula (1) is a substituted naphthylamino group.

Meanwhile, as for the ink composition of Example 10 (ink composition containing the compound of Example 2), the water fastness is "○" and bronzing is 100%, showing a little inferior results to the other Examples, which is because it is considered that the salt content contained in the compound of Example 2 was lager and had an influence.

In addition, it is confirmed that Comparative Example 2 is good in ozone fastness but extremely inferior in water fastness compared with Examples, and thus Examples show excellent properties in both ozone fastness and water fastness. Further, as is clear from Table 4, it is clear that Examples are substantially excellent in both print density Dc value and bronzing resistance, compared with Comparative Example 2.

From the above-mentioned results, it is confirmed that the recorded image of each Example obtained from the porphyrazine coloring matter of the present invention and the ink composition containing this is extremely excellent in the balance of fastness properties and qualities such as print density.

Example 14

Step 1

Synthesis of the compound represented by the following formula (22) wherein 1.00 of the rings of A to D is a pyridine ring fused at the 3- and 4-positions, the rest 3.00 are benzene rings, the substitution position of the sulfo group is the beta-position on the benzene ring and Q is 3.00.

To a four-necked flask, 250 parts of sulfolane, 73.86 parts of 4-sulfophthalic acid (a commercial product available as a 50% aqueous solution was used) and 11.0 parts of 28% ammonia water were added, the liquid temperature was raised to 200° C., and the reaction was carried out at the same temperature for 2 hours. After that, the reaction liquid was cooled to 65° C., and 8.35 parts of cinchomeronic acid, 72 parts of urea, 9.1 parts of copper (II) acetate and 1 part of ammonium molybdate were added thereto. The liquid temperature was again raised to 200° C., and the reaction was carried out at the same temperature for 5 hours. After completion of the reaction, the reaction liquid was cooled to 65° C., and 50 parts of methanol were added thereto. The precipitated solid was separated by filtration and washed with 200 parts of methanol to obtain 106.1 parts of a wet cake. The whole volume of the obtained wet cake was added to a solution consisting of 343 parts of water, 57 parts of hydrochloric acid and 100 parts of sodium chloride, the liquid temperature was raised to 60° C., and said solution was stirred at the same temperature for one hour. The precipitated solid was separated by filtration and washed with 200 parts of a 20% aqueous sodium chloride solution to obtain a wet cake.

The obtained wet cake was added to a mixed solvent of 400 parts of methanol and 100 parts of a 25% aqueous sodium hydroxide solution, the liquid temperature was raised to 60° C., and the mixture was stirred at the same temperature for 1 hour. The precipitated solid was separated by filtration and washed with 200 parts of methanol to obtain 76.5 parts of a wet cake. The obtained wet cake was added to a mixed solvent of 540 parts of methanol and 60 parts of water, the liquid temperature was raised to 60° C., and the liquid was stirred at the same temperature for 1 hour. The solid was separated by filtration and washed with 200 parts of methanol to obtain 72.0 parts of a wet cake. The obtained wet cake was dried at 80° C. to obtain 31.2 parts of the intended compound represented by the above-described formula (22) as a blue solid.
λmax=623 nm (in aqueous solution).

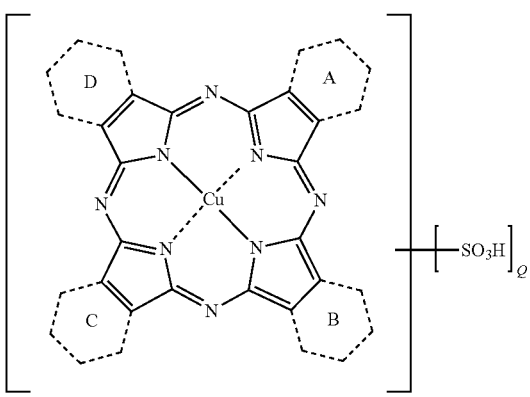

(22)

Step 2

Synthesis of the compound represented by the above formula (2) wherein 1.00 of the rings of A to D is a pyridine ring fused at the 3- and 4-positions, the rest 3.00 are benzene rings, the substitution position of the chlorosulfonyl group is the beta-position on the benzene ring and n is 3.00.

To 39.8 parts of chlorosulfonic acid, while adjusting so that the liquid temperature was not over 60° C., 6.65 parts of the compound represented by the above formula (22) obtained in Example 14 (Step 1) were gradually added. Subsequently, the liquid temperature was raised to 120° C., and the reaction was carried out at the same temperature for 4 hours. Said reaction liquid was cooled to 70° C., 13.4 parts of thionyl chloride were added dropwise over 30 minutes, and then the reaction was carried out at 80° C. for 3 hours. Said reaction liquid was cooled to 30° C. or less and was slowly poured into 1000 parts of ice water. The precipitated solid was separated by filtration and washed with 100 parts of cold water to obtain 33.3 parts of a wet cake of the intended compound represented by the above formula (2) (n=3).

Step 3

Synthesis of the porphyrazine coloring matter of the present invention represented by the following formula (23) [coloring matter of the above formula (1) wherein 1.00 of the rings of A to D is a pyridine ring fused at the 3- and 4-positions, the rest 3.00 are benzene rings, E is ethylene, X is 2,5-disulfoanilino, $R_1$ is methyl, and any of substituted and unsubstituted sulfamoyl groups is substituted on the beta-position].

To 50 parts of ice water, 33.3 parts of the wet cake obtained in Example 14 (Step 2) were added, and the mixture was suspended by stirring at 5° C. or less. Ten minutes later, while maintaining the liquid temperature at 10° C. or less, a solution dissolving 1.6 parts of an organic amine represented by the formula (6) obtained in accordance with Example 1 (Step 3) in a mixed liquid of 1 part of 28% ammonia water and 40 parts of water was added to this suspension, and while maintaining pH 9.0 by further adding 28% ammonia water thereto, the reaction was carried out. With the pH of said suspension maintained, the liquid temperature was raised to 20° C. over 1 hour, and the reaction was further carried out at the same temperature for 8 hours. The liquid volume of the reaction liquid at this time was 175 parts. The liquid temperature of said reaction liquid was raised to 50° C., 35 parts of sodium chloride were added, the mixture was stirred for 30 minutes, and then concentrated hydrochloric acid was added over 20 minutes to adjust to pH 1.0. The precipitated solid was separated by filtration and washed with 100 parts of a 20% aqueous sodium chloride solution to obtain 61.2 parts of a wet cake. The obtained wet cake was added to 130 parts of water, and a 25% aqueous sodium hydroxide solution was added thereto to adjust to pH 9.0, whereby said wet cake was dissolved. The liquid volume at this time was 200 parts. The temperature of this solution was raised to 50° C., 10 parts of sodium chloride were added, and subsequently said solution was stirred for 30 minutes. After that, concentrated hydrochloric acid was added over 20 minutes to adjust the pH of said solution to 1.0. The precipitated solid was separated by filtration and washed with 100 parts of a 5% aqueous sodium chloride solution to obtain 40.1 parts of a wet cake. The obtained wet cake was added to a mixed liquid of 360 parts of methanol and 40 parts of water, said liquid was stirred at 50° C. for 1 hour, and then the solid was separated by filtration to obtain 18.6 parts of a wet cake. The obtained wet cake was dried to obtain 8.1 parts of free acid of a coloring matter of the present invention represented by the above-described formula (23) (coloring matter wherein b is 2.5 and c is 0.5) as a blue powder.

λmax: 609.8 nm.

Example 15

Step 1

Synthesis of the compound represented by the above formula (22) wherein 1.50 of the rings of A to D are pyridine rings fused at the 3- and 4-positions, the rest 2.50 are benzene rings, the substitution position of the sulfo group is the beta-position of the benzene ring, and Q is 2.50.

(23)

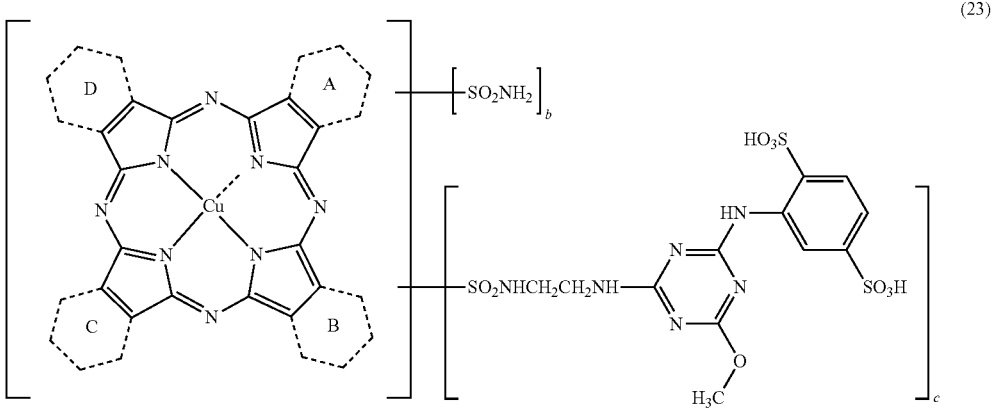

To a four-necked flask, 200 parts of sulfolane, 61.55 parts of 4-sulfophthalic acid (a commercial product available as a 50% aqueous solution was used) and 9.1 parts of 28% ammonia water were added, the liquid temperature was raised to 200° C., and the reaction was carried out at the same temperature for 2 hours. After that, said reaction liquid was cooled to 65° C., and 12.5 parts of cinchomeronic acid, 72 parts of urea, 9.1 parts of copper (II) acetate and 1 part of ammonium molybdate were added to said reaction liquid. The temperature of said reaction liquid was again raised to 200° C., and the reaction was carried out at the same temperature for 5 hours. After completion of the reaction, said reaction liquid was cooled to 65° C., and 50 parts of methanol were added thereto. The precipitated solid was separated by filtration and washed with 200 parts of methanol to obtain 112.1 parts of a wet cake.

The whole volume of the obtained wet cake was added to a solution consisting of 343 parts of water, 57 parts of hydrochloric acid and 100 parts of sodium chloride, the liquid temperature was raised to 60° C., and said liquid was stirred at the same temperature for one hour. The precipitated solid was separated by filtration and washed with 200 parts of a 20% aqueous sodium chloride solution to obtain a wet cake. The obtained wet cake was added to a mixed solvent of 400 parts of methanol and 100 parts of a 25% aqueous sodium hydroxide solution, the liquid temperature of said solution was raised to 60° C., and said solution was stirred at the same temperature for 1 hour. The precipitated solid was separated by filtration and washed with 200 parts of methanol to obtain 78.1 parts of a wet cake. The obtained wet cake was added to a mixed solvent of 540 parts of methanol and 60 parts of water, the liquid temperature was raised to 60° C., and the liquid was stirred at the same temperature for 1 hour. The precipitated solid was separated by filtration and washed with 200 parts of methanol to obtain 78.8 parts of a wet cake. The obtained wet cake was dried at 80° C. to obtain 28.6 parts of the intended compound represented by the above formula (22) as a blue solid.
λmax=612.5 nm (in aqueous solution).

Step 2

Synthesis of the compound represented by the above formula (2) wherein 1.50 of the rings of A to D are pyridine rings fused at the 3- and 4-positions, the rest 2.50 are benzene rings, the substitution position of the chlorosulfonyl group is the beta-position on the benzene ring and n is 2.50.

To 37.7 parts of chlorosulfonic acid, while adjusting so that the temperature was not over 60° C., 6.3 parts of the compound represented by the formula (22) obtained in Example 15 (Step 1) were gradually added, and subsequently the liquid temperature was raised to 120° C. and the reaction was carried out at the same temperature for 4 hours. The reaction liquid was cooled to 70° C., 13.4 parts of thionyl chloride were added dropwise to said reaction liquid over 30 minutes, and subsequently the reaction was carried out at 80° C. for 3 hours. The reaction liquid was cooled to 30° C. or less, and said reaction liquid was slowly poured into 1000 parts of ice water. The precipitated solid was separated by filtration and washed with 100 parts of cold water to obtain 33.1 parts of a wet cake of the intended compound.

Step 3

Synthesis of the porphyrazine coloring matter of the present invention represented by the above formula (23) [coloring matter of the above formula (1) wherein 1.50 of the rings of A to D are pyridine rings fused at the 3- and 4-positions, the rest 2.50 are benzene rings, E is ethylene, X is 2,5-disulfoanilino, $R_1$ is methyl, and any of substituted and unsubstituted sulfamoyl groups is substituted on the beta-position].

To 50 parts of ice water, 33.1 parts of the wet cake obtained in Example 15 (Step 2) were added, and the mixture was suspended by stirring at 5° C. or less. Ten minutes later, while maintaining the liquid temperature at 10° C. or less, a solution dissolving 1.6 parts of an organic amine represented by the formula (6) obtained in accordance with Example 1 (Step 3) in a mixed liquid of 1 part of 28% ammonia water and 40 parts of water was added to this suspension, and while maintaining pH 9.0 by further adding 28% ammonia water, the reaction was carried out. With the pH of said suspension maintained, the liquid temperature was raised to 20° C. over 1 hour, the reaction was further carried out at the same temperature for 8 hours. The liquid volume of the reaction liquid at this time was 175 parts. The liquid temperature of the reaction liquid was raised to 50° C., 35 parts of sodium chloride were added thereto, and said reaction liquid was stirred for 30 minutes. After that, concentrated hydrochloric acid was added over 20 minutes to said reaction liquid to adjust to pH 1.0. The precipitated solid was separated by filtration and washed with 100 parts of a 20% aqueous sodium chloride solution to obtain 29.2 parts of a wet cake.

The obtained wet cake was added to 150 parts of water, a 25% aqueous sodium hydroxide solution were added thereto to adjust to pH 9.0, whereby said wet cake was dissolved. The liquid volume at this time was 200 parts. The temperature of this solution was raised to 50° C., 10 parts of sodium chloride were added, said solution was stirred for 30 minutes, and then concentrated hydrochloric acid was added thereto over 20 minutes to adjust to pH 1.0. The precipitated solid was separated by filtration and washed with 100 parts of a 5% aqueous sodium chloride solution to obtain 37.1 parts of a wet cake. The obtained wet cake was added to a mixed liquid of 360 parts of methanol and 40 parts of water, the mixture was stirred at 50° C. for 1 hour, and then the solid was separated by filtration to obtain 19.8 parts of a wet cake. The obtained wet cake was dried to obtain 6.6 parts of free acid of the intended coloring matter of the present invention represented by the above formula (23) (coloring matter wherein b is 2.0 and c is 0.5) as a blue powder.
λmax: 607.6 nm.

Examples 16 and 17

(D) Preparation of Ink

In the same manner as in Examples 9 to 13 except that the coloring matter obtained in Example 14 or Example 15 was used instead of the coloring matter of each Example used in Examples 9 to 13, an ink was prepared. The preparations of these inks are Example 16 and Example 17, respectively.

(E) Inkjet Recording

Using each of Example 16, Example 17 and the above Comparative Example 1, inkjet recording was performed on the below-described glossy paper by an inkjet printer (manufactured by Canon Inc., trade name: PIXUS® ip4500).

In inkjet recording, an image pattern was made so as to obtain six density gradations of 100%, 85%, 70%, 55%, 40% and 25%, and a recorded matter in halftone was obtained, which was used as a test piece.

In this regard, color measurement for reflection density was carried out on the same system and under the same conditions as in the above (B) inkjet recording.
Glossy paper A: "Kassai Photo-finishing Pro" manufactured by Fujifilm Corporation (F) Evaluation of Recorded Image 1. Ozone Fastness Test
Using an ozone weatherometer (manufactured by Suga Test Instruments Co., Ltd., model: OMS-H), each test piece was left under the circumstances of an ozone concentration of 80 ppm, a chamber temperature of 24° C. and a humidity of 60% RH for 4 hours. After the test, the reflection density of each test piece was measured using the above colorimetric system. The coloring matter residual rate was determined by calculation from (reflection density after test/reflection density before test)×100(%) and evaluated on the following scale of 4.

In this regard, in ozone fastness test, measurement was carried out on the 70% gradation part. The evaluation results are shown in the below-described Table 5.

Coloring matter residual rate is 85% or more . . . ⊚

Coloring matter residual rate is less than 85% and 80% or more . . . ○

Coloring matter residual rate is less than 80% and 75% or more . . . Δ

Coloring matter residual rate is less than 75% . . . X

TABLE 5

| Evaluation result | Ozone fastness Glossy paper A |
|---|---|
| Example 16 | ⊚ |
| Example 17 | ⊚ |
| Comp. Exam. 1 | Δ |

Comp. Exam.: Comparative Example

2. Hue Test

In hue evaluation, the 70% density gradation part was measured using the above colorimetric system, and hue distance to the standard color was evaluated. At this time, Dc value of the test piece measured was 1.3 to 1.5

As the standard cyan, a sample (3rd VERSION) of the solid patch color of Japan Color published by Japan National Committee For ISO/TC130 was used. The measurement results of $L^*$, $a^*$ and $b^*$ of the standard color are as follows.

Standard color: $L^*=57.28$, $a^*=-30.49$ and $b^*=-44.67$.

In evaluation, $L^*$, $a^*$ and $b^*$ of each test piece was measured, and the color difference ($\Delta E$) from the standard color was determined from the below-described calculation formula.

As the result, ($\Delta E$) value in each image obtained in Examples 16 and 17 of the present invention was less than 4 to 7, and ($\Delta E$) value in the image obtained in Comparative Example 1 was less than 7 to 9. A smaller numerical value of $\Delta E$ means a closer distance to the standard color.

In any of Examples 16 and 17, bronze phenomenon was not observed in any density.

As is clear from the above-mentioned results, it is confirmed that Examples 14 and 15 are more excellent in both ozone fastness and hue than Comparative Example 1.

INDUSTRIAL APPLICABILITY

The recorded image obtained with the porphyrazine coloring matter of the present invention and the ink composition containing this can get excellent fastness properties and a high print density and hardly causes bronze phenomenon which reduces the quality of recorded images, and thus they are extremely useful as an ink for various recording systems, particularly as an ink for inkjet recording.

The invention claimed is:

1. A porphyrazine coloring matter or a salt thereof represented by the following formula (1)

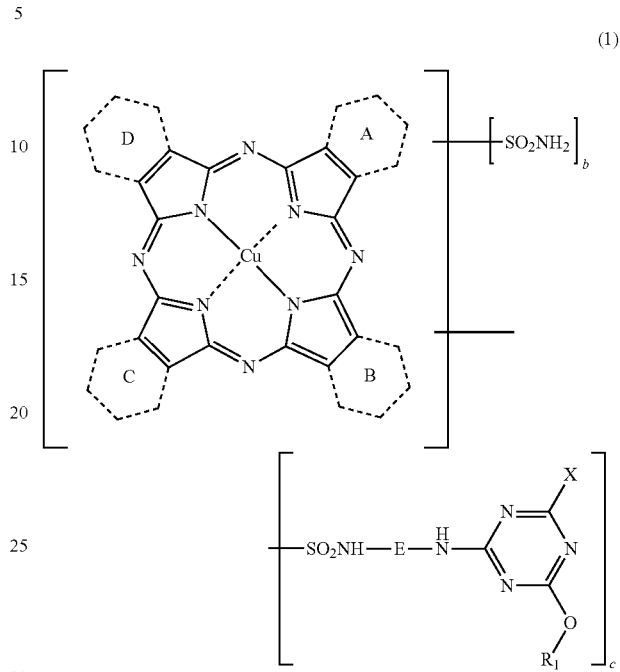

wherein, the rings of A to D represented by broken lines each independently represent a benzene ring or a 6-membered nitrogen-containing heteroaromatic ring fused to a porphyrazine ring, where the number of the nitrogen-containing heteroaromatic ring is over 0.00 and 3.00 or less as an average value and the rest are benzene rings, E represents C2-C12 alkylene, X is a sulfoanilino group, a carboxyanilino group, a phosphonoanilino group, a sulfonaphthylamino group, a carboxynaphthylamino group or a phosphononaphthylamino group and may further have, as a substituent, at least one kind of group selected from the group consisting of a sulfo group, a carboxy group, a phosphono group, a sulfamoyl group, a carbamoyl group, a hydroxy group, a C1-C6 alkoxy group, an amino group, a mono C1-C4 alkylamino group, a di C1-C4 alkylamino group, a monoarylamino group, a diarylamino group, a C1-C3 alkylcarbonylamino group, an ureide group, a C1-C6 alkyl group, a nitro group, a cyano group, a halogen atom, a C1-C6 alkylsulfonyl group and a C1-C6 alkylthio group, $R_1$ represents a C1-C6 alkyl group, b is, as an average value, 0.00 or more and less than 3.90, c is, as an average value, 0.10 or more and less than 4.00, and the sum of b and c is, as an average value, 1.00 or more and less than 4.00.

2. The porphyrazine coloring matter or a salt thereof according to claim 1, wherein the 6-membered nitrogen-containing heteroaromatic ring represented by the rings of A to D is a pyridine ring or a pyrazine ring.

3. The porphyrazine coloring matter or a salt thereof according to claim 1, which is obtained by reaction of a porphyrazine compound represented by the following formula (2) with an organic amine represented by the following formula (3) in the presence of ammonia,

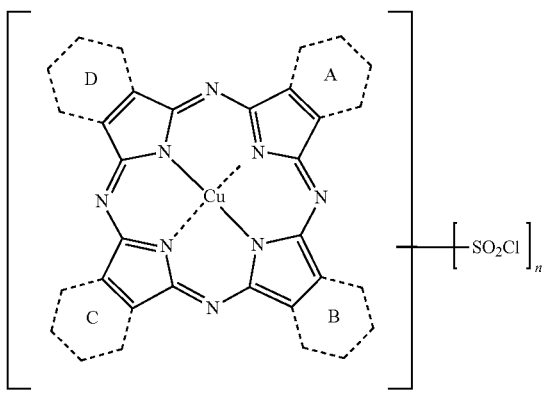

(2)

wherein, the rings of A to D have the same meanings as those described in claim 1, and n is 1.00 or more and less than 4.00

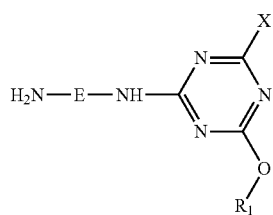

(3)

wherein, E, X and $R_1$ have the same meanings as those described in claim 1.

4. The porphyrazine coloring matter or a salt thereof according to claim 1, wherein
E is C2-C4 alkylene,
$R_1$ is a C1-C3 alkyl group, and
X is a sulfoanilino group, a carboxyanilino group, a phosphonoanilino group, a sulfonaphthylamino group, a carboxynaphthylamino group or a phosphononaphthylamino group and further has, as a substituent, 0 to 3 of at least one kind of group selected from the group consisting of a sulfo group, a carboxy group, a phosphono group, a hydroxy group, a C1-C6 alkoxy group, a C1-C3 alkylcarbonylamino group, an ureide group, a nitro group and a chlorine atom.

5. The porphyrazine coloring matter or a salt thereof according to claim 4, wherein
E is straight-chain C2-C4 alkylene, and
X is a sulfoanilino group or a carboxyanilino group and further has, as a substituent, 0 to 2 of at least one kind of group selected from the group consisting of a sulfo group, a carboxy group, a hydroxy group, a C1-C6 alkoxy group, a nitro group and a chlorine atom.

6. The porphyrazine coloring matter or a salt thereof according to claim 1, wherein the nitrogen-containing heteroaromatic rings for the rings of A to D are each independently a pyridine ring fused at the 2- and 3-positions or the 3- and 4-positions; or a pyrazine ring fused at the 2- and 3-positions,
E is ethylene or propylene, and
X is a sulfoanilino group or a carboxyanilino group and further has, as a substituent, 0 to 2 of at least one kind of group selected from the group consisting of a sulfo group, a carboxy group, a hydroxy group, a C1-C6 alkoxy group, a nitro group and a chlorine atom.

7. The porphyrazine coloring matter or a salt thereof according to claim 1, wherein the nitrogen-containing heteroaromatic rings for the rings of A to D are each independently a pyridine ring fused at the 2- and 3-positions or the 3- and 4-positions.
E is ethylene or propylene, and
X is a sulfoanilino group or a sulfonaphthylamino group, where the sulfoanilino group further has, as a substituent, 0 to 2 groups selected from the group consisting of a sulfo group, a carboxy group, a hydroxy group, a C1-C6 alkoxy group, an amino group, a mono C1-C4 alkylamino group, a di C1-C4 alkylamino group, a C1-C3 alkylcarbonylamino group, a C1-C6 alkyl group, a nitro group, a chlorine atom, a C1-C6 alkylsulfonyl group and a C1-C6 alkylthio group, and the sulfonaphthylamino group further has, as a substituent, 1 or 2 groups selected from the group consisting of a sulfo group, a hydroxy group and a nitro group.

8. The porphyrazine coloring matter or a salt thereof according to claim 1, wherein the nitrogen-containing heteroaromatic rings for the rings of A to D are each independently a pyridine ring fused at the 2- and 3-positions or the 3- and 4-positions, where the number thereof is, as an average value, over 0.00 and 3.00 or less and the number of the rest of the benzene rings is, as an average value, 1.00 or more and less than 4.00,
E is ethylene,
X is a disulfoanilino group or a sulfonaphthylamino group, where the sulfonaphthylamino group further has, as a substituent, 1 or 2 of one or two kinds of group selected from the group consisting of a sulfo group and a hydroxy group,
$R_1$ is a C1-C4 alkyl group,
b is, as an average value, 0.00 or more and less than 3.90,
c is, as an average value, 0.10 or more and less than 4.00, and
the sum of b and c is, as an average value, 1.00 or more and less than 4.00.

9. An ink composition containing the porphyrazine coloring matter or a salt thereof according to claim 1 or 8, as a coloring matter.

10. The ink composition according to claim 9, which further contains an organic solvent.

11. The ink composition according to claim 10, which is for inkjet recording.

12. A method for inkjet recording, wherein recording is performed on a record-receiving material by discharging an ink droplet of an ink composition containing the porphyrazine coloring matter or a salt thereof according to claim 1 by responding to a recording signal.

13. The method for inkjet recording according to claim 12, wherein the record-receiving material is a communication sheet.

14. The method for inkjet recording according to claim 13, wherein the communication sheet is a sheet subjected to surface treatment and said sheet is a sheet having an ink-receiving layer containing white inorganic pigment particles on the support.

15. A container containing an ink composition containing the porphyrazine coloring matter or a salt thereof according to claim 1.

16. An inkjet printer comprising the container according to claim 15.

17. A colored product colored with an ink composition containing the porphyrazine coloring matter or a salt thereof according to claim 1.

18. The porphyrazine coloring matter or a salt thereof according to claim 1 or 8, wherein X is a disulfoanilino group or a disulfonaphthylamino group which may be substituted by a hydroxy group.

19. The porphyrazine coloring matter or a salt thereof according to claim 18, wherein X is a disulfoanilino group.

20. An ink composition containing the porphyrazine coloring matter or a salt thereof according to claim 1, where X is a disulfoanilino group or a disulfonaphthylamino group which may be substituted by a hydroxy group, water and an organic solvent.

21. An ink composition containing the porphyrazine coloring matter or a salt thereof according to claim 8, where X is a disulfoanilino group or a disulfonaphthylamino group which may be substituted by a hydroxy group, water and an organic solvent.

\* \* \* \* \*